United States Patent
Verbrugge et al.

(10) Patent No.: US 12,011,812 B2
(45) Date of Patent: *Jun. 18, 2024

(54) HIGH-POWER CORDLESS, HAND-HELD POWER TOOL INCLUDING A BRUSHLESS DIRECT CURRENT MOTOR

(71) Applicant: MILWAUKEE ELECTRIC TOOL CORPORATION, Brookfield, WI (US)

(72) Inventors: Brandon L. Verbrugge, White Bear Lake, MN (US); Matthew J. Mergener, Mequon, WI (US); Matthew P. Wycklendt, Madison, WI (US); Jeffrey C. Hessenberger, Neosho, WI (US); Dennis J. Grzybowski, New Berlin, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,209

(22) Filed: Oct. 31, 2023

(65) Prior Publication Data

US 2024/0075605 A1 Mar. 7, 2024

Related U.S. Application Data

(63) Continuation of application No. 18/332,017, filed on Jun. 9, 2023, which is a continuation of application
(Continued)

(51) Int. Cl.
*B25F 5/00* (2006.01)
*B25F 5/02* (2006.01)

(52) U.S. Cl.
CPC ................ *B25F 5/00* (2013.01); *B25F 5/008* (2013.01); *B25F 5/02* (2013.01)

(58) Field of Classification Search
CPC ... B25F 5/00; B25F 5/02; B25F 5/008; H02K 7/145
See application file for complete search history.

(56) References Cited

U.S. PATENT DOCUMENTS

| 3,783,359 A | 1/1974 | Malkiel |
| 3,805,134 A | 4/1974 | Osamu et al. |

(Continued)

FOREIGN PATENT DOCUMENTS

| DE | 4019894 A1 | 4/1991 |
| DE | 4137384 C1 | 4/1993 |

(Continued)

OTHER PUBLICATIONS

"Lithium Battery Discharge Cutoff Voltage", Large Battery, 2011 [retrieved on Jan. 4, 2024], 3 pgs, Retrieved from the Internet: <http://web.archive.org/web/20120320140018/http://www.large-battery.com/lithium-battery-discharge-cutoff-voltage.html> (Year: 2011).*

(Continued)

*Primary Examiner* — Joshua G Kotis
(74) *Attorney, Agent, or Firm* — Michael Best & Friedrich LLP

(57) ABSTRACT

A cordless, hand-held power tool, such as a hammer drill/driver, a drill/driver, an impact driver, an impact wrench, etc., that includes a brushless direct current ("BLDC") motor. Each of the hand-held power tool includes a removable and rechargeable battery pack, electronics, and a BLDC motor that have been designed and balanced to produce a high-performance-capable (e.g., high-power, high-current, high-torque) hand-held power tool. The hand-held power tool is capable of delivering high instantaneous (i.e., short duration) current to the BLDC motor for short-duration high power operation and high continuous (i.e., long duration) current to the BLDC motor for long duration high power (Continued)

operation. Additionally, the short and long duration power is capable of being provided in a smaller (in size) and lighter (in weight).

27 Claims, 49 Drawing Sheets

Related U.S. Application Data

No. 17/809,467, filed on Jun. 28, 2022, now Pat. No. 11,673,248, which is a continuation of application No. 17/499,065, filed on Oct. 12, 2021, now Pat. No. 11,370,099, which is a continuation of application No. 17/085,120, filed on Oct. 30, 2020, now Pat. No. 11,141,851, which is a continuation of application No. 13/838,126, filed on Mar. 15, 2013, now Pat. No. 10,821,591.

(60) Provisional application No. 61/725,961, filed on Nov. 13, 2012.

(56) References Cited

U.S. PATENT DOCUMENTS

| | | |
|---|---|---|
| 3,855,983 A | 12/1974 | Valek |
| 3,965,380 A | 6/1976 | Stepina |
| 3,988,654 A | 10/1976 | Takahashi et al. |
| 4,074,173 A | 2/1978 | Janssen |
| 4,096,420 A | 6/1978 | Gosling et al. |
| 4,242,608 A | 12/1980 | Ishigaki et al. |
| 4,316,113 A | 2/1982 | Sato et al. |
| 4,514,652 A | 4/1985 | Olson |
| 4,620,139 A | 10/1986 | Egami et al. |
| 4,641,066 A | 2/1987 | Nagata et al. |
| 4,642,496 A | 2/1987 | Kerviel et al. |
| 4,659,951 A | 4/1987 | Angi et al. |
| 4,689,534 A | 8/1987 | Gerber et al. |
| 4,758,769 A | 7/1988 | Carrigan et al. |
| 4,785,242 A | 11/1988 | Vaidya et al. |
| 4,891,567 A | 1/1990 | Fujitani et al. |
| 4,892,863 A | 1/1990 | Agarwala |
| 4,905,423 A * | 3/1990 | van Laere ............... B25F 5/001 81/464 |
| 4,949,023 A | 8/1990 | Shlien |
| 4,952,830 A | 8/1990 | Shirakawa |
| 5,012,166 A | 4/1991 | Hijima |
| 5,041,749 A | 8/1991 | Gaser et al. |
| 5,148,358 A | 9/1992 | Estes, Jr. |
| 5,184,038 A | 2/1993 | Matsui et al. |
| 5,250,881 A | 10/1993 | Yoshino |
| 5,401,124 A | 3/1995 | Hettich |
| 5,410,229 A | 4/1995 | Sebastian et al. |
| 5,414,793 A | 5/1995 | Morikawa |
| 5,446,610 A | 8/1995 | Elsaesser et al. |
| 5,521,495 A | 5/1996 | Takahashi et al. |
| 5,543,994 A | 8/1996 | Wilhelm et al. |
| 5,554,916 A | 9/1996 | Kaneda et al. |
| 5,563,482 A | 10/1996 | Shaw et al. |
| 5,604,412 A | 2/1997 | Okada et al. |
| 5,633,546 A | 5/1997 | Horst |
| 5,731,673 A | 3/1998 | Gilmore |
| 5,734,241 A | 3/1998 | Okada et al. |
| 5,739,614 A | 4/1998 | Suzuki et al. |
| 5,786,646 A | 7/1998 | Newberg et al. |
| 5,856,715 A | 1/1999 | Peot et al. |
| 5,895,177 A | 4/1999 | Iwai et al. |
| 5,929,611 A | 7/1999 | Scott et al. |
| 5,933,342 A | 8/1999 | Callanan |
| 5,942,863 A | 8/1999 | Wada |
| 6,020,700 A | 2/2000 | Tien |
| 6,055,484 A | 4/2000 | Lysaght |
| 6,093,986 A | 7/2000 | Windhorn |
| 6,123,158 A | 9/2000 | Steffen |
| 6,201,329 B1 | 3/2001 | Chen |
| 6,310,450 B1 | 10/2001 | Arrigo |
| 6,320,286 B1 | 11/2001 | Ramarathnam |
| 6,335,598 B1 | 1/2002 | Lin et al. |
| 6,542,068 B1 | 4/2003 | Drapp et al. |
| 6,552,453 B2 | 4/2003 | Ohiwa et al. |
| 6,552,904 B2 | 4/2003 | Fung |
| 6,553,321 B2 | 4/2003 | Siegel et al. |
| 6,585,246 B2 | 6/2003 | McCormick et al. |
| 6,644,638 B1 | 11/2003 | McCormick |
| 6,680,553 B1 | 1/2004 | Takano |
| 6,680,595 B2 | 1/2004 | Ito |
| 6,693,422 B2 | 2/2004 | Lutz |
| 6,707,200 B2 | 3/2004 | Carroll et al. |
| 6,794,594 B2 | 9/2004 | Ching |
| 6,819,022 B2 | 11/2004 | Yamamoto et al. |
| 6,819,068 B2 | 11/2004 | Horng et al. |
| 6,838,842 B2 | 1/2005 | Fetel et al. |
| 6,844,637 B1 | 1/2005 | Smith et al. |
| 6,866,105 B2 | 3/2005 | Pfisterer et al. |
| 6,883,795 B2 | 4/2005 | McCormick et al. |
| 6,902,012 B2 | 6/2005 | Kristen et al. |
| 6,923,268 B2 | 8/2005 | Totsu |
| 6,933,631 B2 | 8/2005 | Ogawa |
| 6,941,822 B2 | 9/2005 | Yao |
| 6,975,050 B2 | 12/2005 | Cleantho et al. |
| 6,981,311 B2 | 1/2006 | Seith et al. |
| 6,998,755 B2 | 2/2006 | Kloepzig et al. |
| 7,000,911 B2 | 2/2006 | McCormick et al. |
| 7,049,813 B2 | 5/2006 | Morita, Jr. et al. |
| 7,058,291 B2 | 6/2006 | Weaver et al. |
| 7,064,462 B2 | 6/2006 | Hempe et al. |
| 7,078,843 B2 * | 7/2006 | Du ..................... H02K 3/325 310/216.091 |
| 7,095,193 B2 | 8/2006 | Kellogg et al. |
| 7,121,539 B2 | 10/2006 | McCormick et al. |
| 7,164,257 B2 | 1/2007 | Johnson et al. |
| 7,215,052 B2 | 5/2007 | Blase et al. |
| 7,235,940 B2 | 6/2007 | Bosch et al. |
| 7,247,961 B2 | 7/2007 | Nayak et al. |
| 7,248,005 B2 | 7/2007 | Makaran |
| 7,273,159 B2 | 9/2007 | Brotto |
| 7,281,591 B2 | 10/2007 | Bone |
| 7,288,911 B2 | 10/2007 | MacKay |
| 7,330,006 B2 | 2/2008 | Iwata et al. |
| 7,359,628 B2 | 4/2008 | Broghammer et al. |
| 7,372,226 B2 | 5/2008 | Wiker et al. |
| 7,385,795 B2 | 6/2008 | Denning |
| 7,394,174 B2 | 7/2008 | Blase et al. |
| 7,410,006 B2 | 8/2008 | Zhang et al. |
| 7,420,341 B2 | 9/2008 | Glasgow et al. |
| 7,423,396 B2 | 9/2008 | Bolt |
| 7,427,842 B2 | 9/2008 | Kress et al. |
| 7,477,034 B2 | 1/2009 | MacKay |
| 7,521,826 B2 | 4/2009 | Hempe et al. |
| 7,540,334 B2 | 6/2009 | Gass et al. |
| 7,562,720 B2 | 7/2009 | Seith et al. |
| 7,567,001 B2 | 7/2009 | Kasai et al. |
| 7,588,444 B2 | 9/2009 | Kataoka et al. |
| 7,592,761 B2 | 9/2009 | MacKay |
| 7,602,137 B2 | 10/2009 | Du et al. |
| 7,646,155 B2 | 1/2010 | Woods et al. |
| 7,673,701 B2 | 3/2010 | Tanaka et al. |
| 7,681,659 B2 | 3/2010 | Zhang et al. |
| 7,701,738 B2 | 4/2010 | Pruessmeier et al. |
| 7,703,330 B2 | 4/2010 | Miyazaki et al. |
| 7,714,538 B2 | 5/2010 | Johnson et al. |
| 7,730,963 B2 | 6/2010 | Carrier et al. |
| 7,753,135 B2 | 7/2010 | Lennartz |
| 7,768,219 B2 | 8/2010 | Kach |
| 7,795,829 B2 | 9/2010 | Seiler et al. |
| 7,800,325 B2 | 9/2010 | Song et al. |
| 7,808,200 B2 | 10/2010 | Liu et al. |
| 7,817,384 B2 | 10/2010 | Woods et al. |
| 7,821,217 B2 | 10/2010 | Abolhassani et al. |
| 7,834,566 B2 | 11/2010 | Woods et al. |
| 7,900,524 B2 | 3/2011 | Calloway et al. |
| 7,960,931 B2 | 6/2011 | Rodriguez et al. |

(56) References Cited

U.S. PATENT DOCUMENTS

| | | | |
|---|---|---|---|
| 8,074,731 B2* | 12/2011 | Iwata | B25B 23/1475 173/176 |
| 8,084,901 B2 | 12/2011 | Oomori et al. | |
| 8,102,192 B2 | 1/2012 | Mourrier et al. | |
| 8,169,119 B2 | 5/2012 | Eppler et al. | |
| 8,251,157 B2 | 8/2012 | Gray et al. | |
| 8,395,289 B2 | 3/2013 | Tian et al. | |
| 8,732,969 B2 | 5/2014 | Erestam et al. | |
| 10,821,591 B2 | 11/2020 | Verbrugge et al. | |
| 11,141,851 B2 | 10/2021 | Verbrugge et al. | |
| 11,370,099 B2 | 6/2022 | Verbrugge et al. | |
| 11,673,248 B2* | 6/2023 | Verbrugge | B25F 5/008 173/217 |
| 2001/0042631 A1 | 11/2001 | Carrier | |
| 2002/0074972 A1 | 6/2002 | Narang et al. | |
| 2002/0118014 A1 | 8/2002 | Crawford et al. | |
| 2002/0134811 A1 | 9/2002 | Napier et al. | |
| 2002/0149288 A1 | 10/2002 | Horng et al. | |
| 2002/0166240 A1 | 11/2002 | Duford et al. | |
| 2004/0021437 A1 | 2/2004 | Maslov et al. | |
| 2004/0061470 A1 | 4/2004 | Ito et al. | |
| 2005/0096683 A1 | 5/2005 | Ellins et al. | |
| 2005/0200339 A1 | 9/2005 | Phillips et al. | |
| 2005/0247459 A1 | 11/2005 | Voight et al. | |
| 2006/0071576 A1 | 4/2006 | Cho | |
| 2006/0085990 A1 | 4/2006 | Ulmer et al. | |
| 2006/0087286 A1 | 4/2006 | Phillips et al. | |
| 2006/0096771 A1 | 5/2006 | Brotto | |
| 2006/0222930 A1 | 10/2006 | Aradachi et al. | |
| 2006/0225904 A1 | 10/2006 | Chen | |
| 2007/0069677 A1 | 3/2007 | Mackay | |
| 2007/0193761 A1 | 8/2007 | Brotto | |
| 2007/0210733 A1 | 9/2007 | Du et al. | |
| 2007/0240892 A1 | 10/2007 | Brotto | |
| 2007/0267990 A1 | 11/2007 | Abolhassami et al. | |
| 2008/0003491 A1 | 1/2008 | Yahnker et al. | |
| 2008/0021590 A1 | 1/2008 | Vanko et al. | |
| 2008/0024044 A1 | 1/2008 | Palmer et al. | |
| 2008/0135268 A1 | 6/2008 | Tadokoro et al. | |
| 2008/0170340 A1 | 7/2008 | Roehm et al. | |
| 2008/0170841 A1 | 7/2008 | Schneider et al. | |
| 2008/0251558 A1 | 10/2008 | Suda | |
| 2008/0265695 A1 | 10/2008 | Yoshida et al. | |
| 2008/0290745 A1 | 11/2008 | Riedl | |
| 2009/0096401 A1 | 4/2009 | Watabe et al. | |
| 2009/0145621 A1 | 6/2009 | Lau et al. | |
| 2009/0160271 A1 | 6/2009 | Bischof et al. | |
| 2009/0200878 A1 | 8/2009 | Walter | |
| 2009/0200972 A1 | 8/2009 | Yasuda et al. | |
| 2009/0237012 A1* | 9/2009 | Yokoyama | H01M 50/51 429/90 |
| 2009/0255361 A1 | 10/2009 | Inagaki et al. | |
| 2009/0295313 A1 | 12/2009 | Suzuki et al. | |
| 2009/0309447 A1 | 12/2009 | Leiber et al. | |
| 2010/0096155 A1 | 4/2010 | Iwata et al. | |
| 2010/0102659 A1 | 4/2010 | Suzuki et al. | |
| 2010/0146797 A1 | 6/2010 | Dreher | |
| 2010/0163266 A1 | 7/2010 | Matsunaga et al. | |
| 2010/0218386 A1 | 9/2010 | Rosskamp | |
| 2010/0218966 A1 | 9/2010 | Liebhard et al. | |
| 2010/0283332 A1 | 11/2010 | Toukairin et al. | |
| 2010/0289442 A1 | 11/2010 | Hatano et al. | |
| 2010/0307782 A1 | 12/2010 | Iwata et al. | |
| 2010/0308673 A1 | 12/2010 | Purohit et al. | |
| 2010/0326804 A1 | 12/2010 | Saur | |
| 2011/0056177 A1 | 3/2011 | Goto | |
| 2011/0068642 A1 | 3/2011 | Takeyama et al. | |
| 2011/0079407 A1 | 4/2011 | Iimura et al. | |
| 2011/0088922 A1 | 4/2011 | Hirayama | |
| 2011/0115314 A1 | 5/2011 | Du et al. | |
| 2011/0163706 A1 | 7/2011 | Miura et al. | |
| 2011/0171887 A1 | 7/2011 | Tanimoto et al. | |
| 2011/0180286 A1 | 7/2011 | Oomori et al. | |
| 2011/0187211 A1 | 8/2011 | Matsunaga et al. | |
| 2011/0227430 A1 | 9/2011 | Omori et al. | |
| 2012/0152583 A1 | 6/2012 | Yanagihara et al. | |
| 2012/0267135 A1 | 10/2012 | Roser | |
| 2012/0292063 A1 | 11/2012 | Forster et al. | |
| 2012/0319508 A1 | 12/2012 | Oomori | |
| 2013/0014967 A1 | 1/2013 | Ito et al. | |
| 2013/0333228 A1 | 12/2013 | Ota et al. | |
| 2014/0008092 A1 | 1/2014 | Yanagihara | |
| 2014/0147718 A1 | 5/2014 | Furui et al. | |
| 2014/0231116 A1 | 8/2014 | Pollock et al. | |

FOREIGN PATENT DOCUMENTS

| | | |
|---|---|---|
| DE | 20315400 U1 | 3/2005 |
| EP | 1729406 B1 | 10/2008 |
| JP | 2001169413 A | 6/2001 |
| JP | 2002064993 A | 2/2002 |
| JP | 2005074613 A | 3/2005 |
| JP | 2007090468 A | 4/2007 |
| JP | 2007283447 A | 11/2007 |
| JP | 2009000779 A | 1/2009 |
| JP | 2009072893 A | 4/2009 |
| JP | 2009083043 A | 4/2009 |
| WO | 9905772 A1 | 2/1999 |
| WO | 2001022561 A1 | 3/2001 |
| WO | 2004059830 A2 | 7/2004 |
| WO | 2004068695 A1 | 8/2004 |
| WO | 2007062766 A1 | 6/2007 |
| WO | 2008014112 A2 | 1/2008 |
| WO | 2009136664 A1 | 11/2009 |
| WO | 2009145205 A1 | 12/2009 |
| WO | 2010047455 A1 | 4/2010 |
| WO | 2010041053 A3 | 4/2011 |

OTHER PUBLICATIONS

Makita Indtrial Power tools, "Makita expands growing line-up of 18V LXT Brhless" <http://www.makitatools.com/en-/Modules/Company/PressReleases.aspx?ID=770> webpage available as early as May 14, 2012.

Protool GmbH, QuaDrive PDC 12-4 TEC PDC 18-4 TEC (Dec. 2011) 108 pages.

Hitachi Koki Co., Ltd., Cordless impact Driver Drill DV14DBL—DV 18DBL (Jul. 2010) 80 pages.

Declaration of Matt Mergener dated Sep. 8, 2017 and Appendix A "power Tool Test Results and Summary", dated Oct. 15, 2012 (9 pages).

Samsung, Specification of Lithium-ion Rechargeable cell for power tools, Model name: INR18650-25R, Mar. 2014 (17 pages).

Kim, "Specification of Product Lithium-ion rechargeable cell for power tools Model name: INR18650-15M", Dec. 2010, Samsung SDI Co, Ltd, Version 3.22 (17 pages).

"Lithium Battery Discharge Cutoff Voltage", 2011, Large Battery, (1 page).

Woodbank Communications Ltd, "Battery Performance Characteristics", 2005, (7 pages).

MIT Electric Vehicle Team, "A Guide to Understanding Battery Specifications", Dec. 2008, (3 pages).

Redcat Racing, "Redcat Racing Sensorless 550 Brushless 2230Kv Motor with 5Mm Shaft," <https://www.amazon.com/Redcat-Racing-Sensorless-Brushless-2230Kv/dp/B004DANIQQ/ref=sr_1_1?child-1&keywords=BS803-024&qid=1607624392&sr=8-1> web page visted Dec. 9, 2020.

Crouzet, "Micromotor Catalogue," Catalog retrieved from <https://www.farnell.com/datasheets/89672.pdf> web page visited Dec. 9, 2020 (196 pages).

ThinGap LLC, "TG2330 DC Brushless Motor," Product Data Sheet retrieved from < https://www.thingap.com/wp-content/themes/ndic/pdf/TG2330.pdf> web page visited Dec. 9, 2020 (3 pages).

Redcat Racing, "BS803-024," <https://www.redcatracing.com/products/bs803-024?variant=30993338335322> web page visited Dec. 9, 2020.

Moog, "BN34 Specifications," Datasheet, revised May 2019, pp. 29-35.

(56) References Cited

OTHER PUBLICATIONS

Gieras, "Advancements in Electric Machines," <https://link.springer.com/content/pdf/10.1007/978-1-4020-9007-3.pdf> 2008, pp. 123-129, retreived on Aug. 9, 2022.

Design World Staff, "500 Watt Brushless DC Motor from Thingap®," <https://www.designworldonline.com/500-Watt-Brushless-DC-Motor-from-thingap/> article dated May 7, 2008, retrived on Aug. 9, 2022.

Control Engineering, "Laminated-Copper DC Brushless Ironless Motors, 250-600 oz-in," <https://www.proquest.com/docview/1023313216?accountid=14753> 2011, retrieved on Aug. 9, 2022.

* cited by examiner

FIG. 12
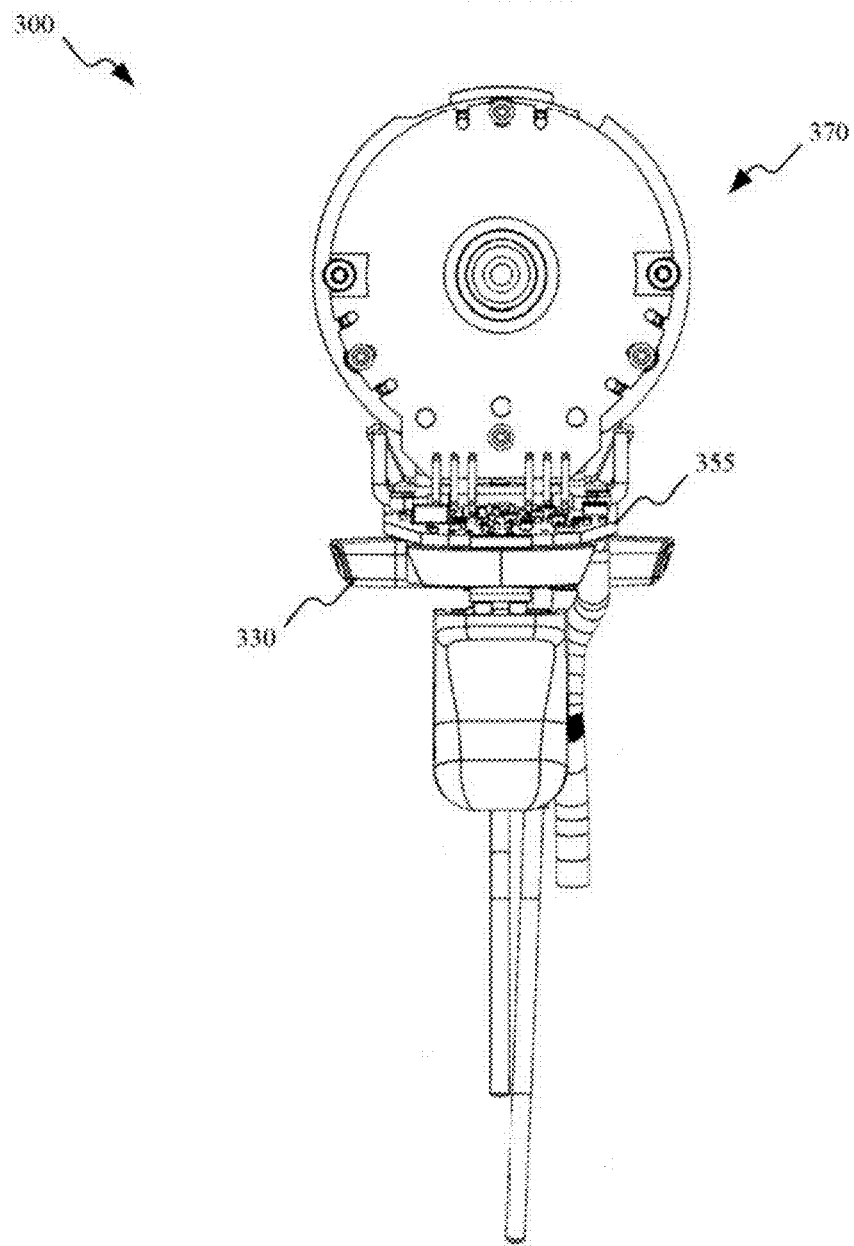
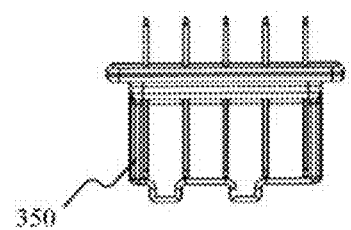

HIGH-POWER CORDLESS, HAND-HELD POWER TOOL INCLUDING A BRUSHLESS DIRECT CURRENT MOTOR

RELATED APPLICATIONS

This application is a continuation of U.S. patent application Ser. No. 18/332,017, filed Jun. 9, 2023, which is a continuation of U.S. patent application Ser. No. 17/809,467, filed on Jun. 28, 2022, which is a continuation of U.S. patent application Ser. No. 17/499,065, filed Oct. 12, 2021, now U.S. Pat. No. 11,370,099, which is a continuation of U.S. patent application Ser. No. 17/085,120, filed Oct. 30, 2020, now U.S. Pat. No. 11,141,851, which is a continuation of U.S. patent application Ser. No. 13/838,126, filed Mar. 15, 2013, now U.S. Pat. No. 10,821,591, which claims the benefit of U.S. Provisional Patent Application No. 61/725,961, filed Nov. 13, 2012, the entire content of each of which is hereby incorporated by reference.

BACKGROUND

The present invention relates to a hand-held power tool that includes a motor and is powered by a battery pack.

SUMMARY

Power tools can generally be grouped into two categories: cordless power tools and corded power tools. Conventionally, regardless of whether a power tool was a cordless power tool or a corded power tool, the power tool included a brushed-type motor (i.e., motor brushes provide an electrical connection to the rotor of the motor).

A different type of motor, brushless-type motors, have not been widely used in power tools as a result of their prohibitively high cost, design considerations necessary for motor control electronics, and difficulties associated with designing a system that is capable of delivering the performance required of a variety of different power tools.

For example, practical considerations for designing a power tool include the application that the power tool will be used for, the performance required or desired of the power tool, the manner in which the power tool is being used, the size of the power tool, the weight of the power tool, the cost of the power tool, etc. Balancing these and other considerations in an optimal manner when designing a power tool dictate the ultimate design of the power tool. However, in some instances, selecting one of the above design considerations often limits the available options for one or more of the remaining design considerations (e.g., small size often reduces the power that can be produced, reducing cost often reduces performance characteristics, increasing the weight limits the applications for which the power tool can be used, etc.).

These limitations are magnified when attempting to manipulate these various design considerations in a power tool that includes a brushless-type motor, as a result of the difficulties associated with harmonizing motor control electronics, power source requirements, and motor capabilities to achieve desired performance and operational characteristics. This is particularly true of the subset of cordless power tools referred to in the art as hand-held power tools (i.e., power tools that are capable of being held in a user's hand and the size and weight of the power tool can be supported by the user).

Such hand-held power tools are real world products. Over the years, many of the basic design considerations related to hand-held power tools have been designed and refined. The results of this design evolution are consistent and established form factors, as well as established standards of performance for a variety of different hand-held power tools (e.g., hammer-drills, drill-drivers, impact drivers, impact wrenches, etc.) and applications of those hand-held power tools.

For example, the form factors for hand-held power tools, whether powered by a battery pack or by alternating current ("AC") power, must have a size, shape, and weight such that they can be hand-held and supported by a user, which imposes practical limitations on, for example, the size and characteristics of the hand-held power tool's motor (e.g., number of motor windings), the size of the gear reduction within the hand-held power tool, the type and size of accessory (e.g., drill bits, saw blades, etc.) connected to the power tool, the torque required to drive that accessory (e.g., larger saw blades generally require greater torque resulting from a deeper cut; denser materials require more torque to cut, etc.), etc. Accordingly, as a result of these considerations, many characteristics of hand-held power tools have either already been decided (e.g., based on the requirements of the type of tool and the application of the tool) or have a relatively limited range of potential variation (e.g., size, weight, etc.). As a result, the performance capabilities of such hand-held power tools have also had a limited range of potential variation.

The three primary electrical components in a cordless hand-held power tool that affect performance are the battery, which provides power to the hand-held power tool, the motor, which drives the output device of the hand-held power tool, and the electronics, which monitor and control the operation of the hand-held power tool. These components can be modified and/or optimized individually or in concert in order to improve the performance of the hand-held power tool.

For example, when designing a motor, a desired outcome may be to produce a motor that is able to deliver the highest output power (i.e., in Watts ["W"]) while maintaining the durability of the hand-held power tool and the motor. In designing such a motor, the motor must also fit within the size and cost constraints for a particular hand-held power tool, as described above. Durability in the context of hand-held power tools generally refers to electrical durability (i.e., the ability of the hand-held power tool to produce both short-term, high or peak levels of current and long-term, sustained high levels of current without causing a fault condition [e.g., overheating]). Similar to motor design, it may be desirable for the battery pack that provides power to the hand-held power tool to deliver the highest possible short-term or short-duration level of current, as well as the highest possible long-term or sustained level of current.

A variety of techniques can be implemented to improve the performance of a hand-held power tool and achieve these desired characteristics. For example, by reducing the resistance (e.g., internal resistance) for one or more of the motor, battery pack, and electronics within the hand-held power tool, the performance of the hand-held power tool can be improved. Another technique includes improving the ability of the hand-held power tool to dissipate the heat that is generated during operation by the battery pack, the motor, switches, etc. Whether one or all of the improvements described herein are implemented, the performance of a hand-held power tool is improved by balancing the design and capabilities of the hand-held power tool's motor, the design and capabilities of the battery pack providing power for the motor, and the design and capabilities of the electronics associated with the hand-held power tool and the battery pack for delivering power from the battery pack to the motor. Balancing these aspects of a hand-held power tool/battery pack combination allows for increased performance (e.g., maximum sustained output power, maximum short-duration output power, etc.), without the hand-held power tool or the battery pack failing (e.g., experiencing a thermal failure).

Accordingly, the invention described herein relates to a cordless, hand-held power tool with improved performance. The hand-held power tool includes a brushless direct current ("BLDC") motor, electronics for controlling and monitoring the operation of the hand-held power tool, and a battery pack that is removably coupled to the hand-held power tool to provide power to the hand-held power tool.

In one embodiment, the invention provides a hand-held power tool connectable to a removable and rechargeable battery pack. The power tool includes a housing, a trigger switch, a plurality of power terminals, a plurality of power switching elements, a motor controller, a BLDC motor, and an output shaft. The trigger switch is configured to selectively output a trigger signal to the motor controller. The power terminals are positioned within the housing of the hand-held power tool and are configured to receive electric current from the battery pack. The power switching elements are positioned within the housing of the hand-held power tool and are electrically connected to the power terminals. The motor controller is electrically connected to the power switching elements and to the trigger switch to receive the trigger signal. The motor controller is configured to selectively enable and disable the power switching elements based on the trigger signal. The BLDC motor is electrically connected to the power switching elements such that the selective enabling and disabling of the power switching elements selectively provides power to the BLDC motor. The hand-held power tool having an average sustained (e.g., long-run) power output of at least approximately 300 Watts. The output shaft coupled to and rotationally driven by the BLDC motor to provide an output force.

In another embodiment, the invention provides a hand-held power tool including a housing, a trigger switch, a first battery terminal, a second battery terminal, a brushless direct-current ("BLDC") motor, a switching array, a controller, and an output shaft. The housing includes a body and a handle portion. The trigger switch is configured to generate a trigger signal. The first battery terminal and the second battery terminal are configured to electrically connect to a battery pack. The battery pack includes a plurality of lithium-based battery cells, and the battery pack is removably coupled to the hand-held power tool. The switching array includes a plurality of switches electrically connected between the BLDC motor and the first battery terminal and the second battery terminal. The controller is configured to receive the trigger signal from the trigger switch, and generate a control signal based on the trigger signal to selectively enable and disable each of the plurality of switches in the switching array to drive the BLDC motor with power provided from the battery pack. The output shaft is coupled to the BLDC motor to provide an output of the hand-held power tool, and the hand-held power tool is operable to produce an average long-duration power output of at least 300 Watts ("W") and a maximum short-duration power output of at least 400 W.

In another embodiment, the invention provides a hand-held power tool including a first battery terminal, a second battery terminal, a brushless direct-current ("BLDC") motor, a switching array, a controller, and an output shaft. The first battery terminal and the second battery terminal are configured to electrically connect to a battery pack. The battery pack includes a plurality of lithium-based battery cells, and the battery pack is removably coupled to the hand-held power tool. The switching array includes a plurality of switches electrically connected between the BLDC motor and the first battery terminal and the second battery terminal. The controller is configured to generate a control signal to selectively enable and disable each of the plurality of switches in the switching array to drive the BLDC motor with power provided from the battery pack. The output shaft is coupled to the BLDC motor to provide an output of the hand-held power tool, and the hand-held power tool is operable to produce a maximum short-duration power output of at least 450 W.

In another embodiment, the invention provides a hand-held power tool including a first battery terminal, a second battery terminal, a brushless direct-current ("BLDC") motor, a switching array, a controller, and an output shaft. The first battery terminal and the second battery terminal are configured to electrically connect to a battery pack. The battery pack includes a plurality of lithium-based battery cells, and the battery pack is removably coupled to the hand-held power tool. The switching array includes a plurality of switches electrically connected between the BLDC motor and the first battery terminal and the second battery terminal. The controller is configured to generate a control signal to selectively enable and disable each of the plurality of switches in the switching array to drive the BLDC motor with power provided from the battery pack. The output shaft is coupled to the BLDC motor to provide an output of the hand-held power tool, and the hand-held power tool is operable to produce a maximum short-duration power output of at least 700 W.

In another embodiment, the invention provides a hand-held power tool connectable to a removable and rechargeable battery pack. The power tool includes a housing, a trigger switch, a plurality of power terminals, a plurality of power switching elements, a motor controller, a BLDC motor, and an output shaft. The trigger switch is configured to selectively output a trigger signal to the motor controller. The power terminals are positioned within the housing of the hand-held power tool and are configured to receive electric current from the battery pack. The power switching elements are positioned within the housing of the hand-held power tool and are electrically connected to the power terminals. The motor controller is electrically connected to the power switching elements and to the trigger switch to receive the trigger signal. The motor controller is configured to selectively enable and disable the power switching elements based on the trigger signal. The BLDC motor is electrically connected to the power switching elements such that the selective enabling and disabling of the power switching elements selectively provides power to the BLDC motor. The hand-held power tool having a peak (e.g., short-run) power output of at least approximately 400 Watts. The output shaft coupled to and rotationally driven by the BLDC motor to provide an output force.

In another embodiment, the invention provides a hand-held power tool connectable to a removable and rechargeable battery pack. The power tool includes a housing, a trigger switch, a plurality of power terminals, a plurality of power switching elements, a motor controller, a BLDC motor, and an output shaft. The trigger switch is configured to selectively output a trigger signal to the motor controller. The power terminals are positioned within the housing of the hand-held power tool and are configured to receive electric current from a power source. The power switching elements are positioned within the housing of the hand-held power tool and are electrically connected to the power terminals. The motor controller is electrically connected to the power switching elements and to the trigger switch to receive the trigger signal. The motor controller is configured to selectively enable and disable the power switching elements based on the trigger signal. The BLDC motor is electrically connected to the power switching elements such that the selective enabling and disabling of the power switching elements selectively provides power to the BLDC motor. The BLDC motor has a maximum sustained power output of at least 1.0 watts per second when discharging a battery pack throughout a discharge cycle (i.e., until the battery pack reaches a low-voltage cutoff). The output shaft is coupled to and rotationally driven by the BLDC motor to provide an output force.

In another embodiment, the invention provides a hand-held power tool connectable to a removable and rechargeable battery pack. The power tool includes a housing, a trigger switch, a plurality of power terminals, a plurality of power switching elements, a motor controller, a BLDC motor, and an output shaft. The trigger switch is configured to selectively output a trigger signal to the motor controller. The power terminals are positioned within the housing of the hand-held power tool and are configured to receive electric current from a power source. The power switching elements are positioned within the housing of the hand-held power tool and are electrically connected to the power terminals. The motor controller is electrically connected to the power switching elements and to the trigger switch to receive the trigger signal. The motor controller is configured to selectively enable and disable the power switching elements based on the trigger signal. The BLDC motor is electrically connected to the power switching elements such that the selective enabling and disabling of the power switching elements selectively provides power to the BLDC motor. The hand-held power tool having an average sustained (e.g., long-run) torque output of at least approximately 95 inch-pounds. The output shaft coupled to and rotationally driven by the BLDC motor to provide an output force.

Other aspects of the invention will become apparent by consideration of the detailed description and accompanying drawings.

BRIEF DESCRIPTION OF THE DRAWINGS

FIGS. 8-12 illustrate a hand-held power tool according to another embodiment of the invention.

DETAILED DESCRIPTION

Figure 1:
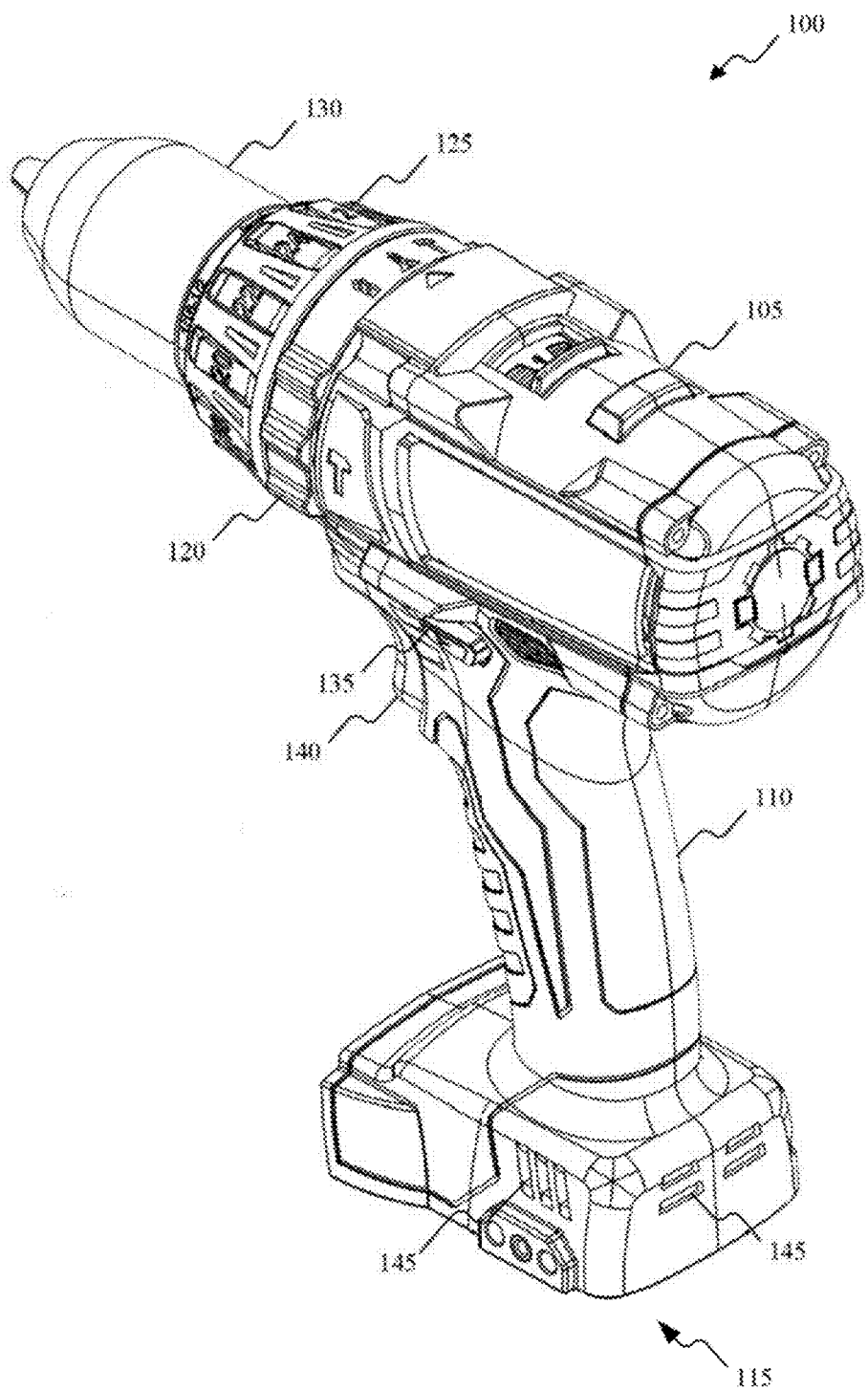
FIGS. 1-7 illustrate a hand-held power tool according to an embodiment of the invention.
Figure 2:
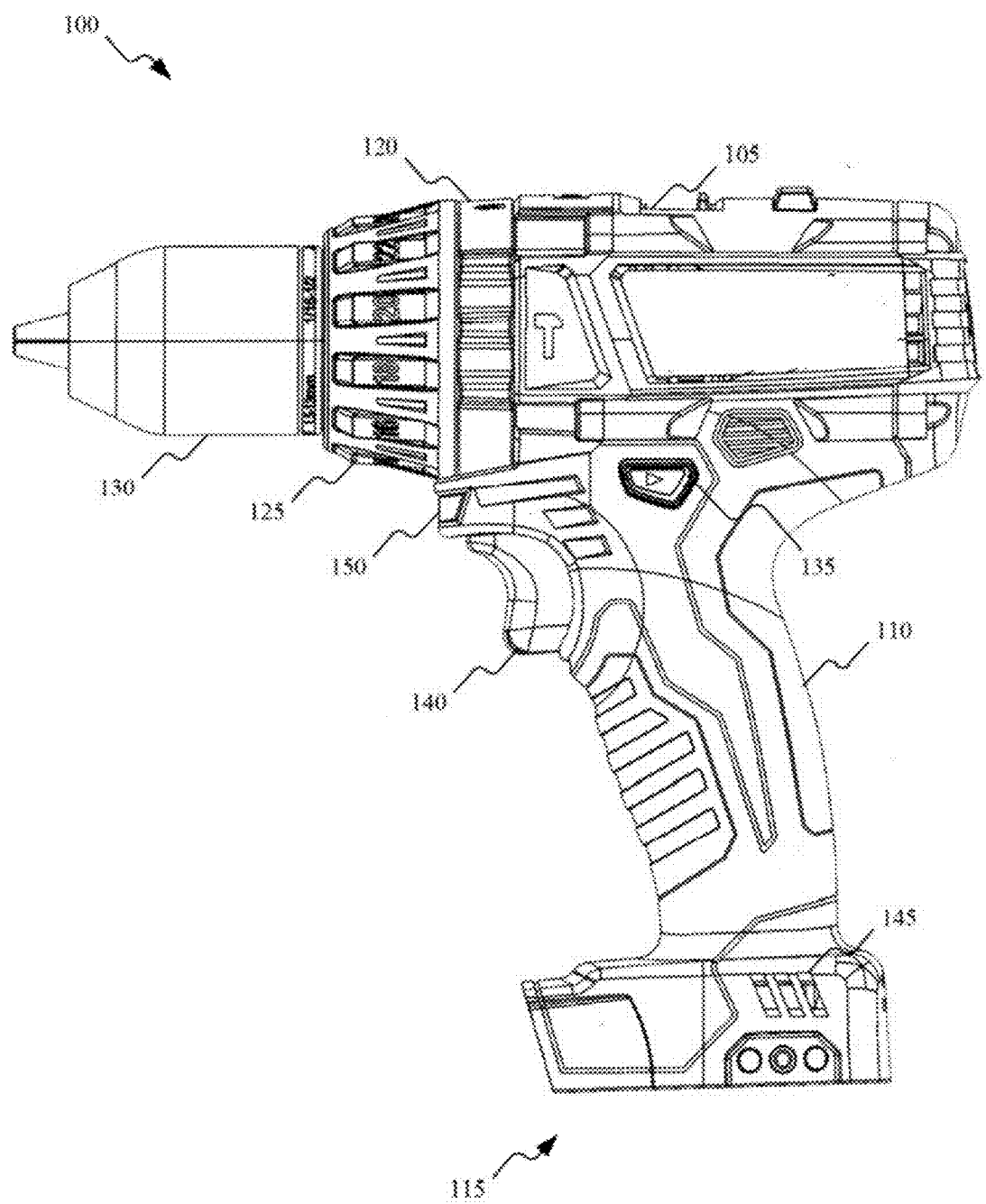
Figure 3:
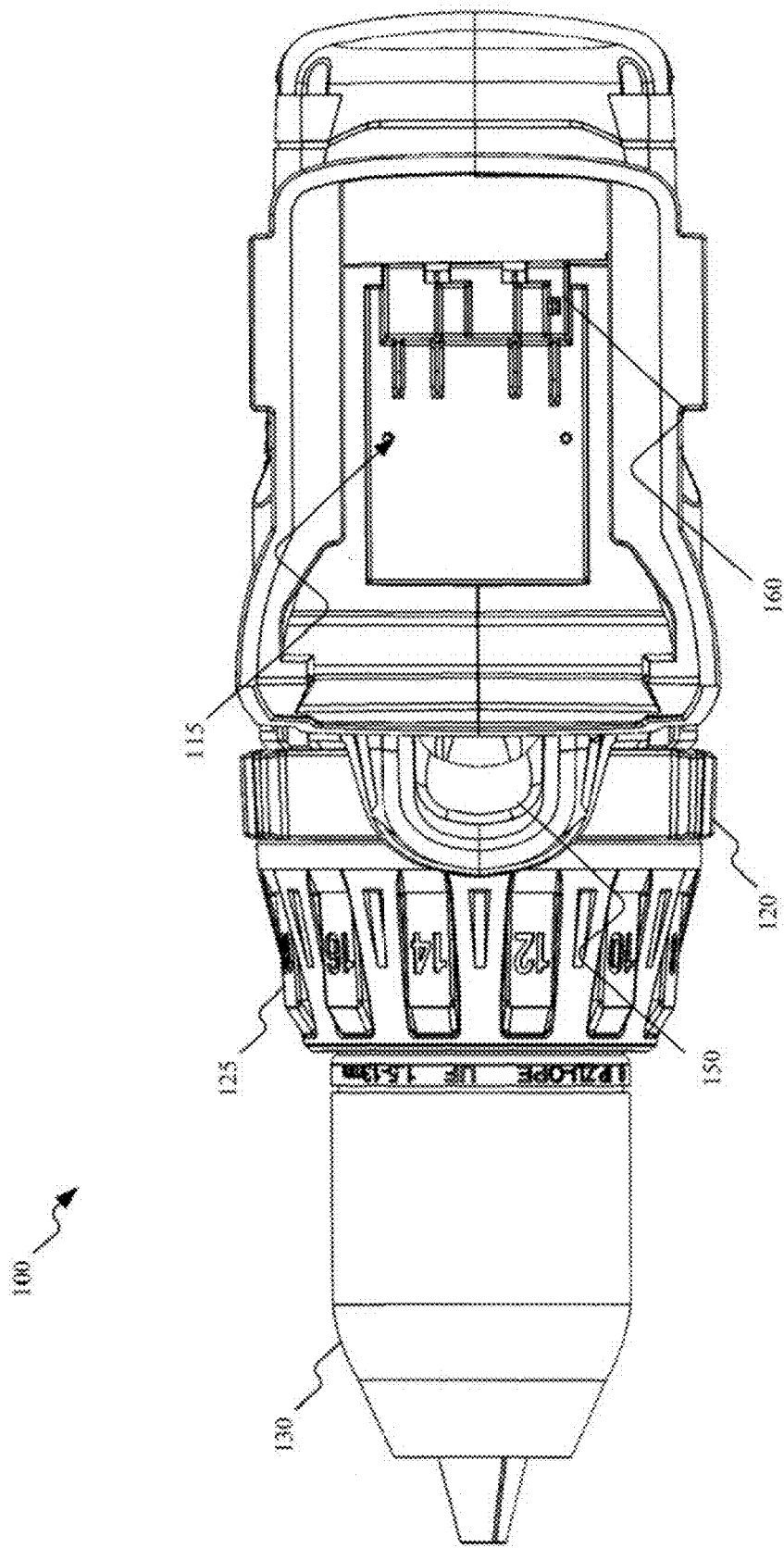

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Embodiments of the invention described herein related to a compact cordless, hand-held power tool that includes a brushless direct current ("BLDC") motor. The hand-held power tool includes, for example, a housing, a motor, control electronics, a battery pack connectable to and supportable by the housing, one or more terminals for electrically connecting the battery pack to the control electronics, a trigger, and an output device or mechanism to be driven by the motor. The specific components of the hand-held power tool will be described in greater detail below with respect to specific, exemplary hand-held power tools. The hand-held power tool can be, for example, a hammer drill/driver, a drill/driver, an impact driver, and impact wrench, etc.

Each of the exemplary hand-held power tools described herein includes a battery pack, electronics, and a BLDC motor that have been designed to produce a high-performance-capable (e.g., high-power, high-current, high-torque) hand-held power tool. For example, the hand-held power tool is capable of delivering higher instantaneous (i.e., short duration) current to the BLDC motor for short-duration high power operation, and higher continuous (i.e., long duration) current to the BLDC motor for long-duration high power operation than any cordless, hand-held power tool before it. Additionally, the short and long duration power is capable of being provided in a smaller (in size) and lighter (in weight) package than any hand-held power tool before it. The hand-held power tools described herein strike a balance between the short-duration delivery of current and power, as well as the long-duration (i.e., continuous) delivery of current and power in order to provide a high-performance, high-power brushless hand-held power tool that is capable of being used in a variety of different applications and under a variety of different conditions to meet the needs of a variety of different users.

The hand-held power tools match and balance the capabilities of the BLDC motor, the battery pack, and the electronics. These three components of the hand-held power tool represent the three most significant potential "weak links" for the hand-held power tool. For example, if too much current is drawn from the battery pack by the motor and the power tool electronics, the battery pack, or the battery cells within the battery pack, can overheat, reach an over-current condition, etc. In such an instance, the battery pack shuts down in order to prevent a catastrophic failure (i.e., a lithium-based battery cell or battery pack is destroyed, suffers irreversible damage, or is rendered inoperable).

Alternatively, if the battery pack provides too much current or the motor draws too much current, the electronics within the hand-held power tool can also fail. For example, electrical and electronic components such as field-effect transistors ("FETs"), wires, integrated circuits ("ICs"), etc., have current and temperature ratings which, if exceeded, will cause the electrical and electronic components to fail.

In order to maximize the performance capabilities of a hand-held power tool, the limits of these components should be considered and balanced. Otherwise, if a user attempts to operate the hand-held power tool at a current or power level that exceeds the operational capabilities of the hand-held power tool, the hand-held power tool, in one or more places, may fail. Accordingly, by balancing the capabilities of the hand-held power tool's motor (e.g., the current and power that can be provided to the motor) with the capabilities of the battery pack providing power for the motor (i.e., the maximum current and power than can be provided to the hand-held power tool) and the capabilities of the electronics associated with the hand-held power tool and the battery pack for delivering power from the battery pack to the motor (e.g., ensuring that the electronics do not fail under high-power or high-performance operating conditions), the performance capabilities of the hand-held power tool are increased or maximized without the hand-held power tool of the battery pack failing (e.g., experiencing a thermal failure or another fault condition).

The cordless, hand-held power tool illustrated in FIGS. 1-7 is a hammer drill/driver ("hammer drill") 100. The hammer drill 100 includes an upper main body 105, a handle portion 110, a battery pack receiving portion 115, a mode selection portion 120 (e.g., for selecting among a drilling mode, a driving mode, a hammer mode, etc.), a torque adjustment dial or ring 125, an output drive device or mechanism (e.g., a chuck) 130, a forward/reverse selection button 135, a trigger 140, and air vents 145. The hammer drill 100 also includes a worklight 150, and the battery pack receiving portion 115 receives a battery pack (see FIGS. 36-43) and includes a terminal assembly 160 including a plurality of terminals. The number of terminals present in the receiving portion 115 can vary based on the type of hand-held power tool. However, as an illustrative example, the receiving portion and the terminal assembly can include a battery positive ("B+") terminal, a battery negative ("B−") terminal, a sense or communication terminal, an identification terminal, etc. The outer portions or housing of the hammer drill 100 (e.g., the main body 105 and the handle portion 110) are composed of a durable and light-weight plastic material. The drive mechanism (described below) is composed of a metal (e.g., steel) as is known in the art.

The battery positive and battery negative terminals are operable to electrically connect the battery pack to the hand-held power tool and provide operational power (i.e., voltage and current) for the hand-held power tool from the battery pack to the hand-held power tool. The sensor or communication terminal is operable to provide communication or sensing for the hand-held power tool of the battery pack. For example, the communication can include serial communication or a serial communication link, the transmission or conveyance of information from one of the battery pack or the hand-held power tool to the other of the battery pack or hand-held power tool related to a condition or characteristic of the battery pack or hand-held power tool (e.g., one or more battery cell voltages, one or more battery pack voltages, one or more battery cell temperatures, one or more battery pack temperatures, etc.).

The identification terminal can be used by the battery pack or the hand-held power tool to identify the other of the battery pack or the hand-held power tool. For example, the hand-held power tool can identify the battery pack as a high capacity battery pack or a normal capacity battery pack, as a lithium-based battery or a nickel-based battery, as a battery pack having a particular voltage (described below), a higher resistance battery pack, a lower resistance battery pack, etc. Additionally or alternatively, the battery pack can identify the hand-held power tool as a hammer drill, a drill/driver, an impact driver, an impact wrench, a brushless power tool, a brushed power tool, a higher resistance power tool (e.g., capable of lower power output), a lower resistance power tool (e.g., capable of higher power output), etc.

Figure 4:
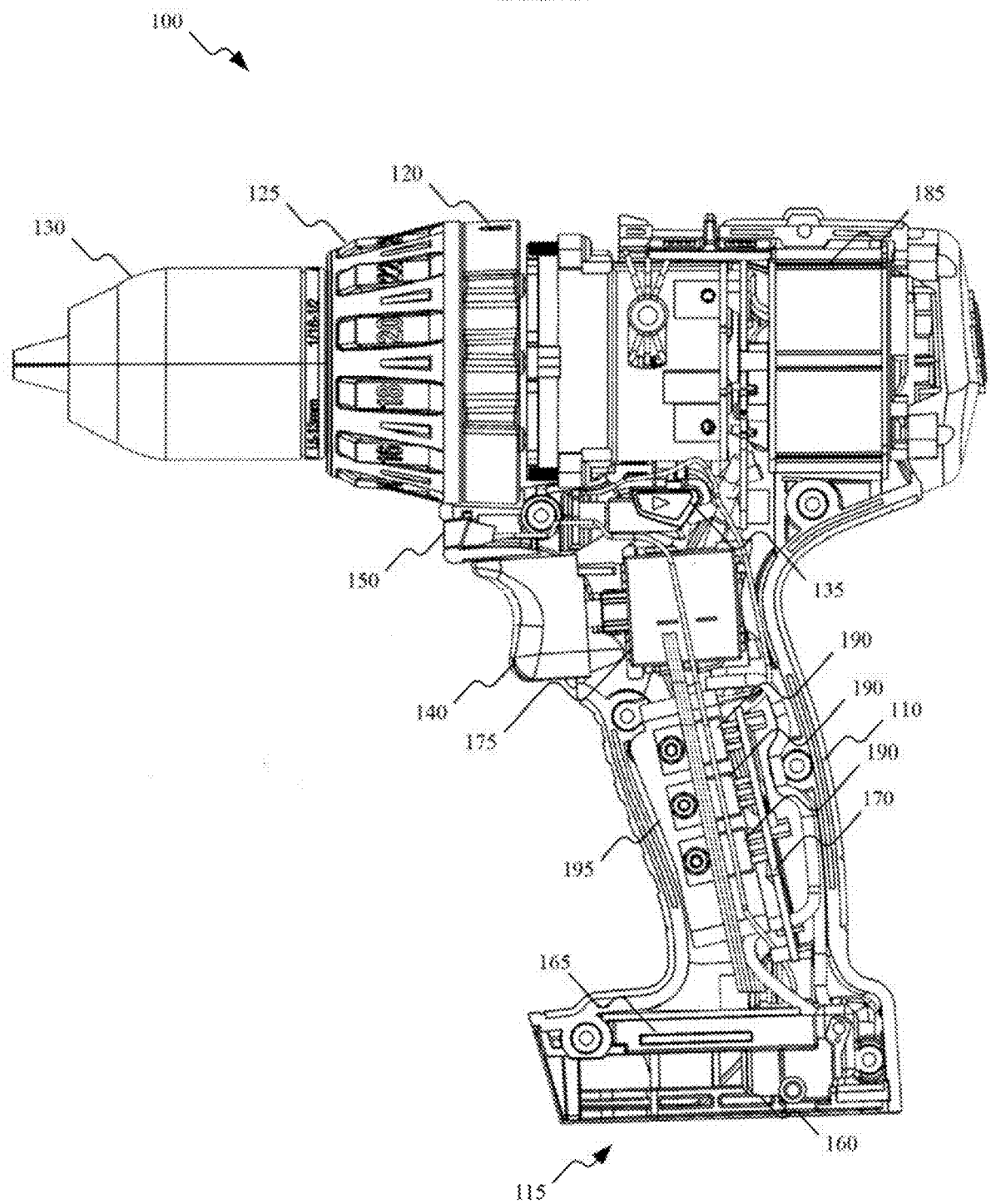
Figure 5:
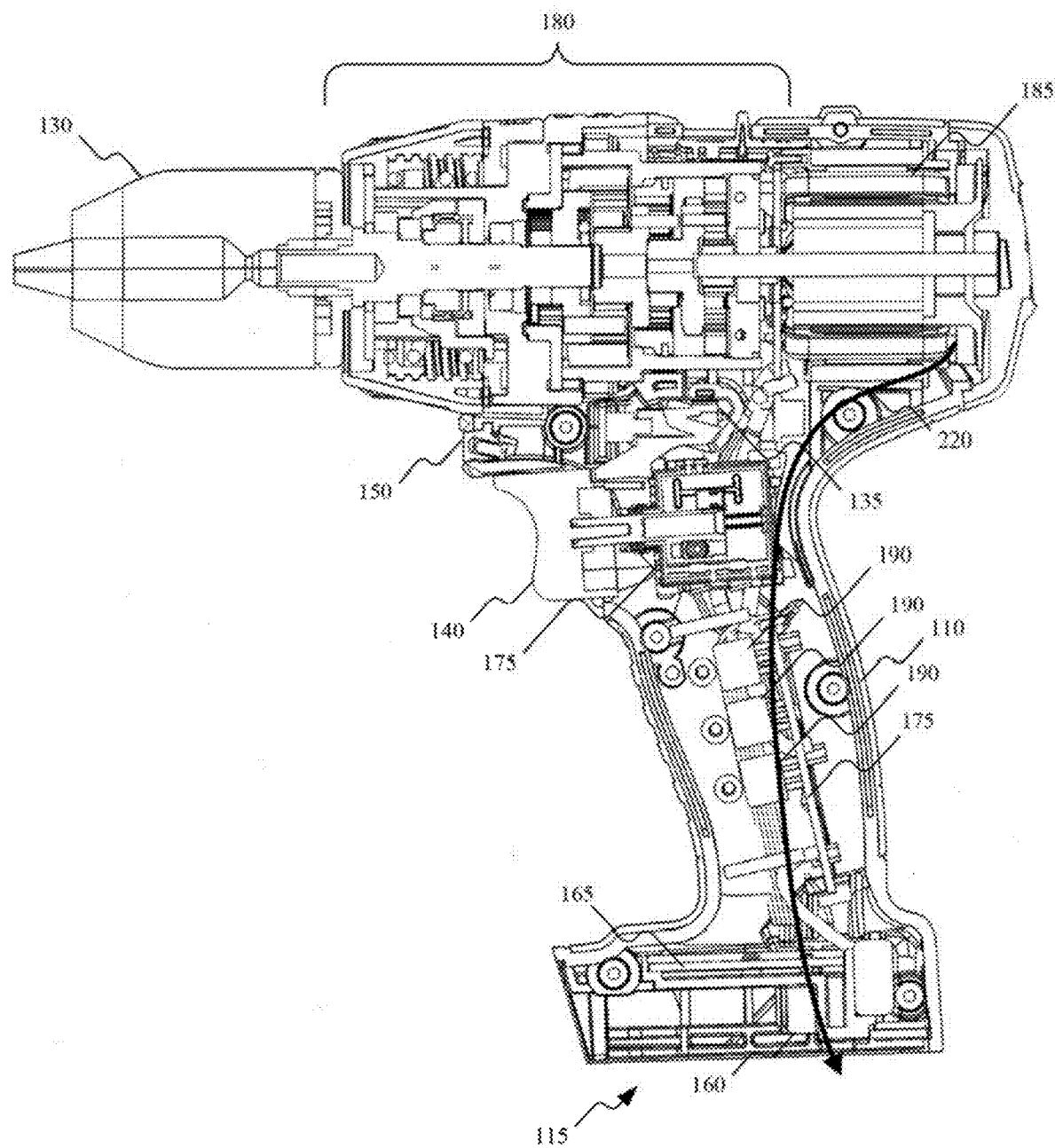

As illustrated in FIGS. 4 and 5, the hammer drill 100 also includes, among other things, a control printed circuit board ("PCB") 165, a switching FET PCB 170, a switch 175 connected to the trigger 140, a drive mechanism 180, the chuck 130, and a brushless direct current ("BLDC") motor 185. In some embodiments, the drive mechanism 180 can include a gear assembly, a mode selection mechanism, a clutch assembly, etc. The control PCB 165 is positioned near the terminal assembly 160 and controls the operation of the hammer drill 100 based on sensed or stored characteristics and parameters of the hammer drill. For example, the control PCB 165 is operable to control the selective application of power to the motor 185. The switching FET PCB 170 includes a series of switching FETs 190 for controlling the application of power to the BLDC motor 185 based on electrical signals received from the control PCB 165 and a heat sink 195 (e.g., an aluminum, aluminum-alloy, copper, etc., heat sink). In some embodiments, the switching FETs 190 are directly coupled (i.e., directly physically and/or thermally coupled) to the heat sink 195 (e.g., directly on the heat sink, via copper tracings on a PCB, etc.). In other embodiments, the switching FETs 190 are not directly coupled to the heat sink 195, but are in a heat transfer relationship with the heat sink 195. The switching FET PCB 170 includes, for example, six switching FETs 190 (only three are illustrated in the profile-views of FIGS. 4 and 5). The FETs have a low drain-to-source resistance, such as below approximately 3.0 milli-Ohms. In some embodiments, the drain-to-source resistance of the FETs is between approximately 1.4 milli-Ohms and 2.0 milli-Ohms. In other embodiments, the drain-to-source resistance of the FETs has any value between approximately 1.0 milli-Ohms and 10.0 milli-Ohms.

By using lower resistance FETs in combination with, for example, the heat sinking and airflow characteristics of the hand-held power tool described below, the heat generated by switching FETs is capable of being controlled and regulated more effectively by the hand-held power tool to enable increased drive currents to be passed through the switching FETs and provided to the motor 185. For example, the Joule heating associated with passing high currents to the motor 185 are proportional to the value of the current squared multiplied by resistance. By reducing the resistance between the battery pack and the motor 185, the amount of Joule heating that results from the motor drawing high currents is reduced. Thus, the hand-held power tool is less susceptible to thermal failure when the motor 185 draws high currents, and can generate greater output power. In some embodiments, the FETs are, for example, IRLB3034PbF FETs from International Rectifier, El Segundo, California. The number of switching FETs included in a hand-held power tool is related to, for example, the desired commutation scheme for the motor. The embodiments of the hammer drill described herein are with respect to a six-step commutation scheme that includes six switching FETS 190 and six stator coils (e.g., composed of copper). In other embodiments, additional or fewer switching FETs and stator coils can be employed (e.g., 4, 8, 12, 16, between 4 and 16, etc.).

The electronics illustrated in FIGS. 4 and 5 include multiple PCB's located in various portions of the hammer drill 100. The hammer drill 100 can, however, include different PCB configurations than the configuration illustrated in FIGS. 4 and 5. For example, the hammer drill can include the "surfboard" PCB illustrated in and described with respect to FIGS. 10-12. The hammer drill 100 can also include the "doughnut" PCB illustrated in and described with respect to FIGS. 49 and 50. The differences between the various PCB configurations are described below. For example, each PCB configuration may result in a different weight for the electronics package of the hammer drill 100. However, each of the PCB configurations described herein has approximately the same total weight. The PCB configuration can also affect, for example, the location and number of external air vents, the location and size of heat sinks, etc., which can impact the performance characteristics of the hammer drill.

The drive mechanism 180 is operable to reduce the speed of a rotating motor shaft to a speed that is suitable for the hammer drill 100. The drive mechanism 180 is coupled to the chuck 130 for driving an output device (e.g., a drill bit, etc.). The drive mechanism 180 is not described in detail herein because the characteristics of the drive mechanism 180 can vary from one type of hand-held power tool to another depending upon the particular action that the hand-held power tool is performing (e.g., the action of an impact wrench is different from the action of a drill/driver). However, the BLDC motor is described in greater detail below. The hammer drill 100 also includes additional internal components and mechanisms illustrated in FIGS. 4 and 5 that are not explicitly described herein but are known to those skilled in the art (e.g., a gear assembly, a clutch, etc.).

Figure 6:
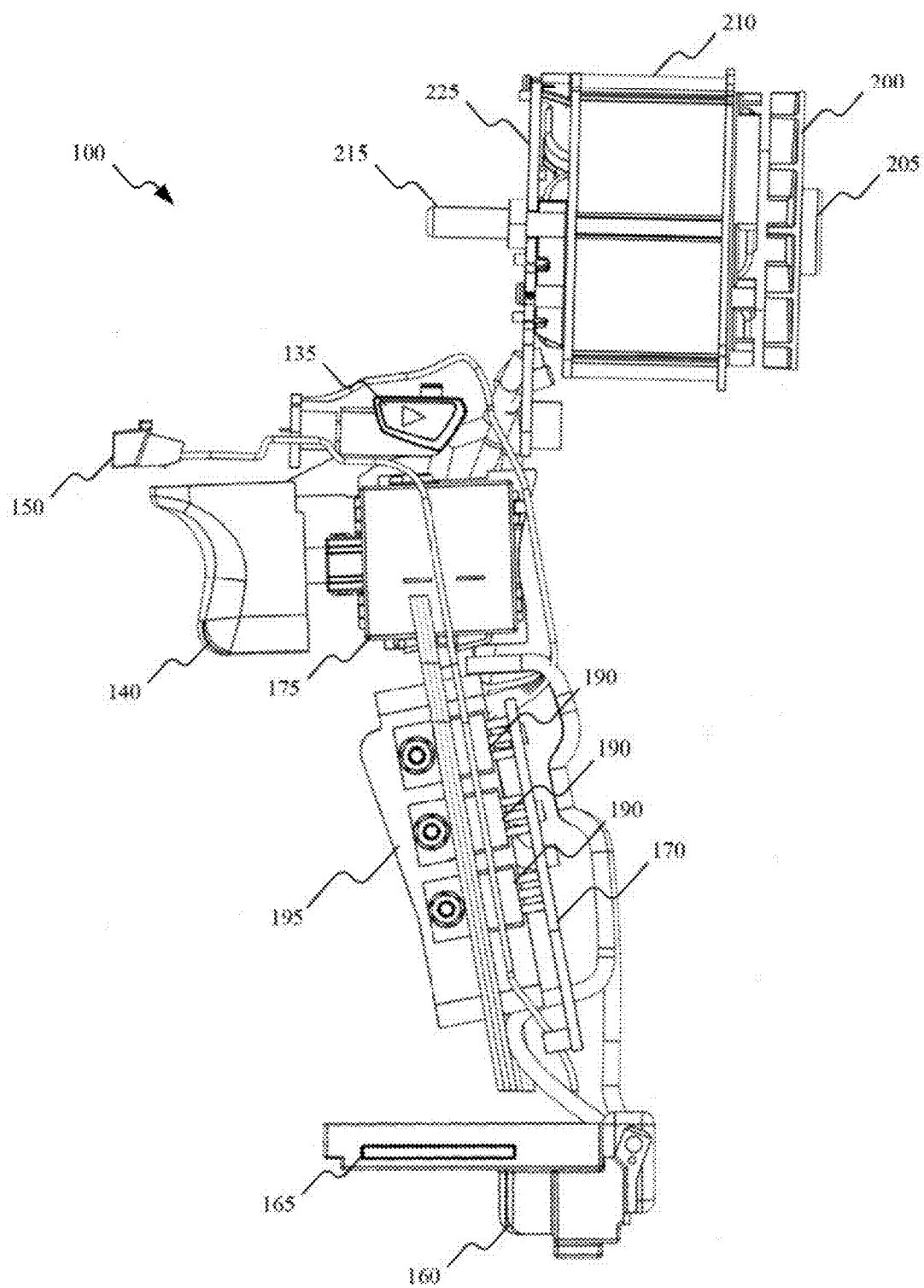
Figure 7:
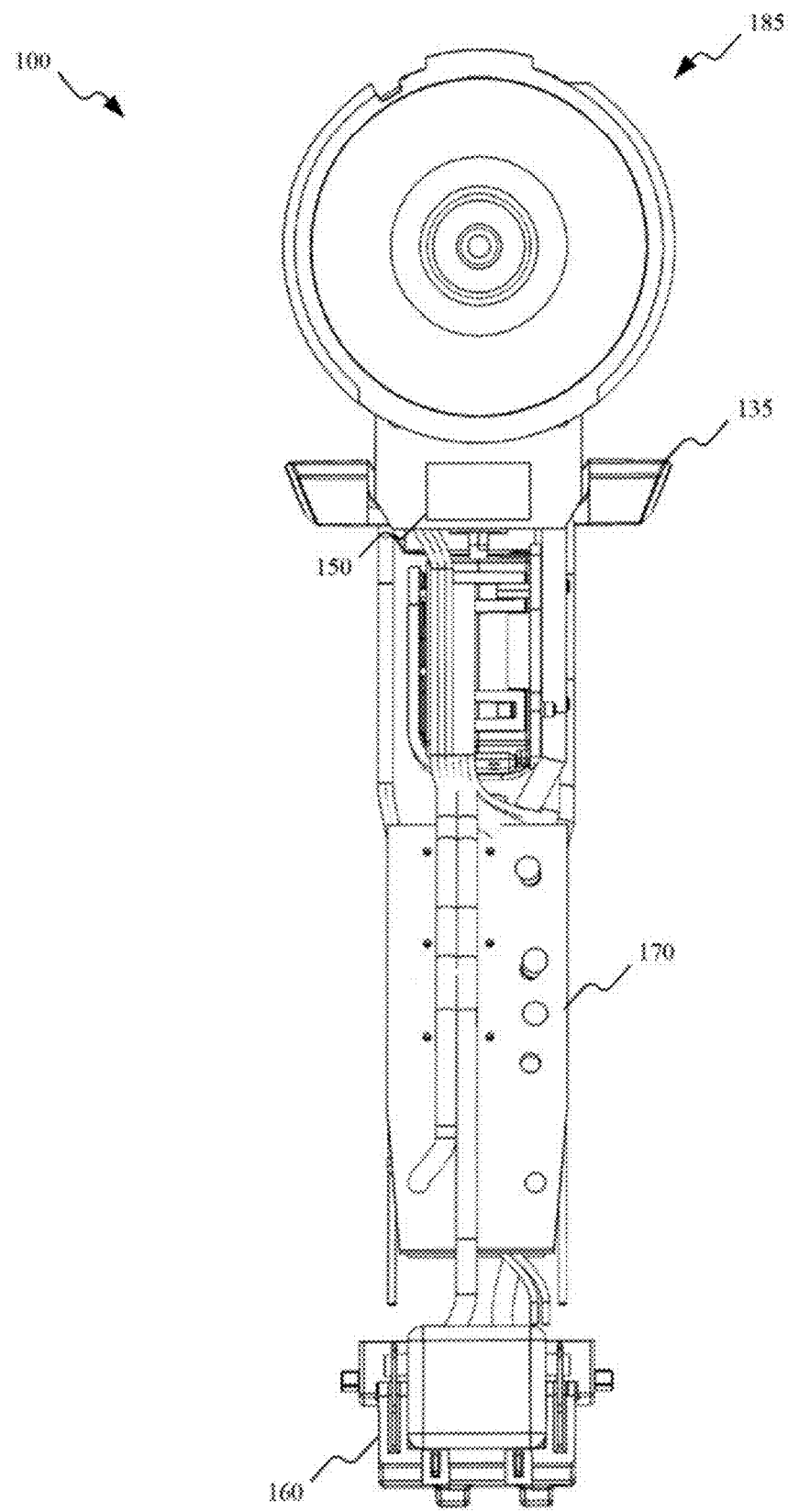
Figure 8:
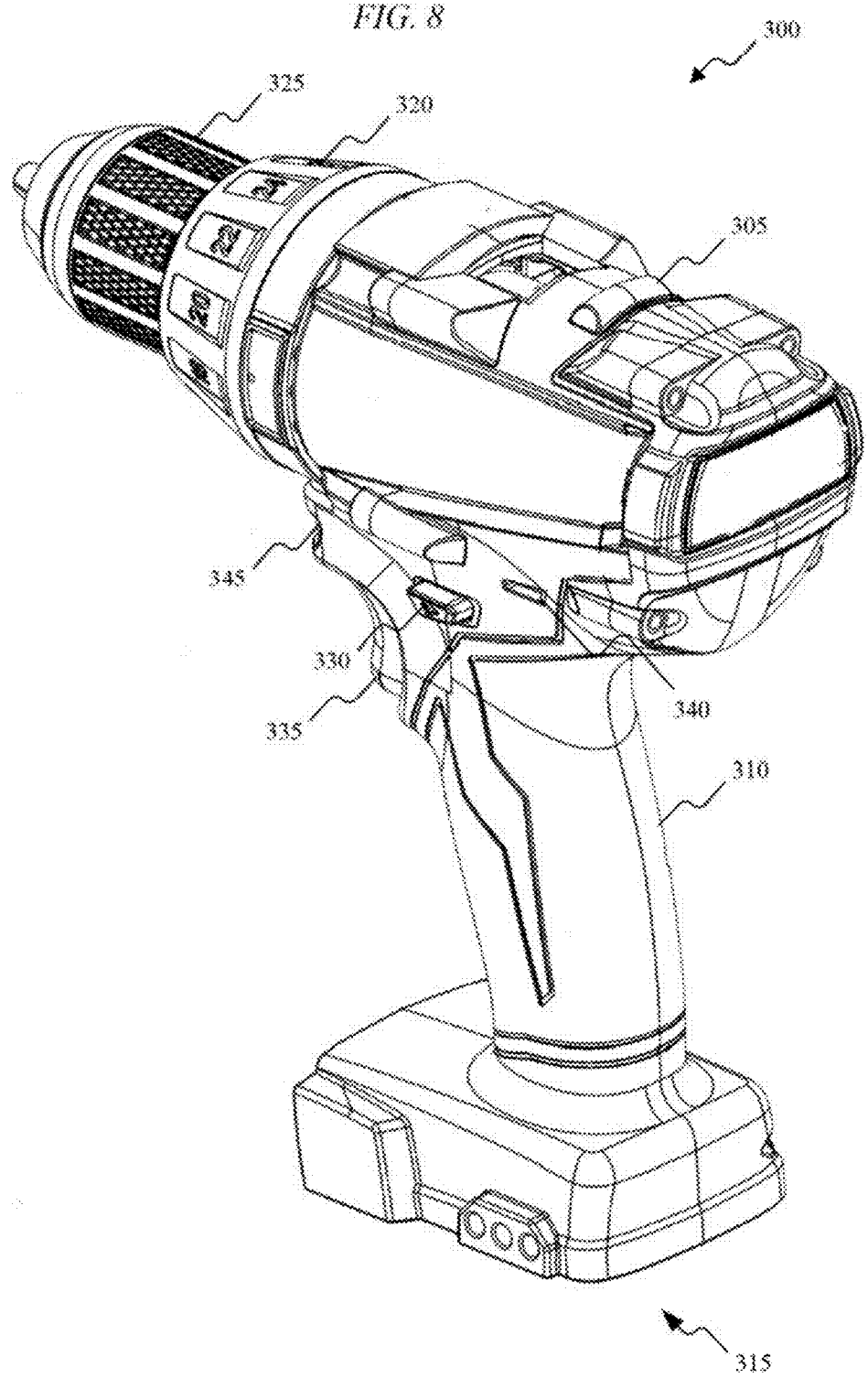
Figure 9:
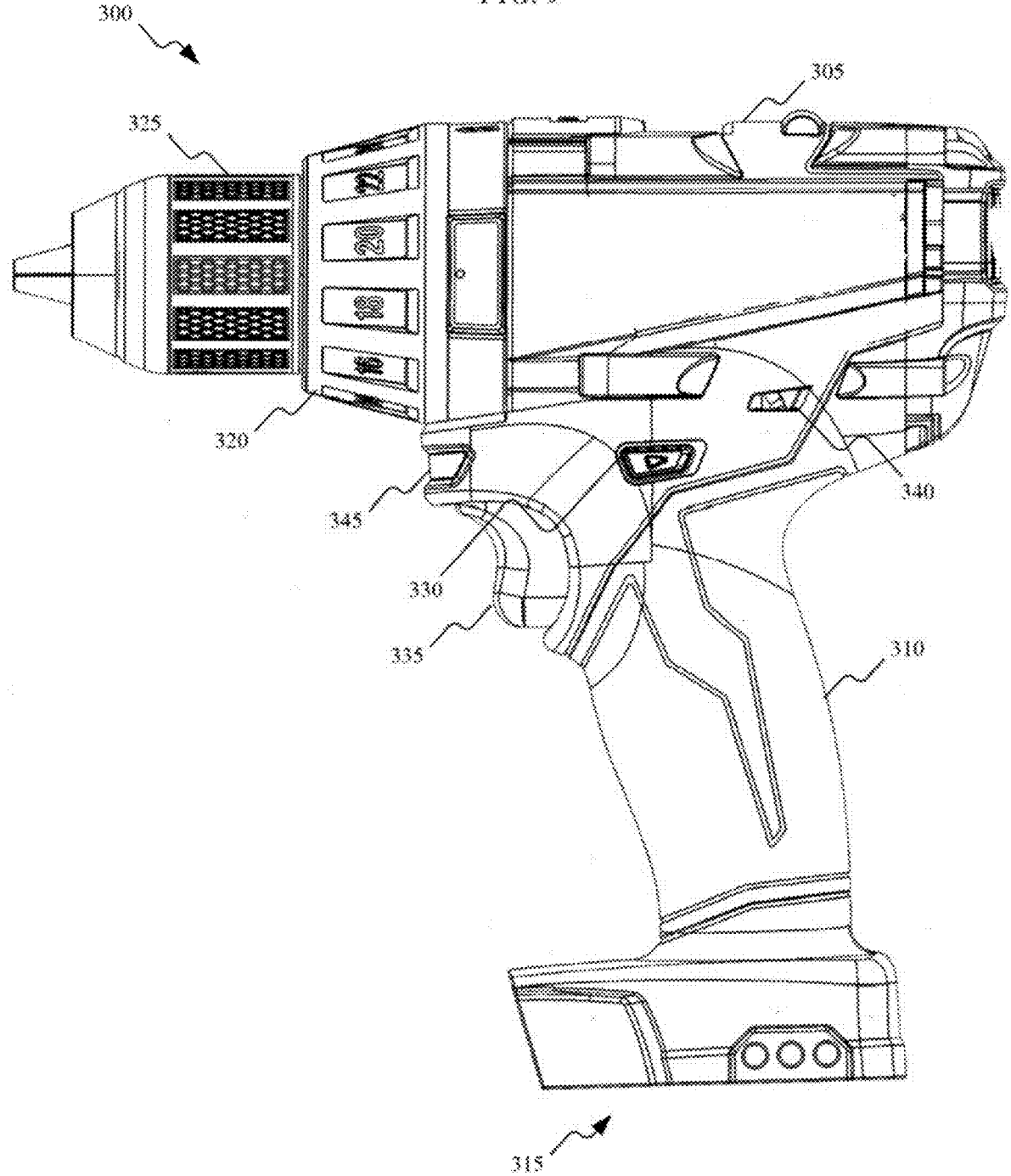

FIGS. 6 and 7 illustrate selected portions of the hammer drill 100. For example, FIGS. 6 and 7 illustrate the electronics and the motor of the hammer drill 100. Although the motor is described in greater detail below, for the sake of clarity and context, the motor 185 includes, among other things, a fan 200 (e.g., plastic, metal, etc.), bearings 205, a stator 210 (described below), a rotor (described below), and a shaft 215. The fan 200 is operable to force air 220 (see FIG. 5) over the switching FETs 190 of the switching FET PCB 170 to improve the dissipation of heat from the switching FETs 190. The air exits the hand-held power tool through the vents 145. The electronics include the control PCB 165, the switching FET PCB 170, the switching FETS 190, the trigger 140 and associated switch 175, the worklight 150, the forward/reverse switch 135, the heat sink 195, and a Hall effect PCB 225, as well as assorted wires (e.g., 14AWG wires for providing power from the battery pack to the motor) and other components for connection, protection, and operation of the hammer drill 100. In general, the electronics include all portions of the hammer drill 100 minus the following: the housing, the battery pack, mechanical components (e.g., a gear assembly, a clutch, the chuck 130, etc.), and the motor 185. The remaining portions of the hammer drill 100 are considered the "electronics" (e.g., PCBs, wires, switches, terminals, sensors, LEDs, etc.).

The hammer drill 100, for example, can be powered by an 18V battery pack. The hammer drill 100 can operate at two speeds (e.g., 0-550 RPM or 0-1850 RPM), generate 725 in-lbs of maximum torque (i.e., stall torque), produce approximately 31,450 blows per minute ("BPM"), and weigh only approximately 5.0 lbs with a ten-cell extra-capacity battery pack (e.g., 3.0 Ah), such as the M18™ XC High Capacity REDLITHIUM™ battery pack, manufactured and sold by Milwaukee Electric Tool, Milwaukee, Wisconsin, or the battery packs as described below. In some embodiments, the hammer drill and extra-capacity battery pack weigh less than approximately 5.0 lbs. In other embodiments, the hammer drill and the extra-capacity battery pack weigh between approximately 4.0 lbs and approximately 5.0 lbs, or between approximately 4.0 lbs and approximately 5.5 lbs.

If, for example, a five-cell regular-capacity battery pack were used to power the hammer drill 100, the hammer drill 100 can operate at two speeds (e.g., 0-550 RPM or 0-1850 RPM), generate 650 in-lbs of maximum torque (i.e., stall torque), produce approximately 31,450 BPM, and weigh only approximately 4.5 lbs with the five-cell regular-capacity battery pack (e.g., 1.5 Ah), such as the M18™ RED-LITHIUM™ 2.0 compact battery pack, manufactured and sold by Milwaukee Electric Tool, Milwaukee, Wisconsin, of the battery packs as described below. In some embodiments, the hammer drill and regular-capacity battery pack weigh less than approximately 4.5 lbs. In other embodiments, the hammer drill and the regular-capacity battery pack weigh between approximately 3.5 lbs and approximately 4.5 lbs, or between approximately 3.5 lbs and approximately 5.0 lbs.

The cordless, hand-held power tool illustrated in FIGS. 8-12 is a drill/driver 300. The drill/driver 300 includes an upper main body 305, a handle portion 310, a battery pack receiving portion 315, a torque adjustment dial or ring 320, an output drive device or mechanism 325, a forward/reverse selection button 330, a trigger 335, and air vents 340. The drill/driver 300 also includes a worklight 345, and the battery pack receiving portion 315 receives a portion of a battery pack (see FIGS. 36-43) and includes a terminal assembly 350 including a plurality of terminals. The number of terminals present in the receiving portion 315 can vary based on the type of hand-held power tool. However, as an illustrative example, the receiving portion and the terminal assembly can include a battery positive ("B+") terminal, a battery negative ("B−") terminal, a sense or communication terminal, an identification terminal, etc. The outer portions or housing of the drill/driver 300 (e.g., the main body 305 and the handle portion 310) are composed of a durable and light-weight plastic material. The drive mechanism (described below) is composed of a metal (e.g., steel) as is known in the art.

The battery positive and battery negative terminals are operable to electrically connect the battery pack to the hand-held power tool and provide operational power (i.e., voltage and current) for the hand-held power tool from the battery pack to the hand-held power tool. The sensor or communication terminal is operable to provide for communication or sensing for the hand-held power tool of the battery pack. For example, the communication can include serial communication or a serial communication link, the transmission or conveyance of information from one of the battery pack or the hand-held power tool to the other of the battery pack or hand-held power tool related to a condition or characteristic of the battery pack or hand-held power tool (e.g., one or more battery cell voltages, one or more battery pack voltages, one or more battery cell temperatures, one or more battery pack temperatures, etc.).

The identification terminal can be used by the battery pack or the hand-held power tool to identify the other of the battery pack or the hand-held power tool. For example, the hand-held power tool can identify the battery pack as a high capacity battery pack or a normal capacity battery pack, as a lithium-based battery or a nickel-based battery, as a battery pack having a particular voltage (described below), a higher resistance battery pack, a lower resistance battery pack, etc. Additionally or alternatively, the battery pack can identify the hand-held power tool as a hammer drill, a drill/driver, an impact driver, an impact wrench, a brushless power tool, a brushed power tool, a higher resistance power tool (e.g., capable of lower power output), a lower resistance power tool (e.g., capable of higher power output), etc.

Figure 10:
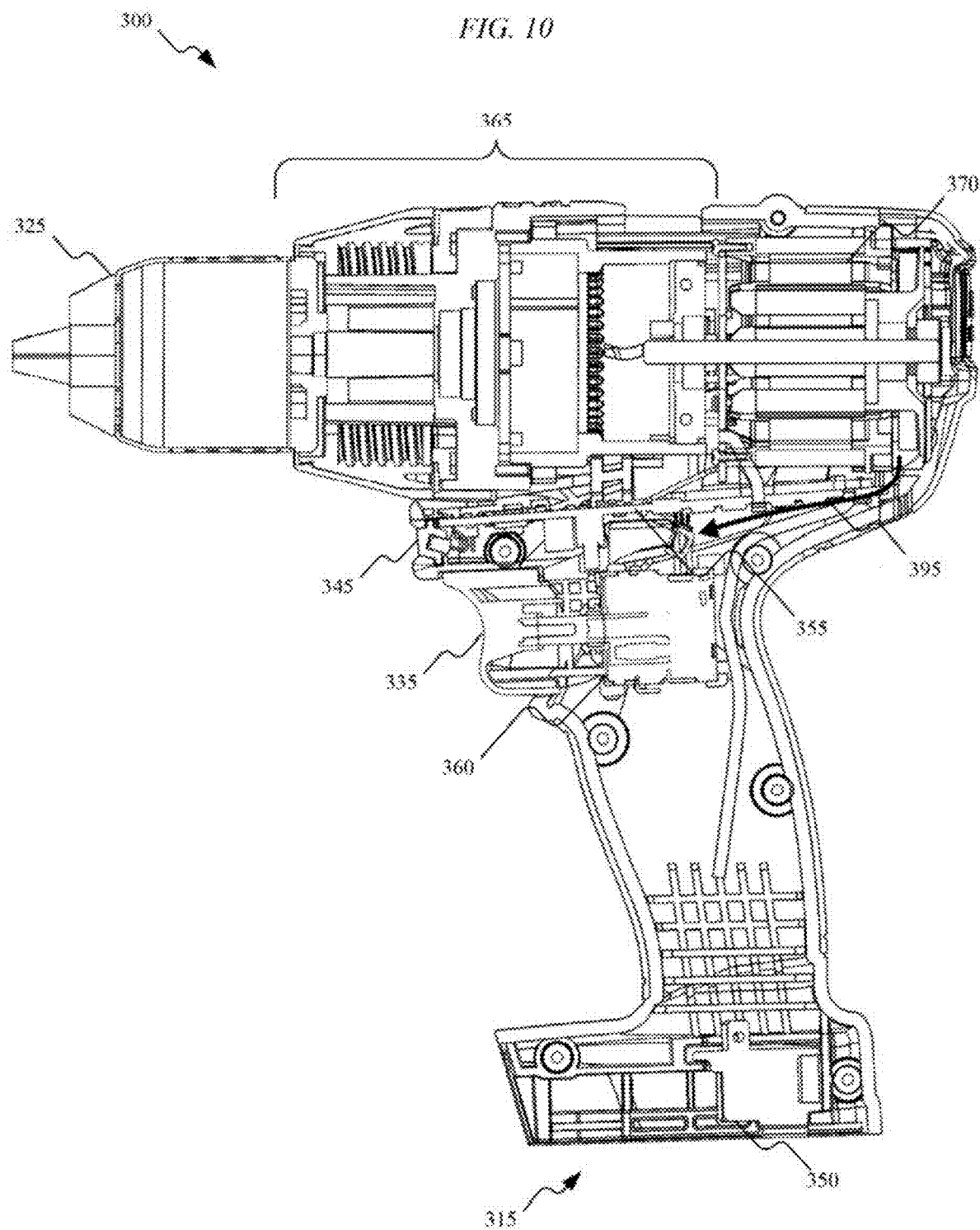
Figure 11:
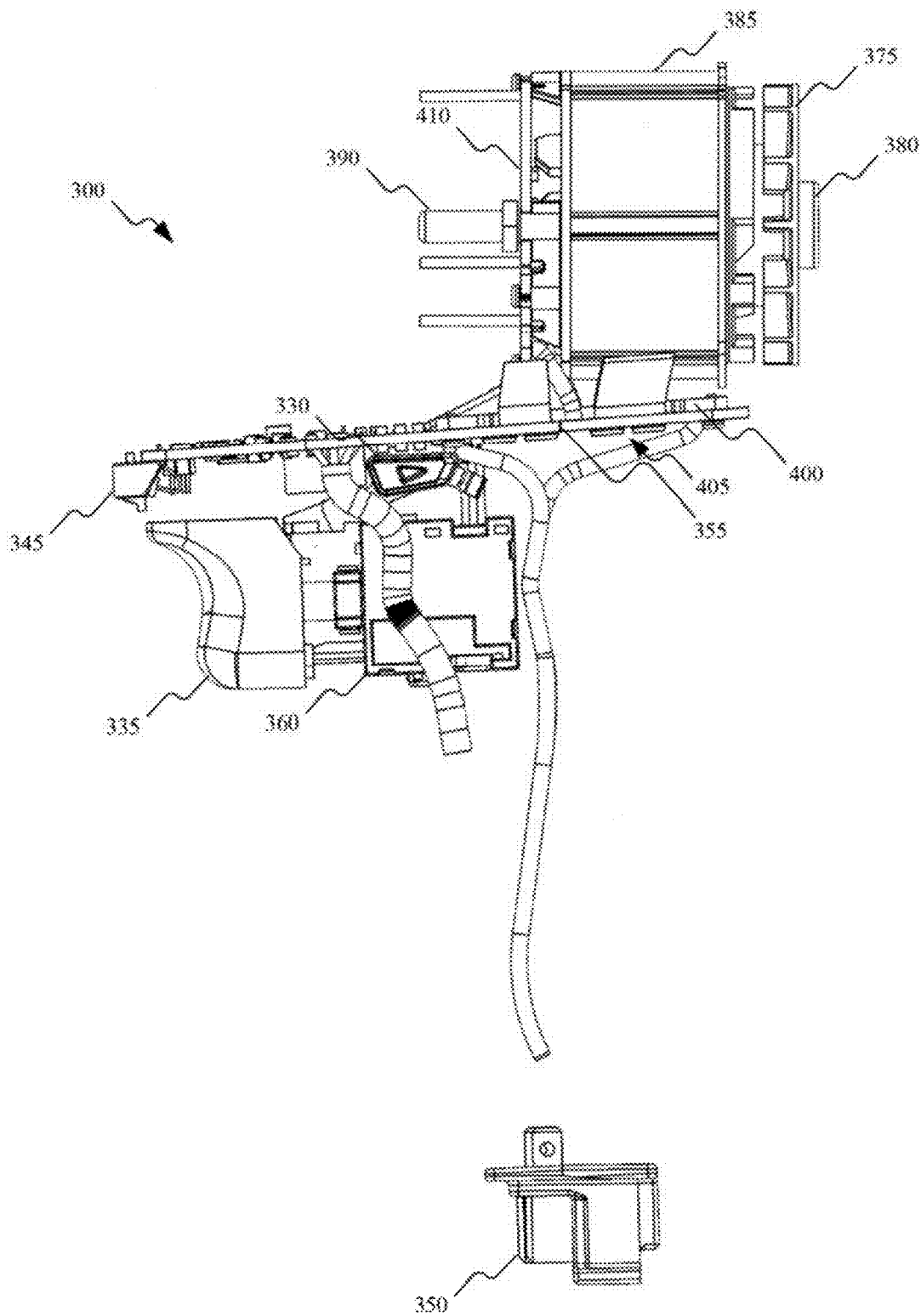
Figure 13:
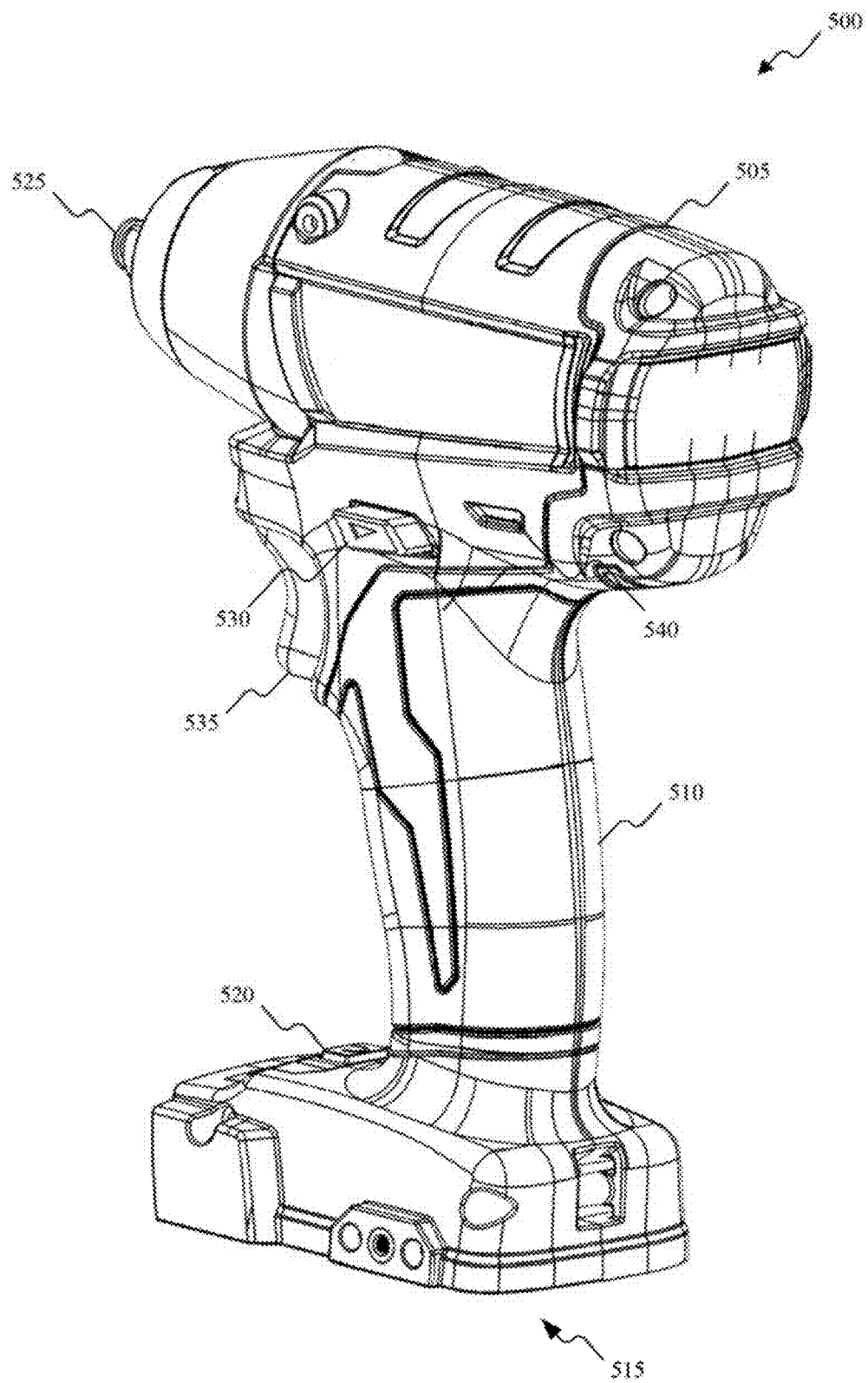
FIGS. 13-17 illustrate a hand-held power tool according to another embodiment of the invention.
Figure 14:
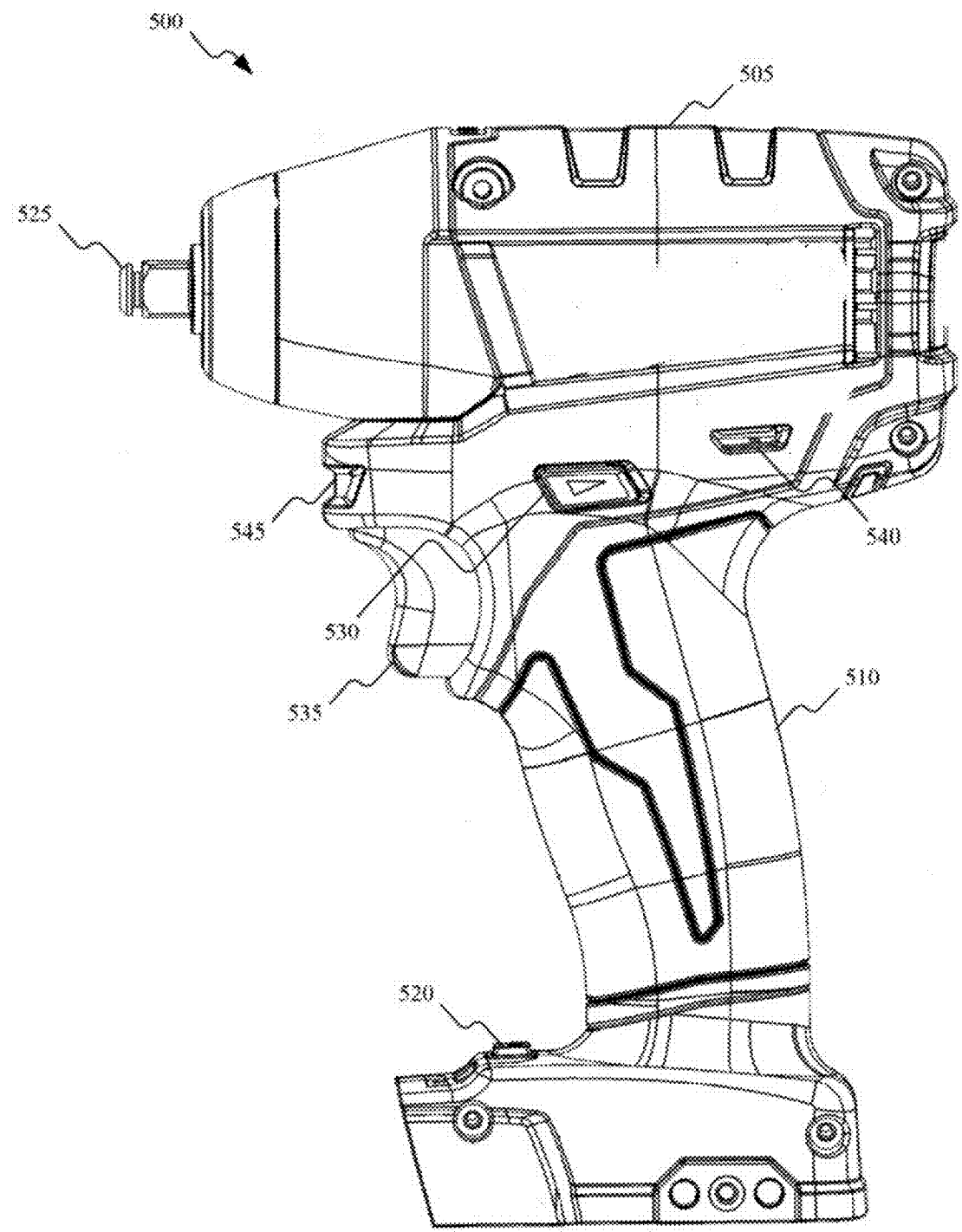

As illustrated in FIGS. 10-12, the drill/driver 300 also includes, among other things, a surfboard PCB 355, a switch 360 connected to the trigger 335, a drive mechanism 365, the chuck 325, and a BLDC motor 370. In some embodiments, the drive mechanism 365 can include a gear assembly, a mode selection mechanism, a clutch assembly, etc. The surfboard PCB 355 controls or regulates the power from the battery pack in order to selectively provide power to the motor 370, and includes switching FETs 405 for controlling the application of power to the BLDC motor 370. The surfboard PCB 355 includes, for example, six switching FETs 405. The FETs have a low drain-to-source resistance, such as below approximately 3.0 milli-Ohms. In some embodiments, the drain-to-source resistance of the FETs is between approximately 1.4 milli-Ohms and 2.0 milli-Ohms. In other embodiments, the drain-to-source resistance of the FETs has any value between approximately 1.0 milli-Ohms and 10.0 milli-Ohms.

By using lower resistance FETs in combination with, for example, the heat sinking and airflow characteristics of the hand-held power tool described below, the heat generated by switching FETs is capable of being controlled and regulated more effectively by the hand-held power tool to enable increased drive currents to be passed through the switching FETs and provided to the motor 370. For example, the Joule heating associated with passing high currents to the motor 370 are proportional to the value of the current squared multiplied by resistance. By reducing the resistance between the battery pack and the motor 370, the amount of Joule heating that results from the motor drawing high currents is reduced. Thus, the hand-held power tool is less susceptible to thermal failure when the motor 370 draws high currents. The FETs are, for example, IRLB3034 FETs or IRFS7437 FETs from International Rectifier, El Segundo, California. The number of switching FETs included in a hand-held power tool is related to, for example, the desired commutation scheme for the motor. The embodiments of the drill/driver described herein is with respect to a six-step commutation scheme that includes six switching FETS 405 and six stator coils (e.g., composed of copper). In other embodiments, additional or fewer switching FETs and stator coils can be employed (e.g., 4, 8, 12, 16, between 4 and 16, etc.).

The electronics illustrated in FIGS. 11 and 12 include a surfboard PCB 355 located below the motor 370 of the drill/driver 300. The drill/driver 300 can, however, include different PCB configurations than the configuration illustrated in FIGS. 11 and 12. For example, the drill/driver can include the PCB configuration illustrated in and described with respect to FIGS. 4 and 5 (e.g., a multi-PCB configuration or distributed PCB configuration). The drill/driver can also include the "doughnut" PCB illustrated in and described with respect to FIGS. 49 and 50. The differences between the various PCB configurations are described below. For example, each PCB configuration may result in a different weight for the electronics package of the drill/driver 300. However, each of the PCB configurations described herein has approximately the same total weight. The PCB configuration can also affect, for example, the location and number of external air vents, the location and size of heat sinks, etc., which can impact the performance characteristics of the drill/driver.

The drive mechanism 365 is operable to reduce the speed of a rotating motor shaft to a speed that is suitable for the drill/driver 300. The drive mechanism 365 is coupled to the chuck 325 for driving an output device (e.g., a drill bit, etc.). The drive mechanism 365 is not described in detail herein because the characteristics of the drive mechanism 365 can vary from one type of hand-held power tool to another depending upon the particular action that the hand-held power tool is performing (e.g., the action of an impact wrench is different from the action of a drill/driver). However, the BLDC motor is described in greater detail below. The drill/driver 300 also includes additional internal components and mechanisms illustrated in FIG. 10 that are not explicitly described herein but are known to those skilled in the art (e.g., a gear assembly, a clutch, etc.).

FIGS. 11 and 12 illustrate selected portions of the drill/driver 300. For example, FIGS. 11 and 12 illustrate the electronics and the motor of the drill/driver 300. Although the motor is described in greater detail below, for the sake of clarity and context, the motor 370 includes, among other things, a fan 375 (e.g., plastic, metal, etc.), bearings 380, a stator 385 (described below), a rotor (described below), and a shaft 390. The fan 375 is operable to force air 395 (see FIG. 10) over switching FETs 405 of the surfboard PCB 355 to improve the dissipation of heat from the switching FETs 405. The air exits the hand-held power tool through the vents 340. The electronics includes the surfboard PCB 355, the switching FETS 455, the trigger and associated switch 360, the worklight 345, the forward/reverse switch 330, a heat sink 400 (e.g., an aluminum, aluminum-alloy, copper, etc., heat sink), and a Hall effect PCB 410, as well as assorted wires (e.g., 14AWG wires for providing power from the battery pack to the motor) and other components for connection, protection, and operation of the drill/driver 300 (e.g., wires). In some embodiments, the switching FETs 405 are directly coupled (i.e., directly physically and/or thermally coupled) to the heat sink 400 (e.g., directly on the heat sink, via copper tracings on a PCB, etc.). In other embodiments, the switching FETs 405 are not directly coupled to the heat sink 400, but are in a heat transfer relationship with the heat sink 400. In general, the electronics include all portions of the drill/driver 300 minus the following: the housing, the battery pack, mechanical components (e.g., a gear assembly, a clutch, the chuck 325, etc.), and the motor 370. The remaining portions of the drill/driver are considered the "electronics" (e.g., PCBs, wires, switches, terminals, sensors, LEDs, etc.).

The drill/driver 300, for example, can be powered by an 18V battery pack. The drill/driver 300 can operate at two speeds (e.g., 0-550 RPM or 0-1850 RPM), generate 725 in-lbs of maximum torque (i.e., stall torque), and weigh only approximately 4.9 lbs with a ten-cell extra-capacity battery pack (e.g., 3.0 Ah), such as the M18™ XC High Capacity REDLITHIUM™ battery pack, manufactured and sold by Milwaukee Electric Tool, Milwaukee, Wisconsin, or the battery packs described below. In some embodiments, the drill/driver and extra-capacity battery pack weigh less than approximately 5.0 lbs. In other embodiments, the drill/driver and the extra-capacity battery pack weigh between approximately 4.0 lbs and approximately 5.0 lbs, or between approximately 4.0 lbs and approximately 5.5 lbs.

If, for example, a regular-capacity battery pack were used to power the drill/driver 300, the drill/driver 300 can operate at two speeds (e.g., 0-550 RPM or 0-1850 RPM), generate 650 in-lbs of maximum torque (i.e., stall torque), and weigh only approximately 4.4 lbs with a five-cell regular-capacity battery pack (e.g., 1.5 Ah), such as the M18™ REDLITHIUM™ 2.0 compact battery pack manufactured and sold by Milwaukee Electric Tool, Milwaukee, Wisconsin, or the battery packs described below. In some embodiments, the drill/driver and regular-capacity battery pack weigh less than approximately 4.5 lbs. In other embodiments, the drill/driver and the regular-capacity battery pack weigh between approximately 3.5 lbs and approximately 4.5 lbs, or between approximately 3.5 lbs and approximately 5.0 lbs.

The cordless, hand-held power tool illustrated in FIGS. 13-17 is an impact wrench 500. The impact wrench 500 includes an upper main body 505, a handle portion 510, a battery pack receiving portion 515, torque and/or speed selection switches 520, an output drive device or mechanism 525, a forward/reverse selection button 530, a trigger 535, and air vents 540. The impact wrench 500 also includes a worklight 545, and the battery pack receiving portion 515 receives a portion of a battery pack (see FIGS. 36-43) and includes a terminal assembly 550 including a plurality of terminals. The number of terminals present in the receiving portion 515 can vary based on the type of hand-held power tool. However, as an illustrative example, the receiving portion and the terminal assembly can include a battery positive ("B+") terminal, a battery negative ("B−") terminal, a sense or communication terminal, an identification terminal, etc. The outer portions or housing of the impact wrench 500 (e.g., the main body 505 and the handle portion 510) are composed of a durable and light-weight plastic material. The drive mechanism (described below) is composed of a metal (e.g., steel) as is known in the art.

The battery positive and battery negative terminals are operable to electrically connect the battery pack to the hand-held power tool and provide operational power (i.e., voltage and current) for the hand-held power tool from the battery pack to the hand-held power tool. The sensor or communication terminal is operable to provide for communication or sensing for the hand-held power tool of the battery pack. For example, the communication can include serial communication or a serial communication link, the transmission or conveyance of information from one of the battery pack or the hand-held power tool to the other of the battery pack or hand-held power tool related to a condition or characteristic of the battery pack or hand-held power tool (e.g., one or more battery cell voltages, one or more battery pack voltages, one or more battery cell temperatures, one or more battery pack temperatures, etc.).

The identification terminal can be used by the battery pack or the hand-held power tool to identify the other of the battery pack or the hand-held power tool. For example, the hand-held power tool can identify the battery pack as a high capacity battery pack or a normal capacity battery pack, as a lithium-based battery or a nickel-based battery, as a battery pack having a particular voltage (described below), a higher resistance battery pack, a lower resistance battery pack, etc. Additionally or alternatively, the battery pack can identify the hand-held power tool as a hammer drill, a drill/wrench, an impact wrench, an impact wrench, a brushless power tool, a brushed power tool, a higher resistance power tool (e.g., capable of lower power output), a lower resistance power tool (e.g., capable of higher power output), etc.

Figure 15:
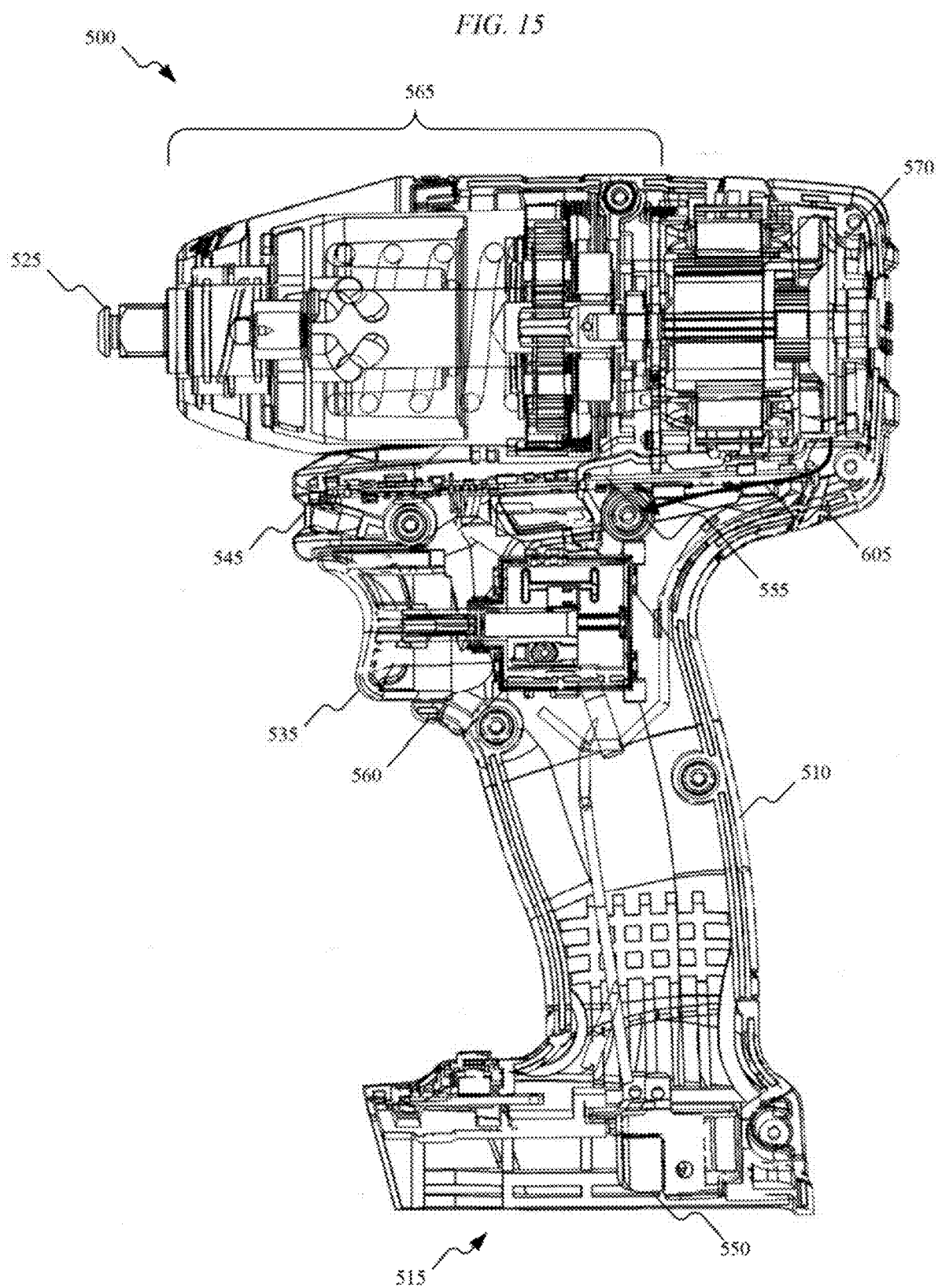
Figure 16:
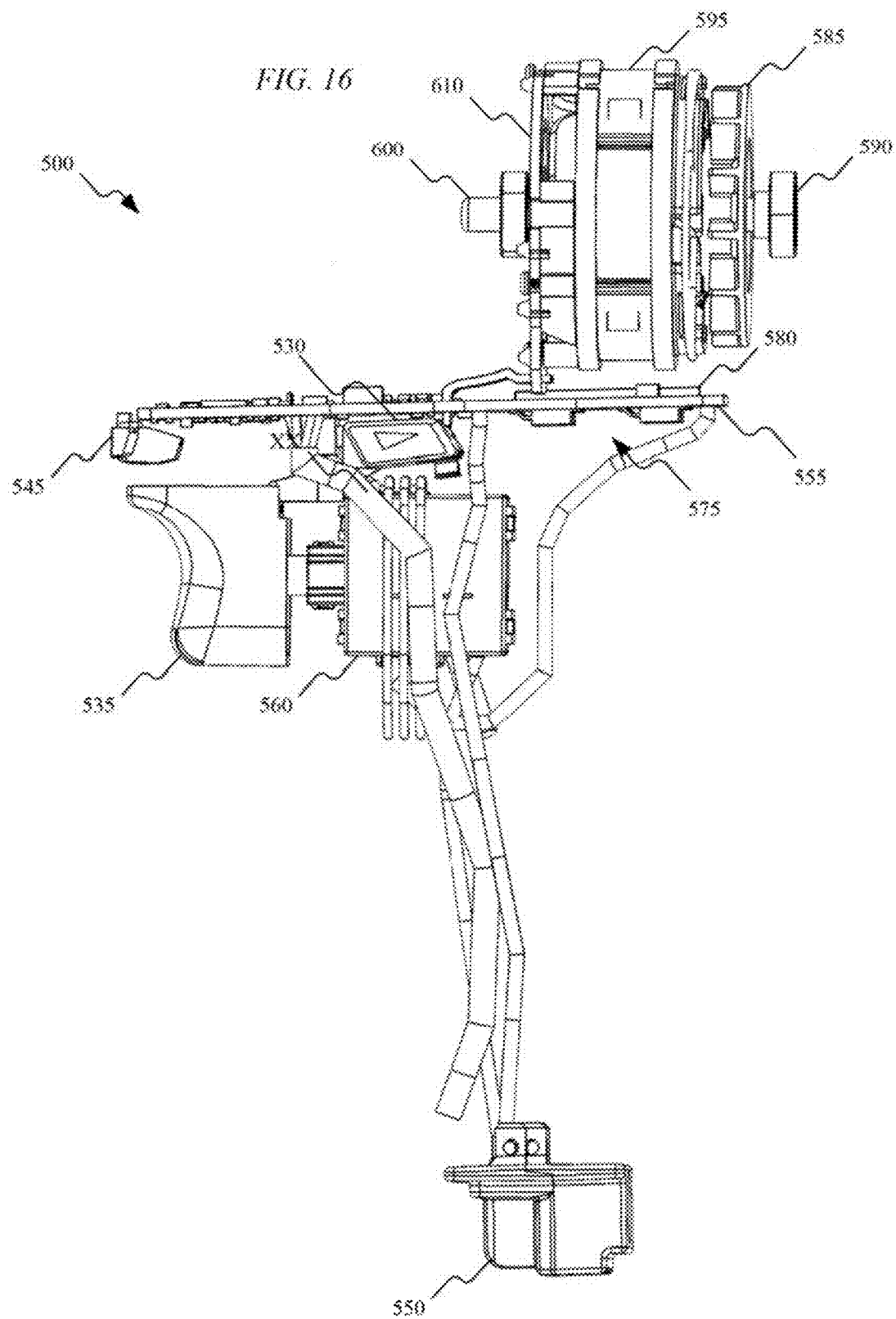
Figure 17:
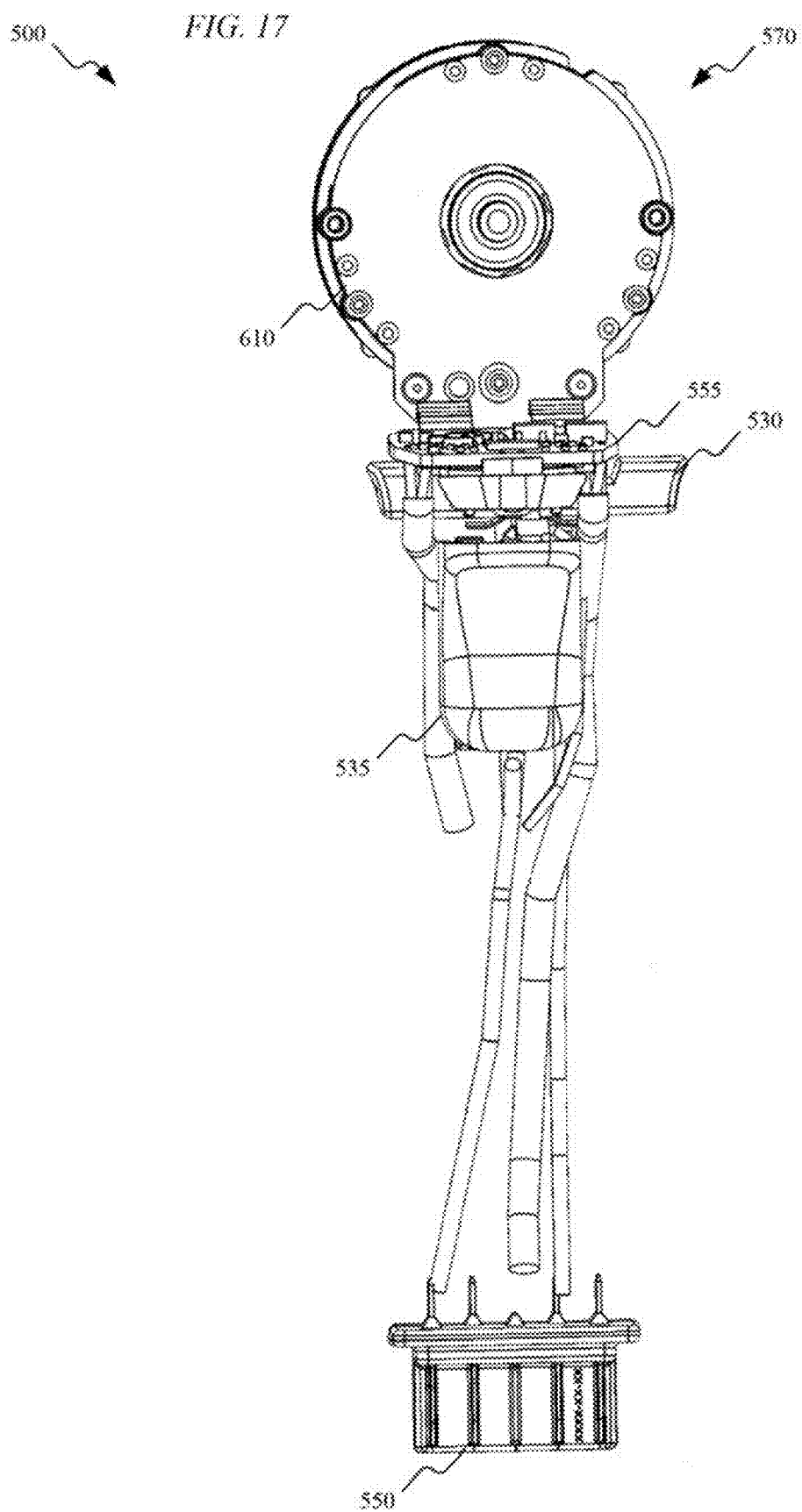
Figure 18:
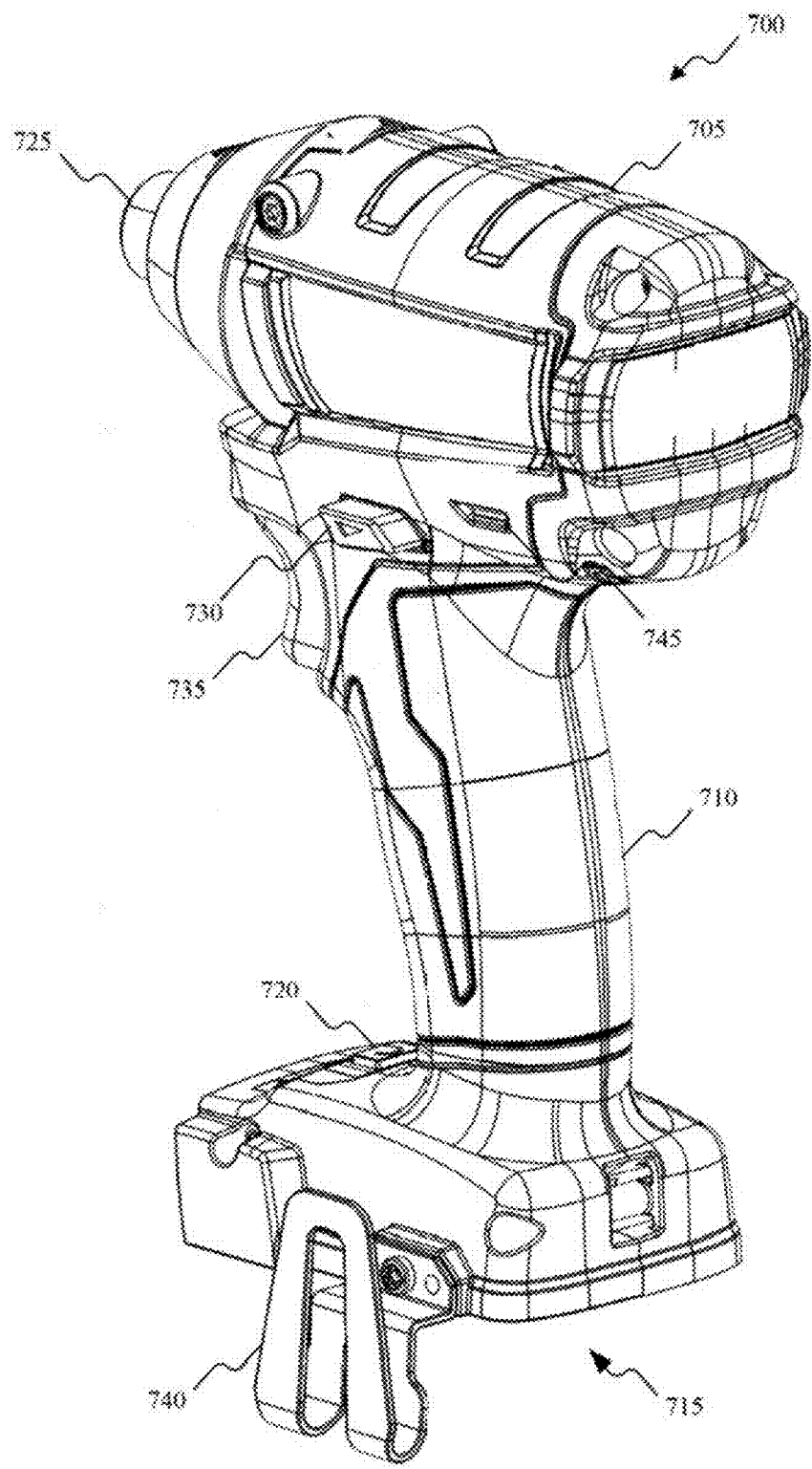
FIGS. 18-22 illustrate a hand-held power tool according to another embodiment of the invention.
Figure 19:
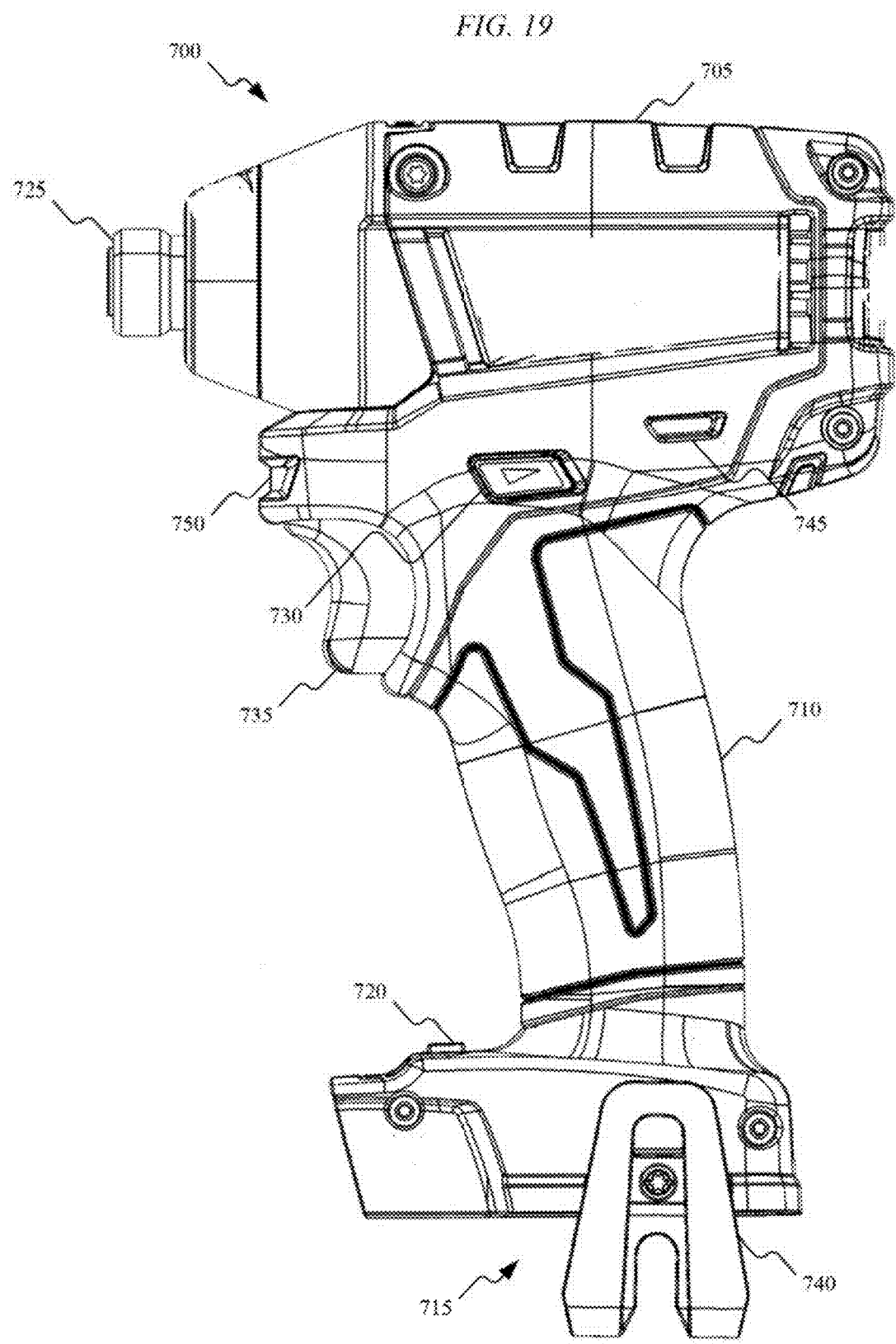

As illustrated in FIGS. 15-17, the impact wrench 500 also includes, among other things, a surfboard PCB 555, a switch 560 connected to the trigger 535, a drive mechanism 565, and a BLDC motor 570. In some embodiments, the drive mechanism 565 can include a gear assembly, a mode selection mechanism, a clutch assembly, etc. The surfboard PCB 555 controls or regulates the power from the battery pack in order to selectively provide power to the motor 570, and includes switching FETs 575 for controlling the application of power to the BLDC motor 570. The surfboard PCB 555 includes, for example, six switching FETs 575 and a heat sink 580 (e.g., an aluminum, aluminum-alloy, copper, etc., heat sink). The FETs have a low drain-to-source resistance, such as below approximately 3.0 milli-Ohms. In some embodiments, the drain-to-source resistance of the FETs is between approximately 1.4 milli-Ohms and 2.0 milli-Ohms. In other embodiments, the drain-to-source resistance of the FETs has any value between approximately 1.0 milli-Ohms and 10.0 milli-Ohms.

By using lower resistance FETs in combination with, for example, the heat sinking and airflow characteristics of the hand-held power tool described below, the heat generated by switching FETs is capable of being controlled and regulated more effectively by the hand-held power tool to enable increased drive currents to be passed through the switching FETs and provided to the motor 570. For example, the Joule heating associated with passing high currents to the motor 570 are proportional to the value of the current squared multiplied by resistance. By reducing the resistance between the battery pack and the motor 570, the amount of Joule heating that results from the motor drawing high currents is reduced. Thus, the hand-held power tool is less susceptible to thermal failure when the motor 570 draws high currents. The FETs are, for example, IRLB3034 FETs or IRFS7437 FETs from International Rectifier, El Segundo, California. In some embodiments, the switching FETs 575 are directly coupled (i.e., directly physically and/or thermally coupled) to the heat sink 580 (e.g., directly on the heat sink, via copper tracings on a PCB, etc.). In other embodiments, the switching FETs 575 are not directly coupled to the heat sink 580, but are in a heat transfer relationship with the heat sink 580. The number of switching FETs included in a hand-held power tool is related to, for example, the desired commutation scheme for the motor. The embodiments of the impact wrench described herein are with respect to a six-step commutation scheme that includes six switching FETS 575 and six stator coils (e.g., composed of copper). In other embodiments, additional or fewer switching FETs and stator coils can be employed (e.g., 4, 8, 12, 16, between 4 and 16, etc.).

The electronics illustrated in FIGS. 16 and 17 include a surfboard PCB 555 located below the motor 570 of the impact wrench 500. The impact wrench 500 can, however, include different PCB configurations than the configuration illustrated in FIGS. 11 and 12. For example, the impact wrench can include the PCB configuration illustrated in and described with respect to FIGS. 4 and 5 (e.g., a multi-PCB configuration or distributed PCB configuration). The impact wrench can also include the "doughnut" PCB illustrated in and described with respect to FIGS. 49 and 50. The differences between the various PCB configurations are described below. For example, each PCB configuration may result in a different weight for the electronics package of the impact wrench 500. However, each of the PCB configurations described herein has approximately the same total weight. The PCB configuration can also affect, for example, the location and number of external air vents, the location and size of heat sinks, etc., which can impact the performance characteristics of the impact wrench 500.

The drive mechanism 565 is operable to reduce the speed of a rotating motor shaft to a speed that is suitable for the impact wrench 500. The drive mechanism 565 is coupled to the output drive device 525 for driving an output device. The drive mechanism 565 is not described in detail herein because the characteristics of the drive mechanism 565 can vary from one type of hand-held power tool to another depending upon the particular action that the hand-held power tool is performing (e.g., the action of an impact wrench is different from the action of a drill/driver). However, the BLDC motor is described in greater detail below. The impact wrench 500 also includes additional internal components and mechanisms illustrated in FIG. 15 that are not explicitly described herein but are known to those skilled in the art.

FIGS. 16 and 17 illustrate selected portions of the impact wrench 500. For example, FIGS. 16 and 17 illustrate the electronics and the motor of the impact wrench 500. Although the motor is described in greater detail below, for the sake of clarity and context, the motor 570 includes, among other things, a fan 585 (e.g., plastic, metal, etc.), bearings 590, a stator 595 (described below), a rotor (described below), and a shaft 600. The fan 585 is operable to force air 605 (see FIG. 15) over the switching FETs 575 of the surfboard PCB 555 to improve the dissipation of heat from the switching FETs 575. The air exits the hand-held power tool through the vents 540. The electronics include the surfboard PCB 555, the switching FETS 575, the trigger 535 and associated switch 560, the worklight 545, the forward/reverse switch 530, the heat sink 580, and a Hall Effect PCB 610, as well as assorted wires (e.g., 14AWG wires for providing power from the battery pack to the motor) and other components for connection, protection, and operation of the impact wrench 500. In general, the electronics include all portions of the impact wrench 500 minus the following: the housing, the battery pack, mechanical components (e.g., a gear assembly, a clutch, etc.), and the motor 570. The remaining portions of the impact wrench are considered the "electronics" (e.g., PCBs, wires, switches, terminals, sensors, LEDs, etc.).

The impact wrench 500, for example, can be powered by an 18V battery pack. The impact wrench 500 can operate at speeds of, for example, approximately 0-1800 RPM, generate 1100 ft-lbs of maximum torque (i.e., stall torque), and weigh only approximately 3.5 lbs with a ten-cell extra-capacity battery pack (e.g., 3.0 Ah), such as the M18™ XC High Capacity REDLITHIUM™ battery pack, manufactured and sold by Milwaukee Electric Tool, Milwaukee, Wisconsin, or the battery packs described below. In some embodiments, the impact wrench 500 and extra-capacity battery pack weigh less than approximately 3.5 lbs. In other embodiments, the impact wrench 500 and the extra-capacity battery pack weigh between approximately 3.0 lbs and approximately 4.0 lbs, or between approximately 3.0 lbs and approximately 4.5 lbs.

If, for example, a five-cell regular-capacity battery pack were used to power the impact wrench 500, the impact wrench 500 can operate at speeds of, for example, approximately 0-1800 RPM, generate 1100 ft-lbs of maximum torque (i.e., stall torque), and weigh only approximately 3.0 lbs with a five-cell regular-capacity battery pack (e.g., 1.5 Ah), such as the M18™ REDLITHIUM™ 2.0 compact battery pack, manufactured and sold by Milwaukee Electric Tool, Milwaukee, Wisconsin, or the battery packs as described below. In some embodiments, the impact wrench 500 and regular-capacity battery pack weigh less than approximately 3.0 lbs. In other embodiments, the impact wrench 500 and the regular-capacity battery pack weigh between approximately 2.5 lbs and approximately 3.5 lbs, or between approximately 2.5 lbs and approximately 4.0 lbs.

The cordless, hand-held power tool illustrated in FIGS. 18-22 is an impact driver 700. The impact driver 700 includes an upper main body 705, a handle portion 710, a battery pack receiving portion 715, torque and/or speed selection switches 720, an output drive device or mechanism 725, a forward/reverse selection button 730, a trigger 735, a belt clip 740 (optionally included on the hammer drill 100, the drill/driver 300, and the impact wrench 500), and air vents 745. The impact driver 700 also includes a worklight 750. The battery pack receiving portion 715 receives a portion of a battery pack (see FIGS. 36-43) and includes a terminal assembly 755 including a plurality of terminals. The number of terminals present in the receiving portion 715 can vary based on the type of hand-held power tool. However, as an illustrative example, the receiving portion and the terminal assembly can include a battery positive ("B+") terminal, a battery negative ("B−") terminal, a sense or communication terminal, an identification terminal, etc. The outer portions or housing of the impact driver 700 (e.g., the main body 705 and the handle portion 710) are composed of a durable and light-weight plastic material. The drive mechanism (described below) is composed of a metal (e.g., steel) as is known in the art.

The battery positive and battery negative terminals are operable to electrically connect the battery pack to the hand-held power tool and provide operational power (i.e., voltage and current) for the hand-held power tool from the battery pack to the hand-held power tool. The sensor or communication terminal is operable to provide for communication or sensing for the hand-held power tool of the battery pack. For example, the communication can include serial communication or a serial communication link, the transmission or conveyance of information from one of the battery pack or the hand-held power tool to the other of the battery pack or hand-held power tool related to a condition or characteristic of the battery pack or hand-held power tool (e.g., one or more battery cell voltages, one or more battery pack voltages, one or more battery cell temperatures, one or more battery pack temperatures, etc.).

The identification terminal can be used by the battery pack or the hand-held power tool to identify the other of the battery pack or the hand-held power tool. For example, the hand-held power tool can identify the battery pack as a high capacity battery pack or a normal capacity battery pack, as a lithium-based battery or a nickel-based battery, as a battery pack having a particular voltage (described below), a higher resistance battery pack, a lower resistance battery pack, etc. Additionally or alternatively, the battery pack can identify the hand-held power tool as a hammer drill, a drill/driver, an impact driver, an impact driver, a brushless power tool, a brushed power tool, a higher resistance power tool (e.g., capable of lower power output), a lower resistance power tool (e.g., capable of higher power output), etc.

Figure 20:
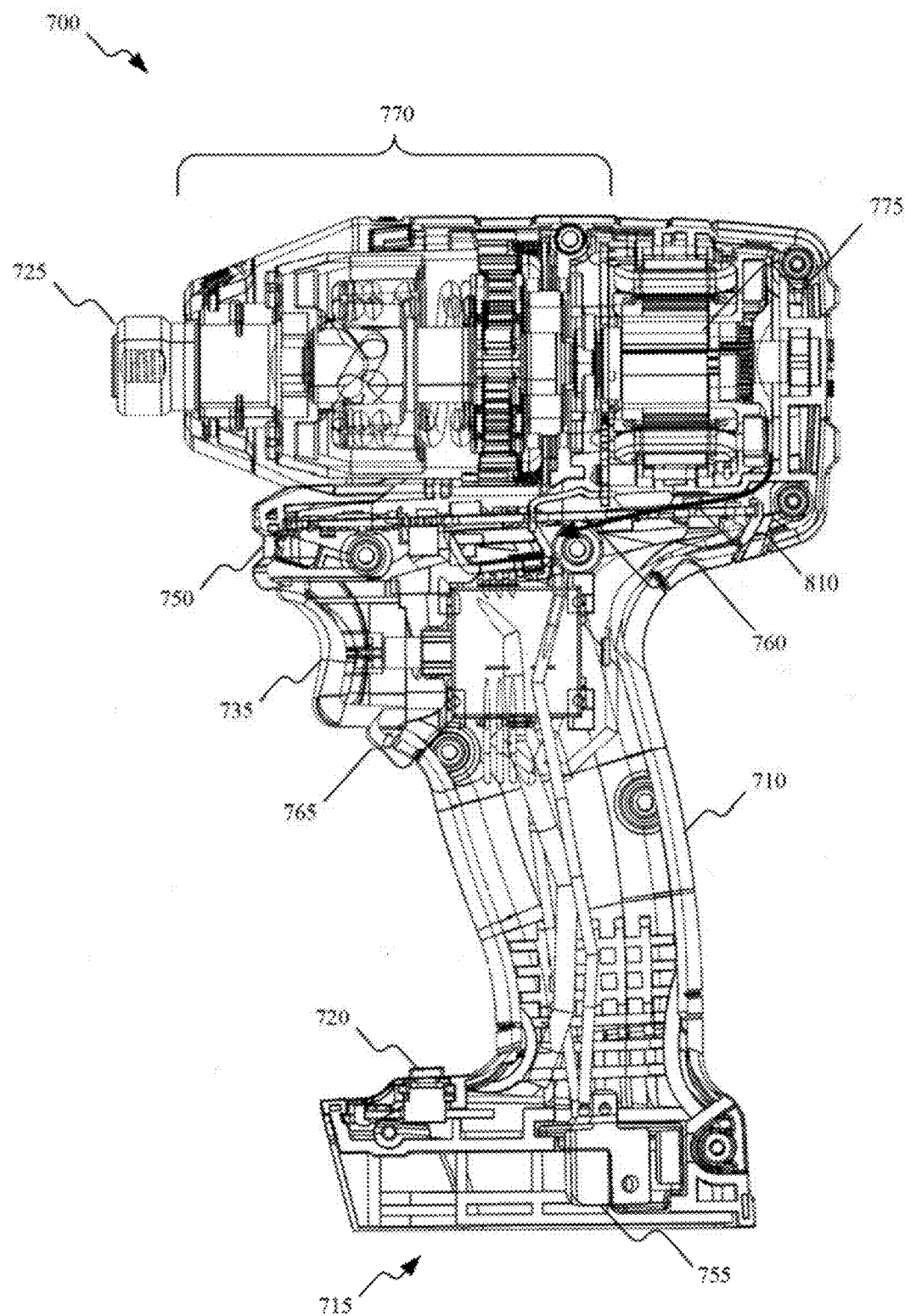
Figure 21:
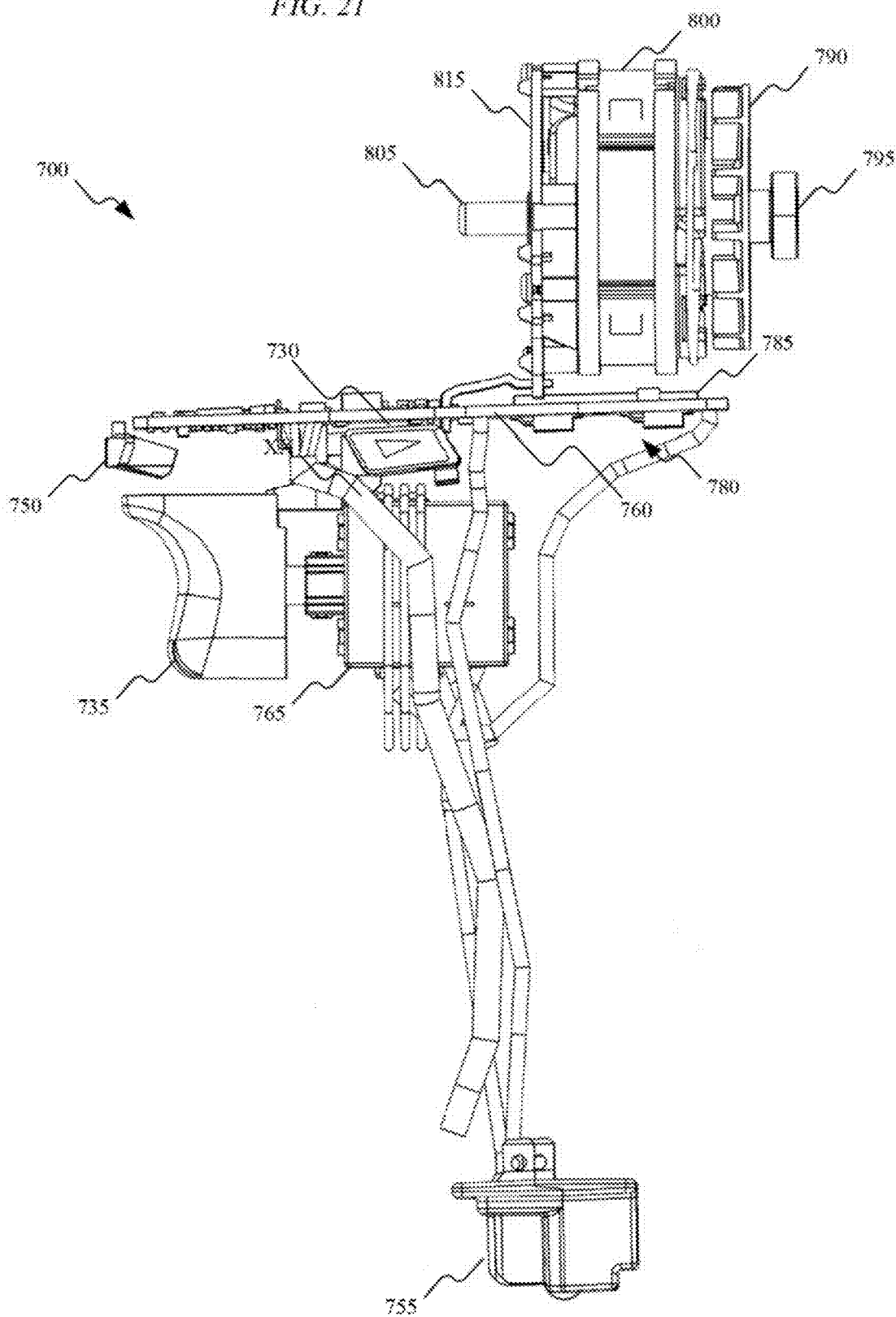
Figure 22:
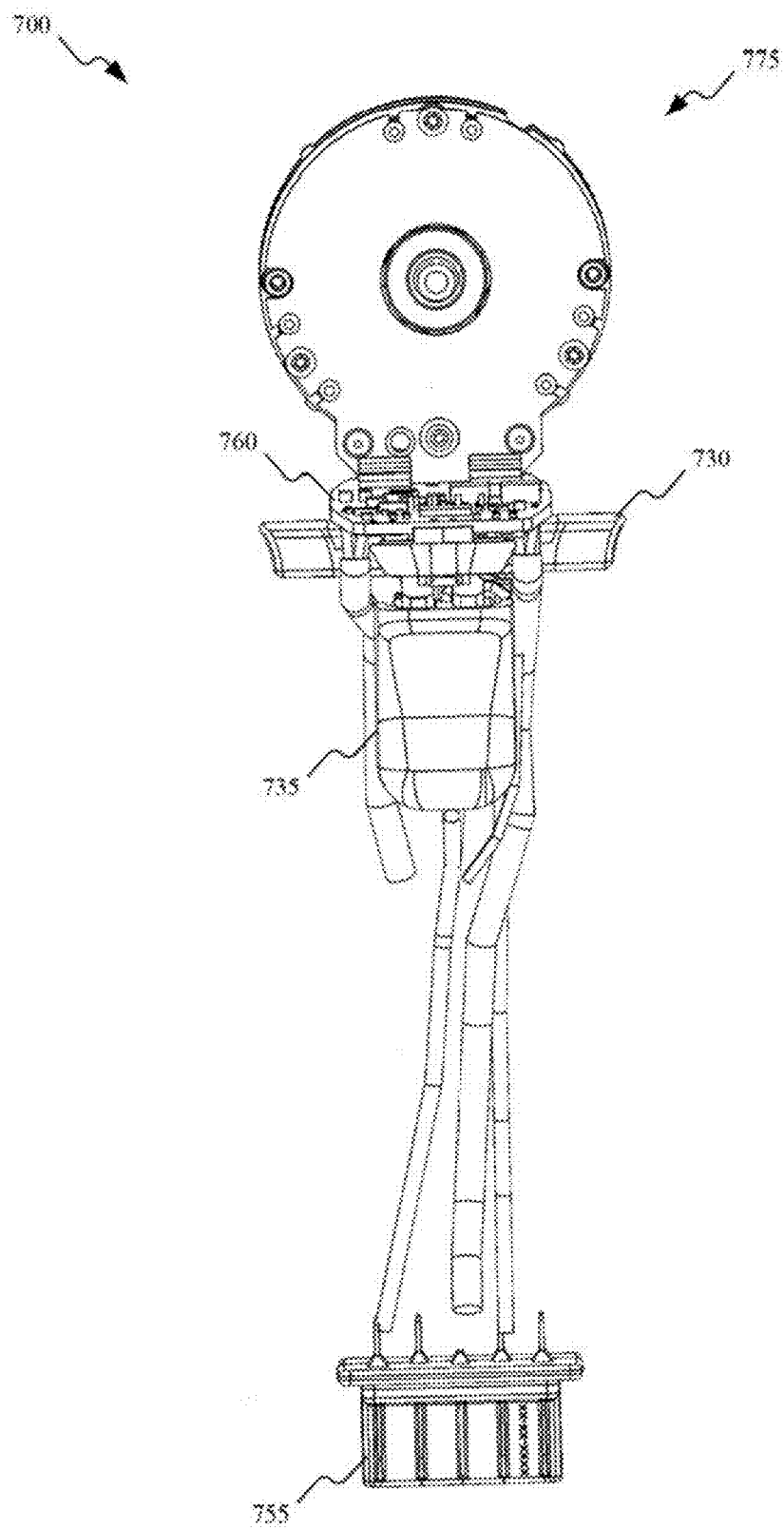
Figure 23:
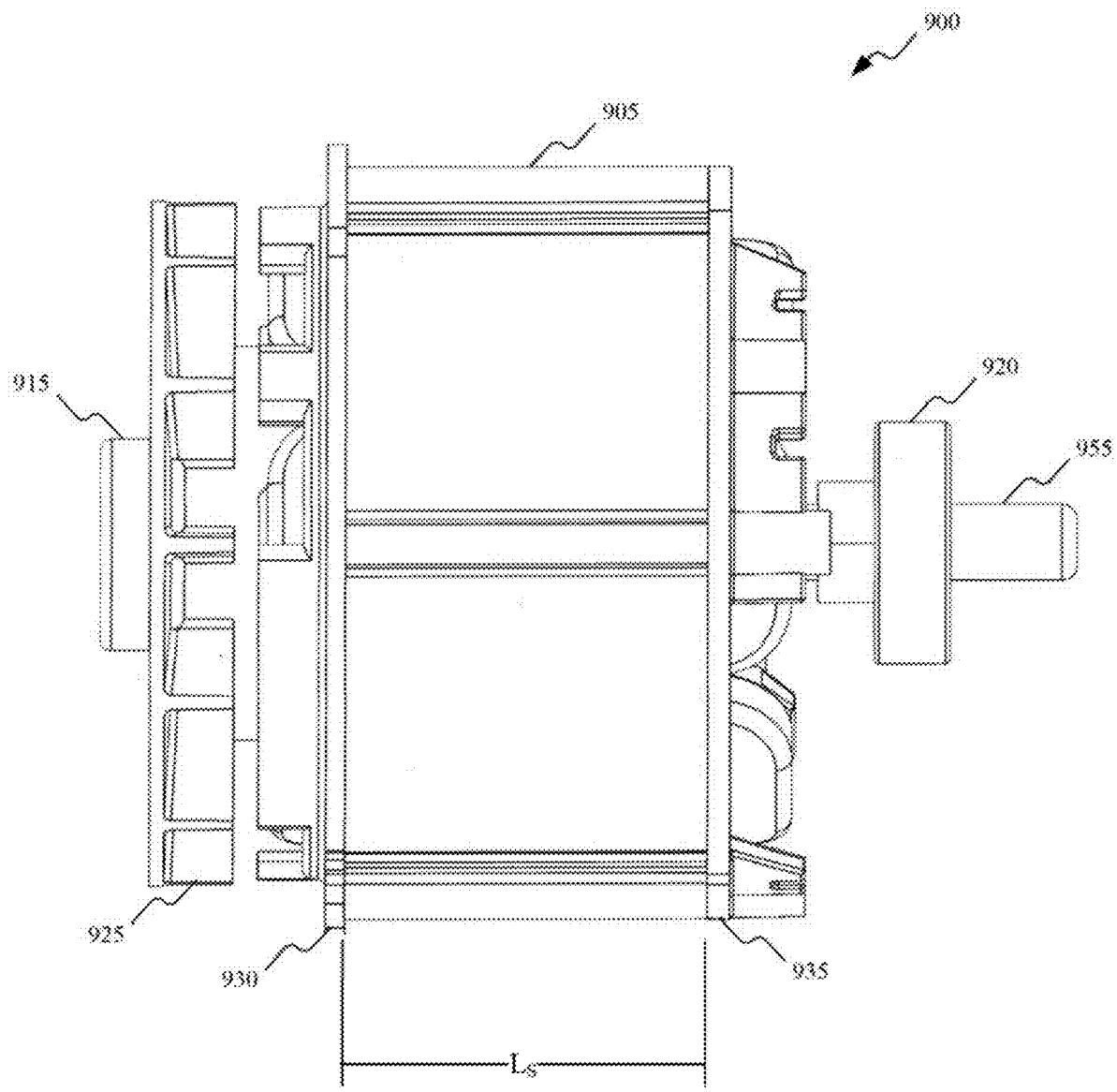
FIGS. 23-35 illustrate a hand-held power tool motor according to embodiments of the invention.
Figure 24:
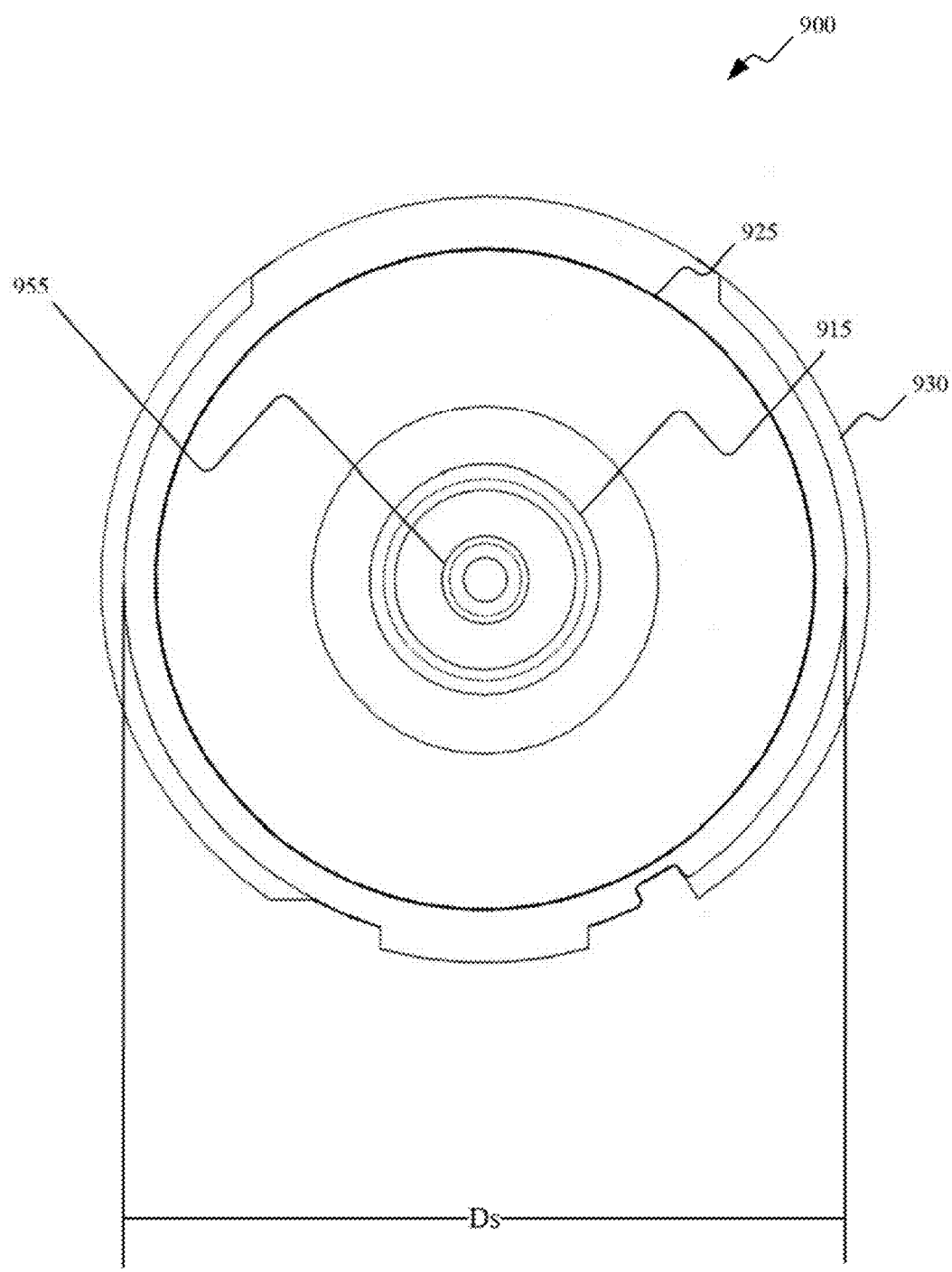
Figure 25:
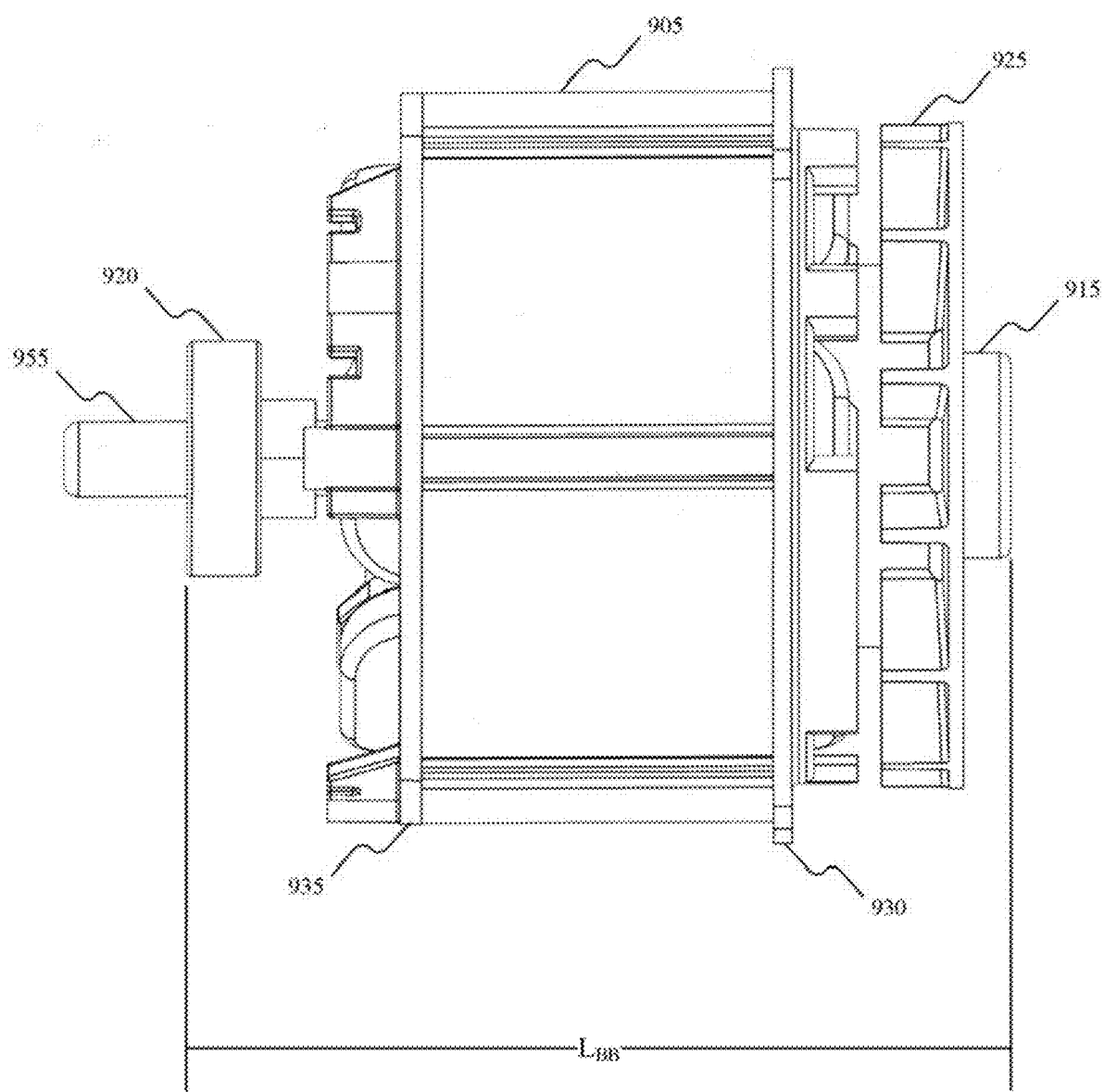
Figure 26:
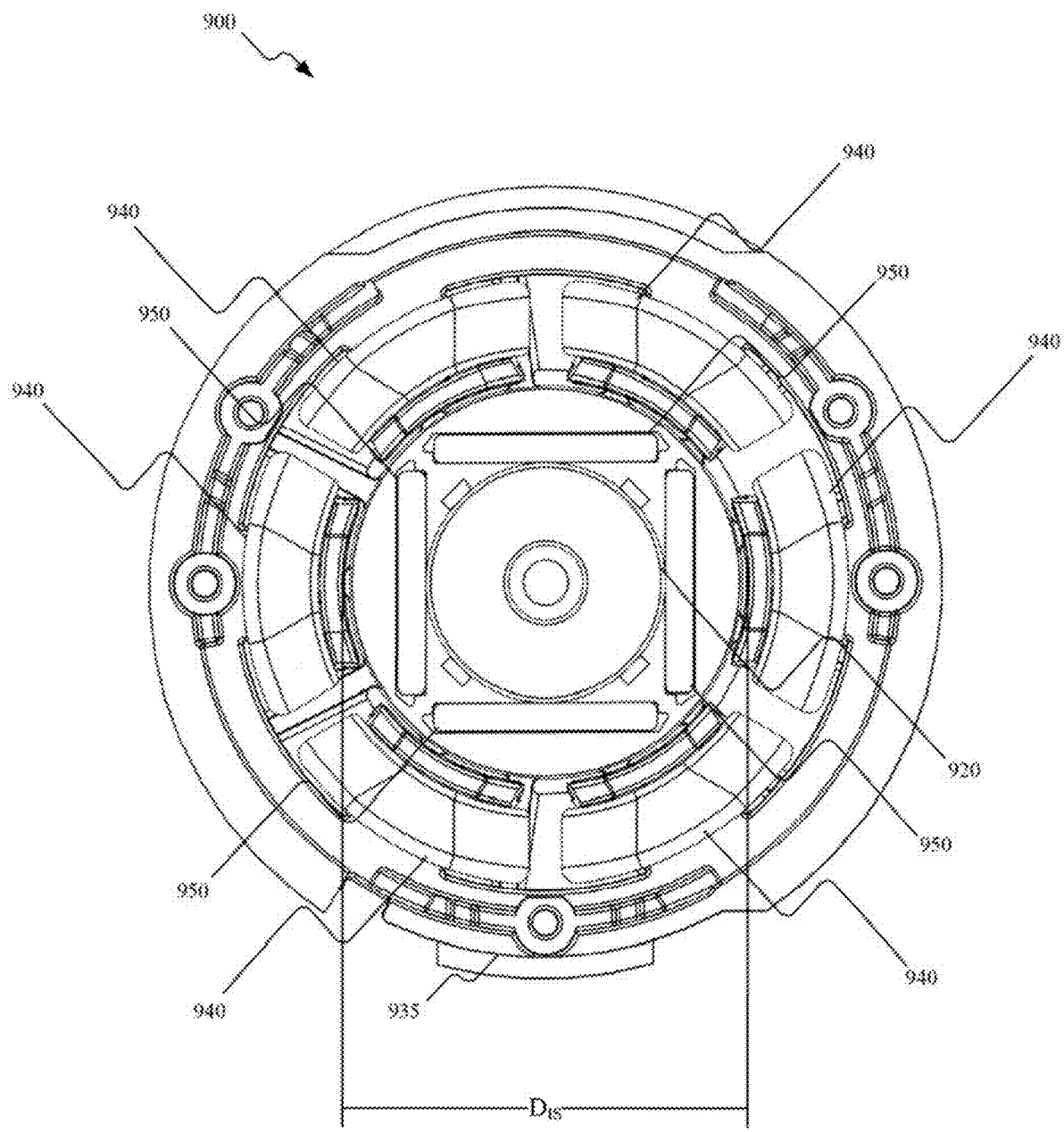
Figure 27:
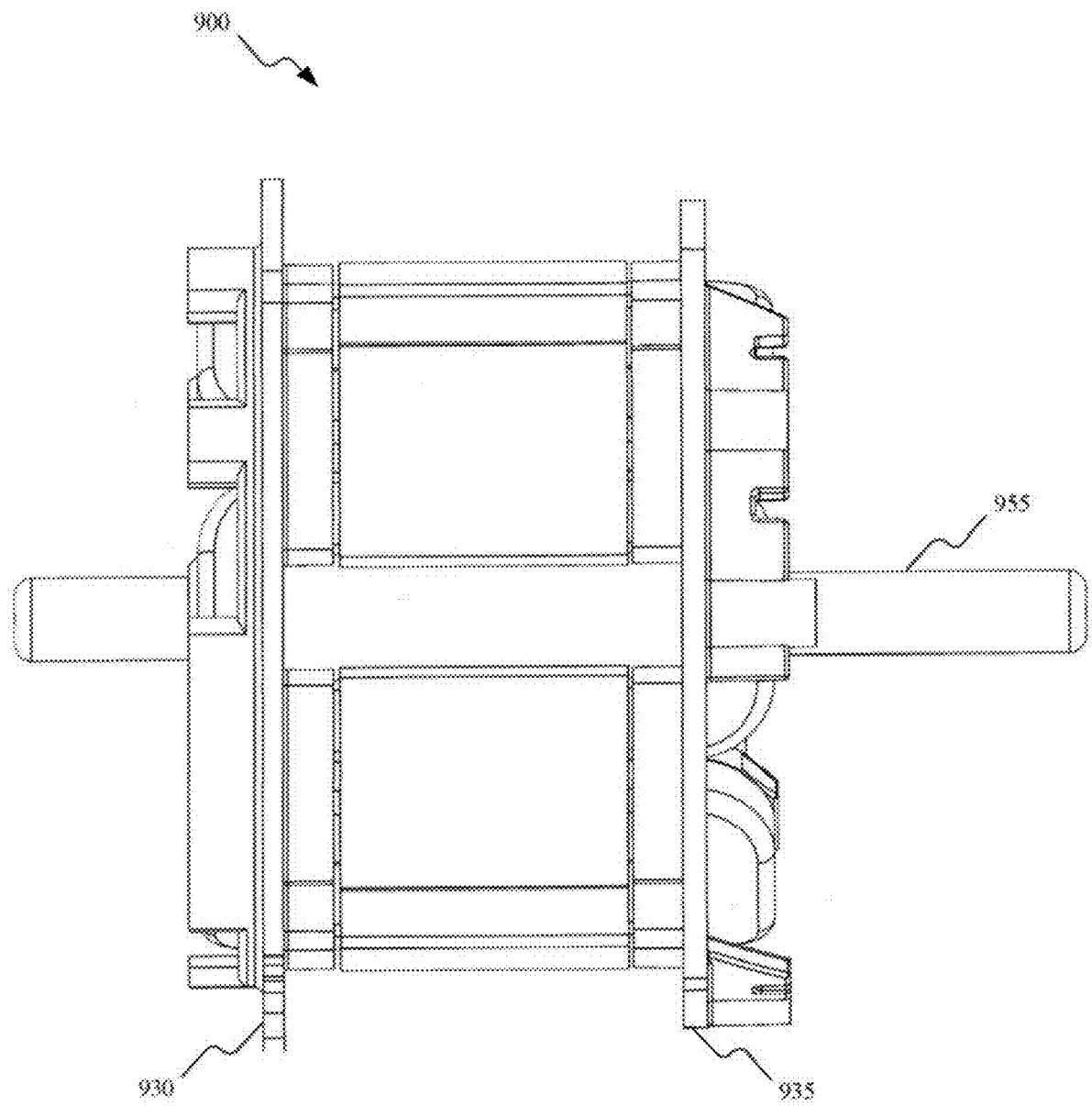
Figure 28:
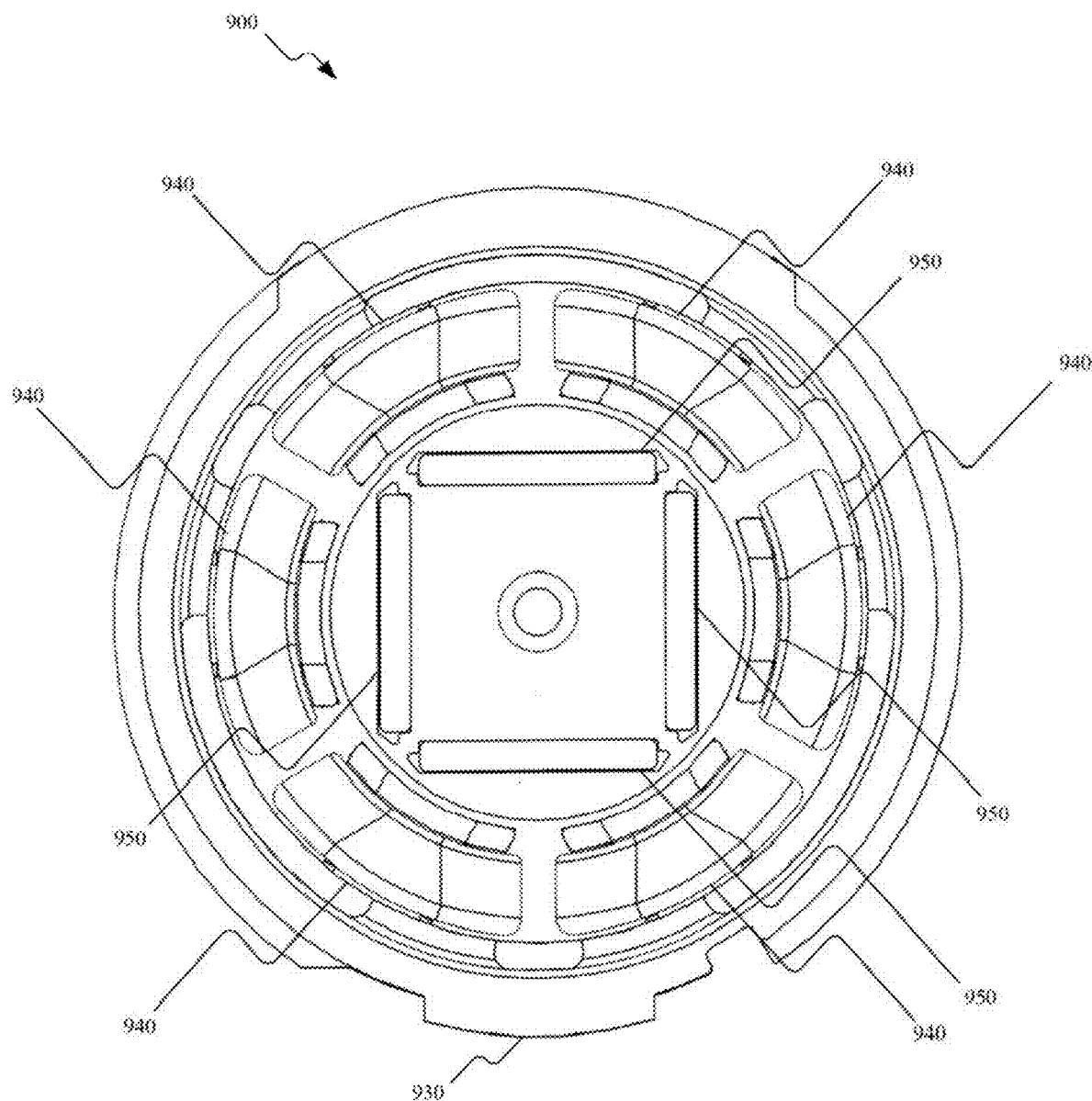
Figure 29:
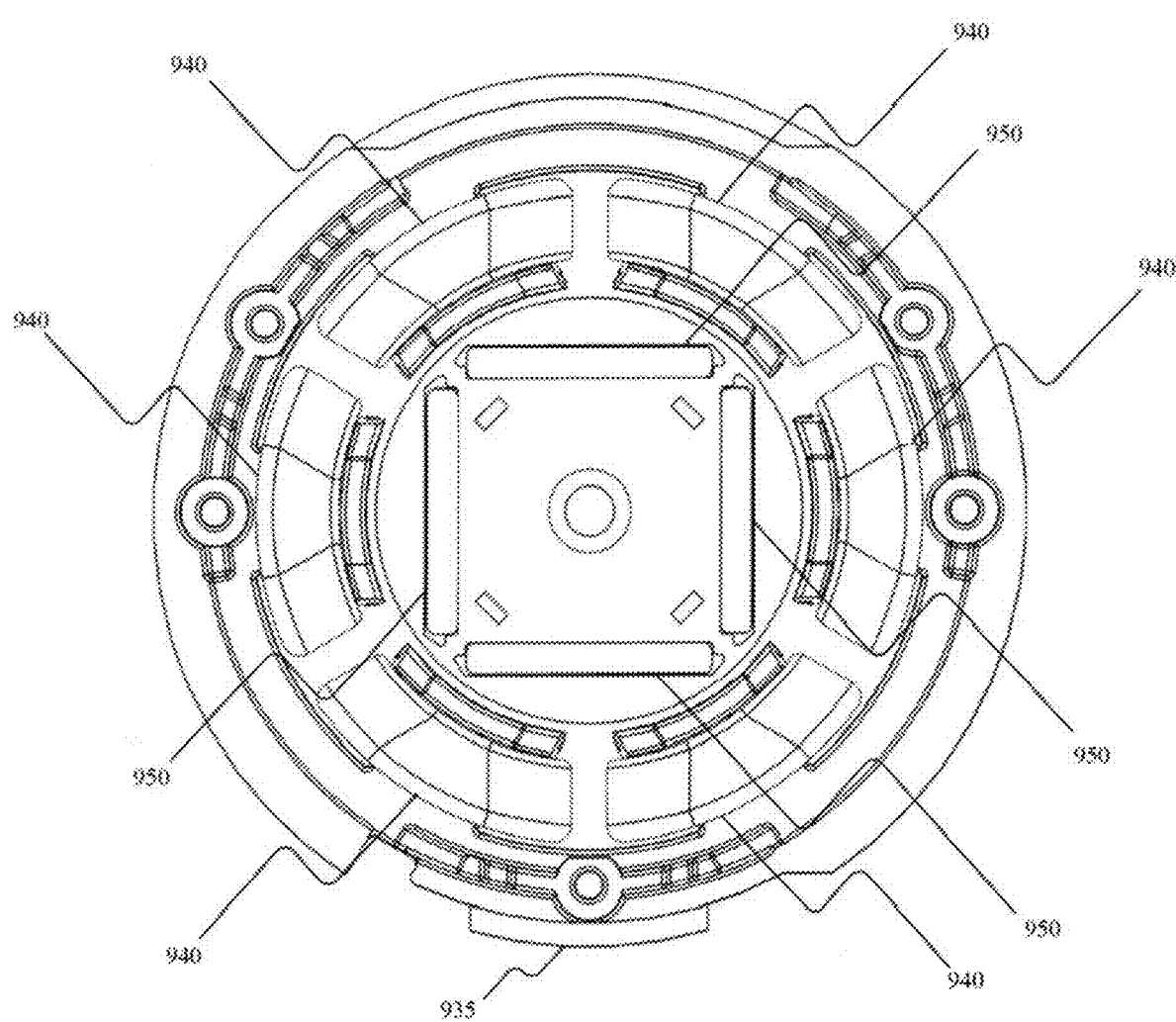
Figure 30:
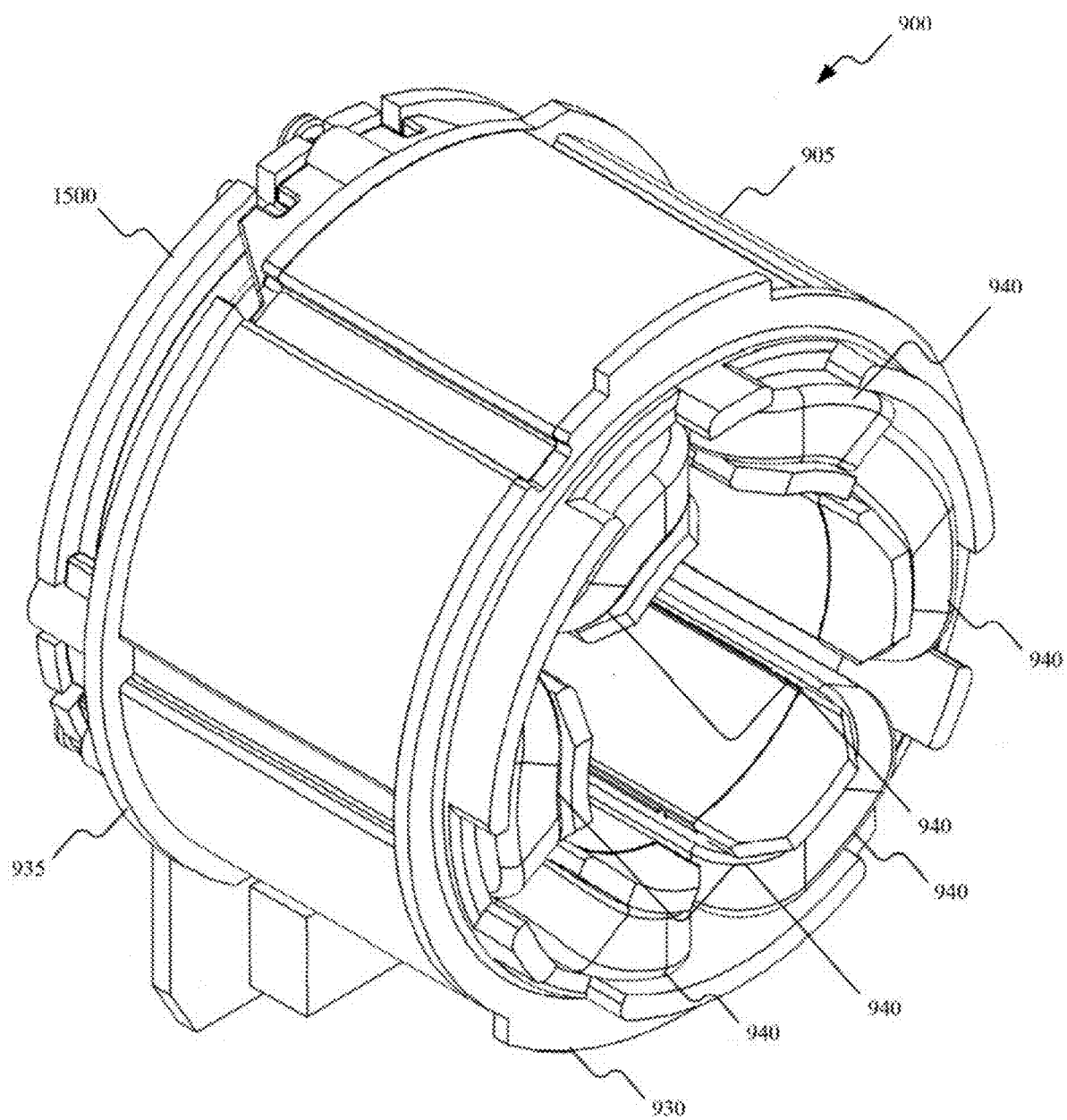
Figure 31:
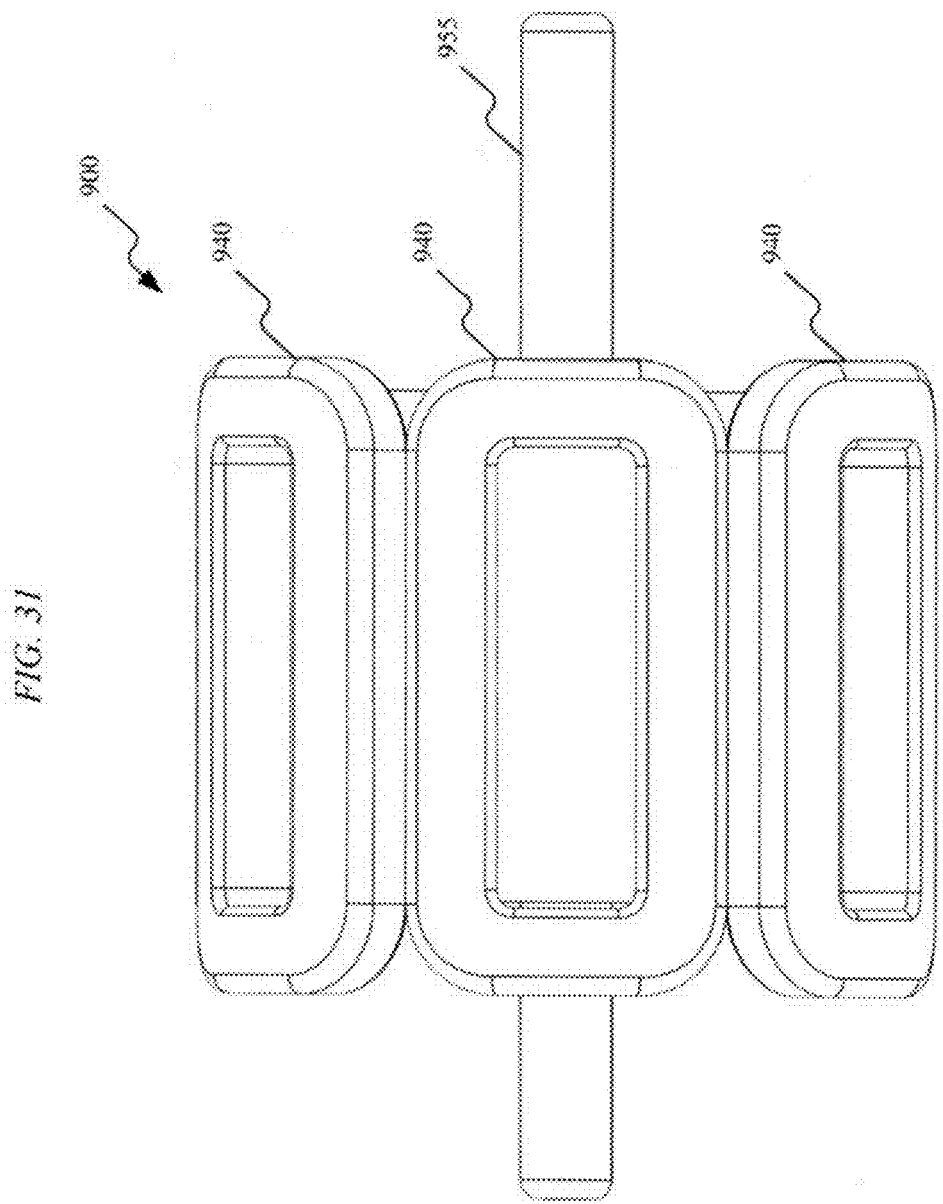
Figure 32:
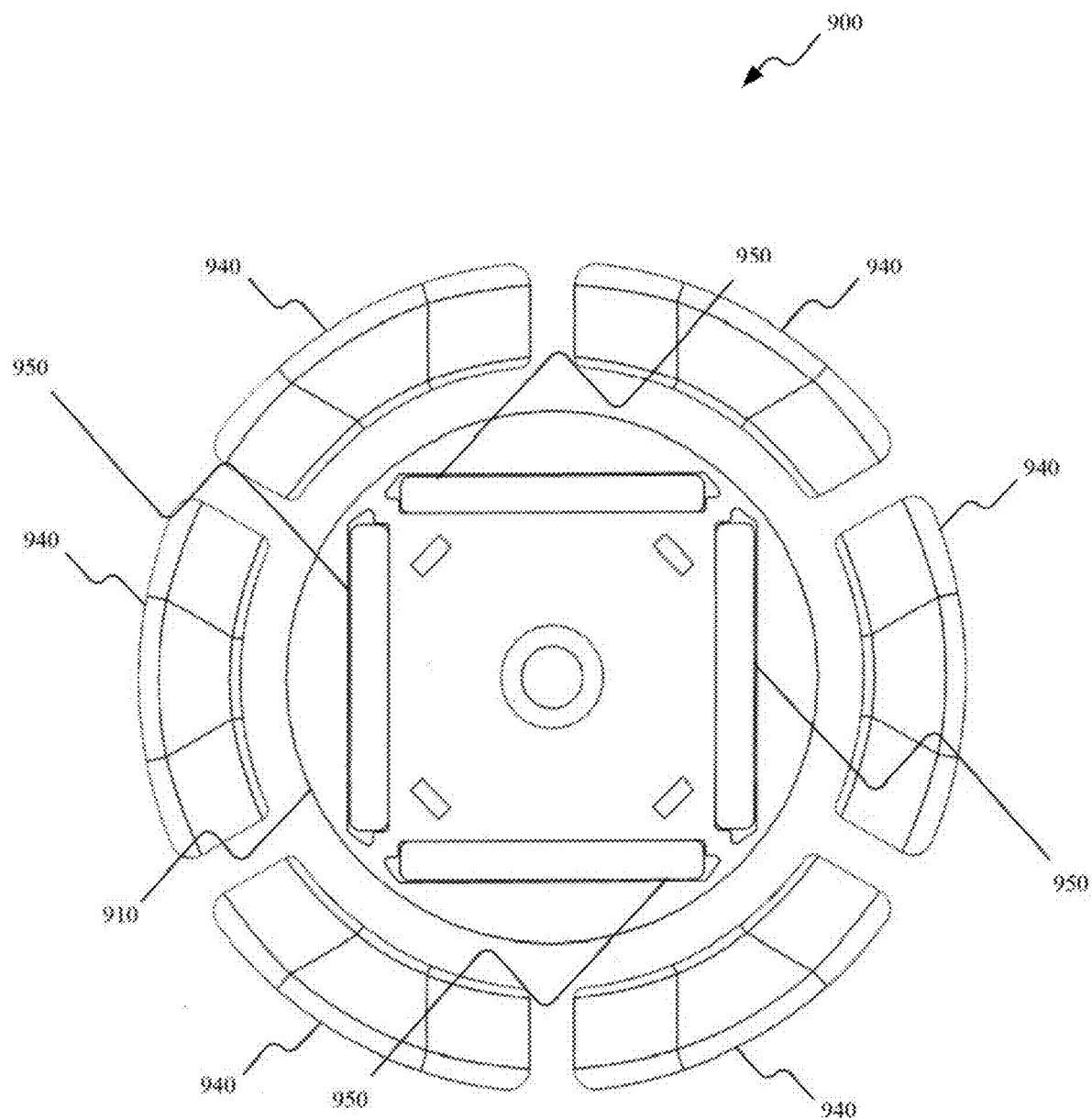
Figure 33:
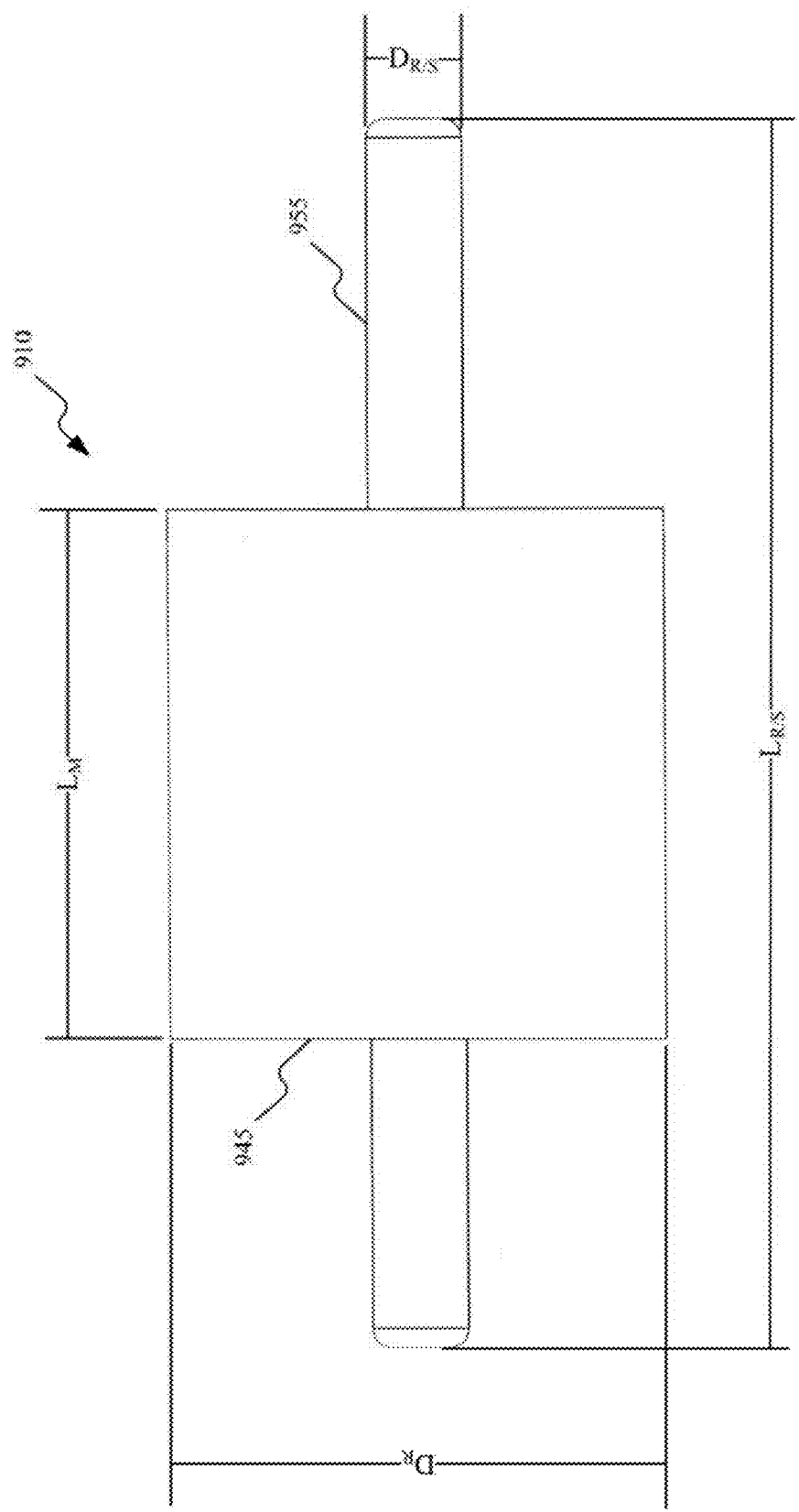
Figure 34:
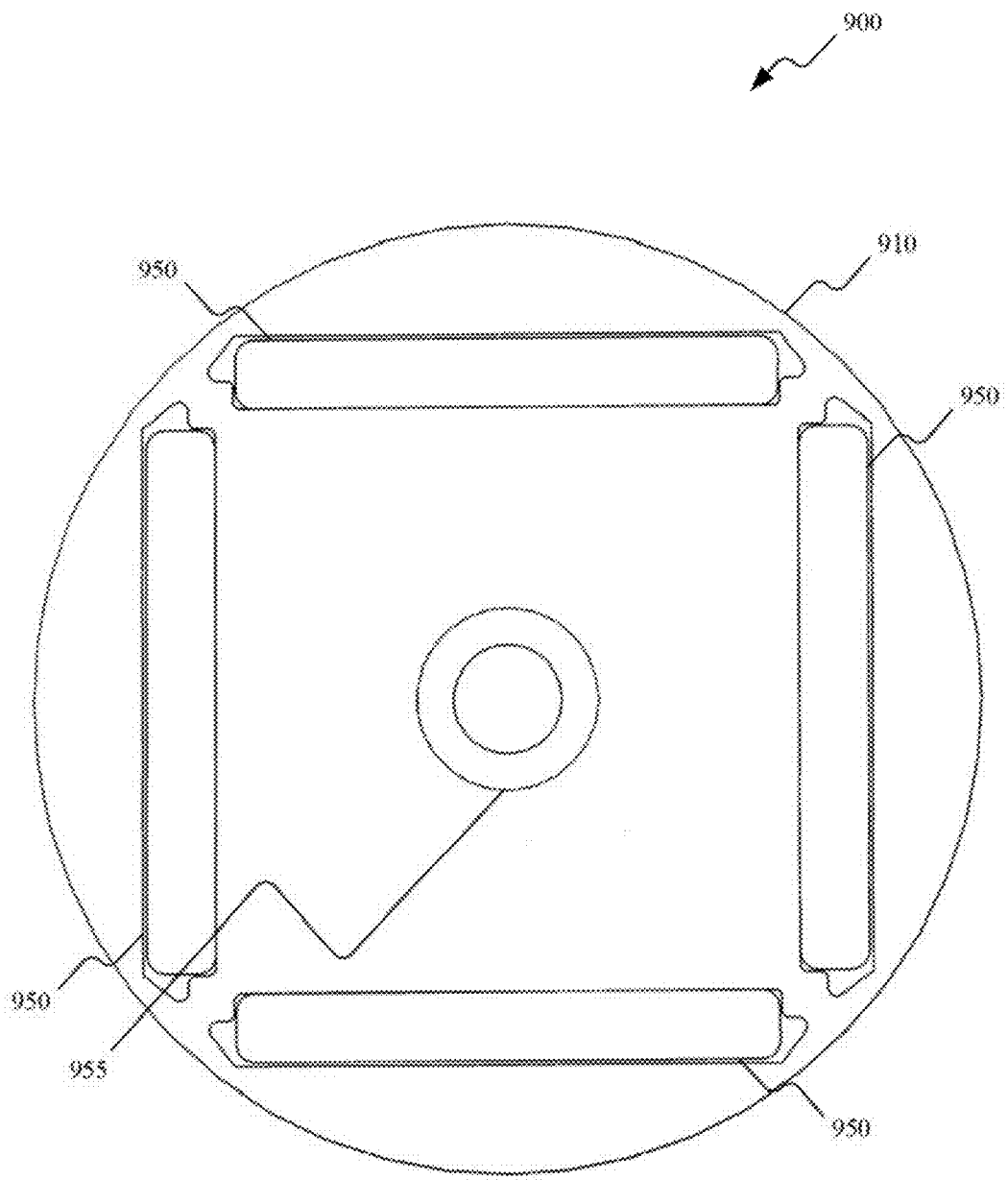
Figure 35:
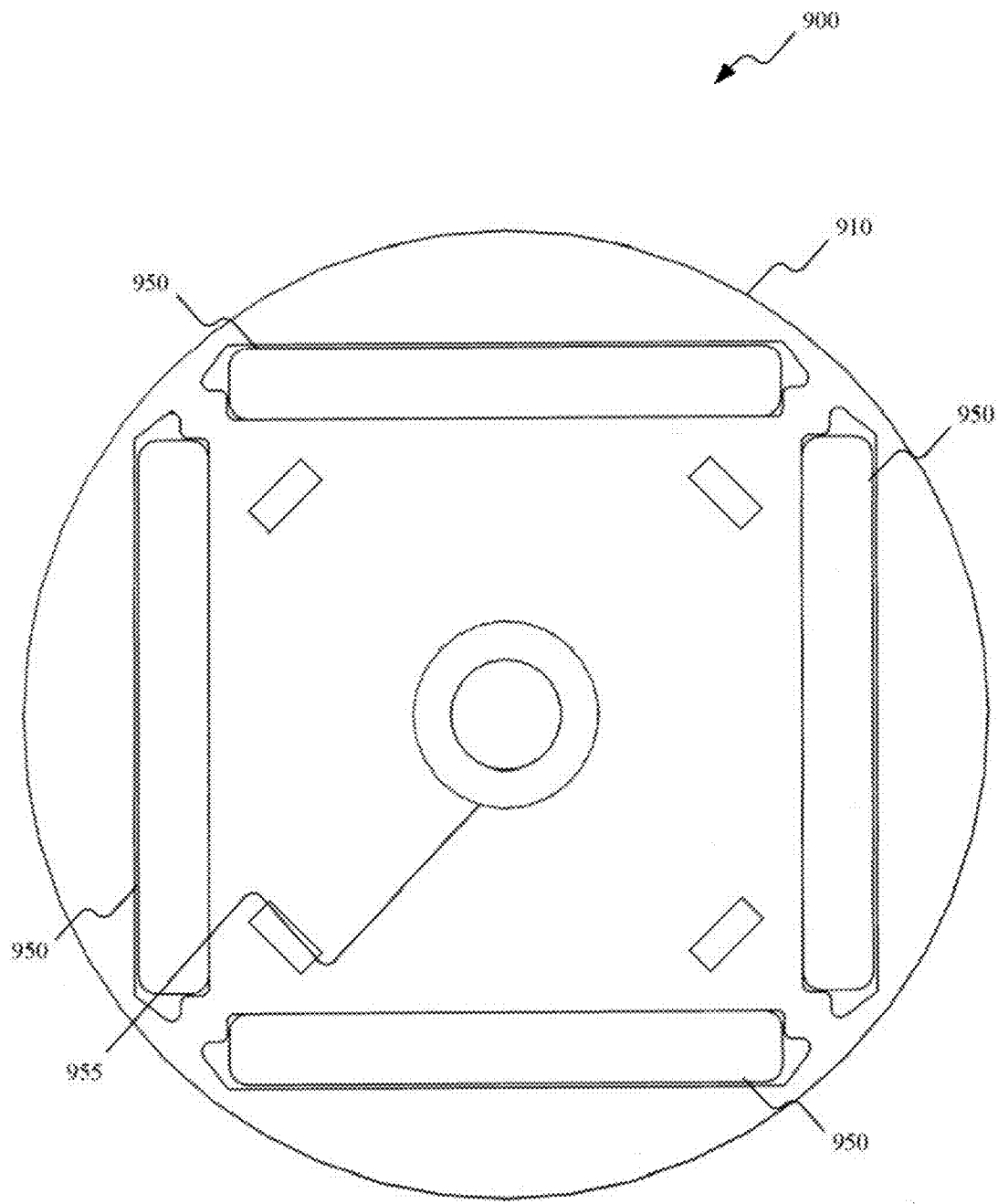

As illustrated in FIGS. 20-22, the impact driver 700 also includes, among other things, a surfboard PCB 760, a switch 765 connected to the trigger 735, a drive mechanism 770, and a BLDC motor 775. In some embodiments, the drive mechanism 770 can include a gear assembly, a mode selection mechanism, a clutch assembly, etc. The surfboard PCB 760 controls or regulates the power from the battery pack in order to selectively provide power to the motor 775, and includes switching FETs 780 for controlling the application of power to the BLDC motor 775. The surfboard PCB 760 includes, for example, six switching FETs 780 and a heat sink 785 (e.g., an aluminum, aluminum-alloy, copper, etc., heat sink). The FETs have a low drain-to-source resistance, such as below approximately 3.0 milli-Ohms. In some embodiments, the drain-to-source resistance of the FETs is between approximately 1.4 milli-Ohms and 2.0 milli-Ohms. In other embodiments, the drain-to-source resistance of the FETs has any value between approximately 1.0 milli-Ohms and 10.0 milli-Ohms.

By using lower than typical resistance FETs in combination with, for example, the heat sinking and airflow characteristics of the hand-held power tool described below, the heat generated by switching FETs is capable of being controlled and regulated more effectively by the hand-held power tool to enable increased drive currents to be passed through the switching FETs 780 and provided to the motor 775. For example, the Joule heating associated with passing high currents to the motor 775 are proportional to the value of the current squared multiplied by resistance. By reducing the resistance between the battery pack and the motor 775, the amount of Joule heating that results from the motor drawing high currents is reduced. Thus, the hand-held power tool is less susceptible to thermal failure when the motor 775 draws high currents. The FETs are, for example, IRLB3034 FETs or IRFS7437 FETs from International Rectifier, El Segundo, California. In some embodiments, the switching FETs 780 are directly coupled (i.e., directly physically and/or thermally coupled) to the heat sink 785 (e.g., directly on the heat sink, via copper tracings on a PCB, etc.). In other embodiments, the switching FETs are not directly coupled to the heat sink 785, but are in a heat transfer relationship with the heat sink 785. The number of switching FETs included in a hand-held power tool is related to, for example, the desired commutation scheme for the motor. The embodiments of the impact driver described herein are with respect to a six-step commutation scheme that includes six switching FETs 780 and six stator coils (e.g., composed of copper). In other embodiments, additional or fewer switching FETs and stator coils can be employed (e.g., 4, 8, 12, 16, between 4 and 16, etc.).

The electronics illustrated in FIGS. 21 and 22 include a surfboard PCB 760 located below the motor 775 of the impact driver 700. The impact driver 700 can, however, include different PCB configurations that the configuration illustrated in FIGS. 11 and 12. For example, the impact driver can include the PCB configuration illustrated in and described with respect to FIGS. 4 and 5 (e.g., a multi-PCB configuration or distributed PCB configuration). The impact driver can also include the "doughnut" PCB illustrated in and described with respect to FIGS. 49 and 50. The differences between the various PCB configurations are described below. For example, each PCB configuration may result in a different weight for the electronics package of the impact driver 700. However, each of the PCB configurations described herein has approximately the same total weight. The PCB configuration can also affect, for example, the location and number of external air vents, the location and size of heat sinks, etc., which can impact the performance characteristics of the impact driver.

The drive mechanism 770 is operable to reduce the speed of a rotating motor shaft to a speed that is suitable for the impact driver 700. The drive mechanism 770 is coupled to the output drive device 725 for driving an output device (e.g., a drill bit, etc.). The drive mechanism 770 is not described in detail herein because the characteristics of the drive mechanism 770 can vary from one type of hand-held power tool to another depending upon the particular action that the hand-held power tool is performing (e.g., the action of an impact driver is different from the action of a drill/driver). However, the BLDC motor is described in greater detail below. The impact driver 700 also includes additional internal components and mechanisms illustrated in FIG. 20 that are not explicitly described herein but are known to those skilled in the art (e.g., a hammer mechanism, an anvil, etc.).

FIGS. 21 and 22 illustrate selected portions of the impact driver 700. For example, FIGS. 21 and 22 illustrate the electronics and the motor of the impact driver 700. Although the motor 775 is described in greater detail below, for the sake of clarity and context, the motor 775 includes, among other things, a fan 790 (e.g., plastic, metal, etc.), bearings 795, a stator 800 (described below), a rotor (described below), and a shaft 805. The fan 790 is operable to force air 810 (see FIG. 20) over the switching FETs 780 of the surfboard PCB 760 to improve the dissipation of heat from the switching FETs 780. The air exits the hand-held power tool through the vents 745. The electronics include the surfboard PCB 760, the switching FETS 780, the trigger 735 and associated switch 765, the worklight 750, the forward/reverse switch 730, the heat sink 785, and a Hall Effect PCB 815, as well as assorted wires (e.g., 14AWG wires for providing power from the battery pack to the motor) and other components for connection, protection, and operation of the impact driver 700. In general, the electronics include all portions of the impact driver 700 minus the following: the housing, the battery pack, mechanical components (e.g., a gear assembly, a clutch, etc.), and the motor 775. The remaining portions of the impact driver 700 are considered the "electronics" (e.g., PCBs, wires, switches, terminals, sensors, LEDs, etc.).

The impact driver 700, for example, can be powered by an 18V battery pack. The impact driver 700 can operate at speeds between, for example, 0-2900 RPM, generate 1600 in-lbs of maximum torque (i.e., stall torque), produce approximately 0-3600 impacts per minute ("IPM"), and weigh only approximately 3.6 lbs with a ten-cell extra-capacity battery pack (e.g., 3.0 Ah), such as the M18™ XC High Capacity REDLITHIUM™ battery pack, manufactured and sold by Milwaukee Electric Tool, Milwaukee, Wisconsin, or the battery packs as described below. In some embodiments, the impact driver 700 and extra-capacity battery pack weigh less than approximately 4.0 lbs. In other embodiments, the impact driver and the extra-capacity battery pack weigh between approximately 3.0 lbs and approximately 3.8 lbs, or between approximately 3.0 lbs and approximately 4.0 lbs.

If a five-cell regular-capacity battery pack were to be used to power the impact driver, the impact driver 700 can operate at speeds between, for example, 0-2900 RPM, generate 1600 in-lbs of maximum torque (i.e., stall torque), produce approximately 0-3600 impacts per minute ("IPM"), and weigh only approximately 3.0 lbs with a five-cell regular-capacity battery pack (e.g., 1.5 Ah), such as the M18™ REDLITHIUM™ 2.0 compact battery pack, manufactured and sold by Milwaukee Electric Tool, Milwaukee, Wisconsin, or the battery packs as described below. In some embodiments, the impact driver 700 and regular-capacity battery pack weigh less than approximately 3.0 lbs. In other embodiments, the impact driver and the regular-capacity battery pack weigh between approximately 2.5 lbs and approximately 3.5 lbs, or between approximately 2.5 lbs and approximately 4.0 lbs.

Each of the above described cordless, hand-held power tools (i.e., the hammer drill 100, the drill/driver 300, the impact wrench 500, and the impact driver 700), as well as additional hand-held power tools such as a saw, an angle grinder, a bandsaw, a belt sander, a chainsaw, a circular saw, a concrete saw, a disc sander, a floor sander, a jigsaw, a rotary hammer, a grinder, a nail gun, a reciprocating saw (e.g., one-handed reciprocating saw or two-handed reciprocating saw), a router, etc., can include a BLDC motor 900 as illustrated in and described with respect to FIGS. 23-35

(introduced previously above as motors 185, 370, 570, and 775). In other embodiments, the motor 900 and electronics described herein can be implemented with a power source (e.g., a battery pack) for a variety of non-hand-held power tools, such as a magnetic base drill stand, a miter saw, a scroll saw, etc. In such embodiments, the performance of the motor (e.g., short-run and long-run performance characteristics) is the same or similar to that of the hand-held power tools described herein.

The motor 900 illustrated in FIGS. 23-35 is a BLDC motor and includes a stator 905, a rotor 910 (see FIG. 32), a first motor bearing 915, a second motor bearing 920, a fan 925 (e.g., plastic, metal, etc.), a first stator end connecting portion 930, and a second stator end connecting portion 935. The stator 905 includes a plurality of coils 940 and stator laminations. In the illustrated embodiment, the motor 900 includes six stator coils 940 (i.e., three pairs of stator coils). The stator coils 940 (e.g., composed of copper) are wrapped around the laminations of the stator 905 formed between the first end connection portion 930 and the second end connection portion 935. As described above, the motor 900 can include a different number of stator coils than the illustrated six stator coils (e.g., between 4 and 16 stator coils). The design and construction of the motor 900 is such that its performance characteristics are in balance with the control electronics and battery pack described herein in order to maximize the output power capability of the hand-held power tool. The motor 900 is composed primarily of steel (e.g., steel laminations), permanent magnets (e.g., sintered Neodymium Iron Boron), and copper (e.g., copper stator coils). The size and dimensions related to various motor features described herein are provided with respect to exemplary ranges of values for maximizing the performance of the motor (e.g., maximum long and short duration output power, torque, etc.). The characteristics and features of the motor 900 described herein dictate the performance capabilities of the motor 900. As such, values and ranges of values for these features and characteristics have been provided which, when implemented in combination with the battery pack and control electronics also described herein, maximize both short-run and long-run output power of the hand-held power tool.

The motor stator 905 includes an outer stator diameter, $D_S$, an inner stator diameter, $D_{IS}$, and a stator length, $L_S$ (i.e., active motor length). For example, the outer stator diameter can have a value of, for example, approximately 40 millimeters ("mm"), 45 mm, 50 mm, or 60 mm. These exemplary stator outer diameters are illustrative of practical outer stator diameters for a hand-held power tool including a BLDC motor. However, other outer stator diameters for the motor 900 are also possible. For example, outer stator diameters between approximately 40 mm and approximately 60 mm can be used. In other embodiments, outer stator diameters of less than approximately 40 mm (e.g., between approximately 20 mm and approximately 40 mm) or greater than approximately 60 mm (e.g., between approximately 60 mm and approximately 80 mm) can also be used.

The inner stator diameter of the motor 900 can also have a variety of values. For example, the inner stator diameter is dependent upon, at least in part, the outer stator diameter of the motor. For a 40 mm outer stator diameter, the inner stator diameter is approximately 23 mm. For a 45 mm outer stator diameter, the inner stator diameter is approximately 25 mm. For a 50 mm outer stator diameter, the inner stator diameter is approximately 27 mm. For a 60 mm outer stator diameter, the inner stator diameter is approximately 33 mm. As described above with respect to the outer stator diameter, the inner stator diameter can also have other values. For example, the inner stator diameter of the motor 900 can have a value of between approximately 20 mm and 40 mm. Additionally or alternatively, the inner stator diameter can have a value that represents a percentage of the outer stator diameter (e.g., between approximately 30% and approximately 60% of the outer stator diameter). As an illustrative example, a motor having an outer stator diameter of approximately 50 mm can have an inner stator diameter of approximately 27 mm, which represents an inner stator diameter that is approximately 54% of the outer stator diameter.

The stator length, $L_S$, has a value of between approximately 19 mm and approximately 29 mm. For example, in one embodiment, the stator length, $L_S$, is approximately 24 mm. In other embodiments, the stator length, $L_S$, has any value between approximately 12 mm and 36 mm.

The rotor 910 of the motor 900 includes a cylindrically-shaped rotor portion 945, a plurality of permanent magnets 950 set or embedded within the rotor portion 945, and a rotor shaft 955. The rotor shaft 955 has a rotor shaft length, $L_{R/S}$, and a shaft diameter $D_{R/S}$, and the rotor portion 945 has a rotor portion length or magnet length, $L_M$. In the illustrated embodiment, the rotor 910 has a rotor diameter, $D_R$, the magnet length, $L_M$, a bearing-to-bearing length, $L_{BB}$, and the rotor or rotor shaft length, $L_{R/S}$ (i.e., total motor length). The illustrated BLDC motor is, for example, approximately 30%-40% more efficient than conventional motors for hand-held power tools. For example, the motor 900 does not have power losses resulting from brushes. The motor also combines the removal of steel from the rotor (i.e., in order to include the plurality of permanent magnets) and windings of copper in the stator coils to increase the power density of the motor (i.e., removing steel from the rotor and adding more copper in the stator windings can increase the power density of the motor). Motor alterations such as these allow the motor 900 having the characteristics described herein to produce more power than a conventional motor of the same length, or, alternatively, to produce the same or more power from a motor smaller than the convention motors for hand-held power tools.

In some embodiments, the rotor diameter, $D_R$, has a value of between approximately 23 mm and approximately 29 mm. For example, in one embodiment, the rotor diameter, $D_R$, is approximately 26 mm. In other embodiments, the rotor diameter, $D_R$, has any value between approximately 20 mm and 30 mm. In some embodiments, the rotor length, $L_R$, has a value of between approximately 60 mm and approximately 70 mm. For example, in one embodiment, the rotor length, $L_R$, is approximately 65 mm. In other embodiments, the rotor length, $L_R$, has any value between approximately 55 mm and 75 mm. In some embodiments, the bearing-to-bearing length, $L_{BB}$, has a value of between approximately 40 mm and approximately 50 mm. For example, in one embodiment, the bearing-to-bearing length, $L_{BB}$, is approximately 46 mm. In other embodiments, the bearing-to-bearing length, $L_{BB}$, has any value between approximately 43 mm and 49 mm. In some embodiments, the rotor shaft diameter, $D_S$, has a value of between approximately 3 mm and approximately 7 mm. For example, in one embodiment, the rotor shaft diameter, $D_S$, is approximately 5 mm. In other embodiments, the rotor shaft diameter, $D_S$, has any value between approximately 4 mm and 6 mm. In some embodiments, the magnet length, $L_M$, has a value of between approximately 25 mm and approximately 30 mm. For example, in one embodiment, the magnet length, $L_M$, is approximately 28 mm. In other embodiments, the magnet length, $L_M$, has any value between approximately 16 mm and 36 mm.

Figure 36:
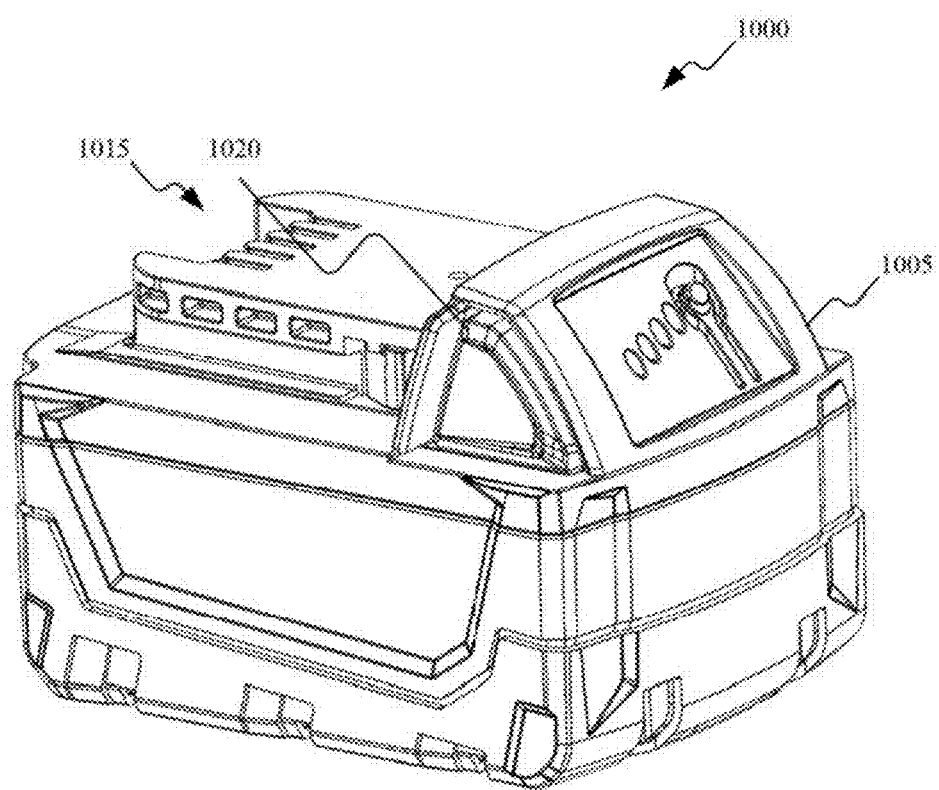
FIGS. 36-40 illustrate a battery pack for a hand-held power tool according to an embodiment of the invention.
Figure 37:
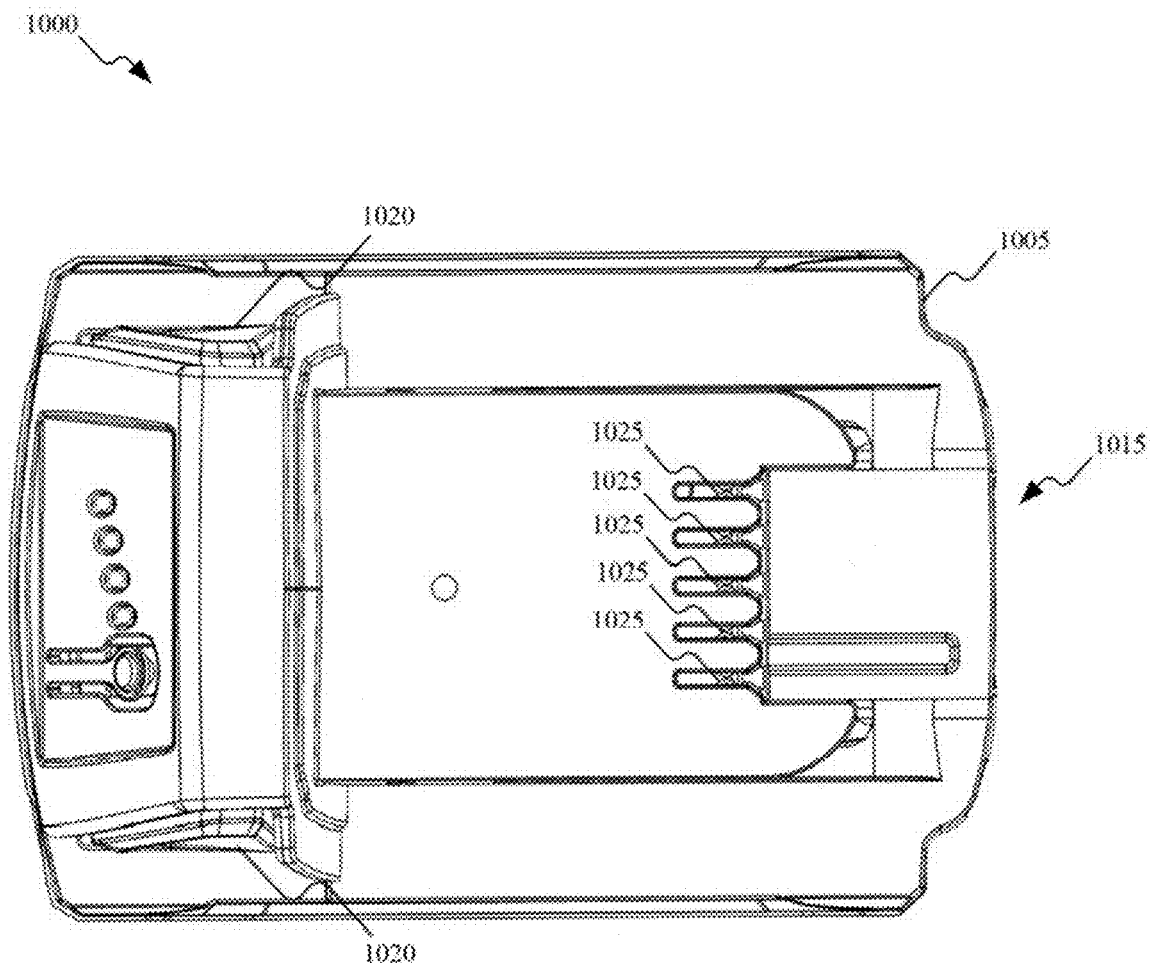
Figure 38:
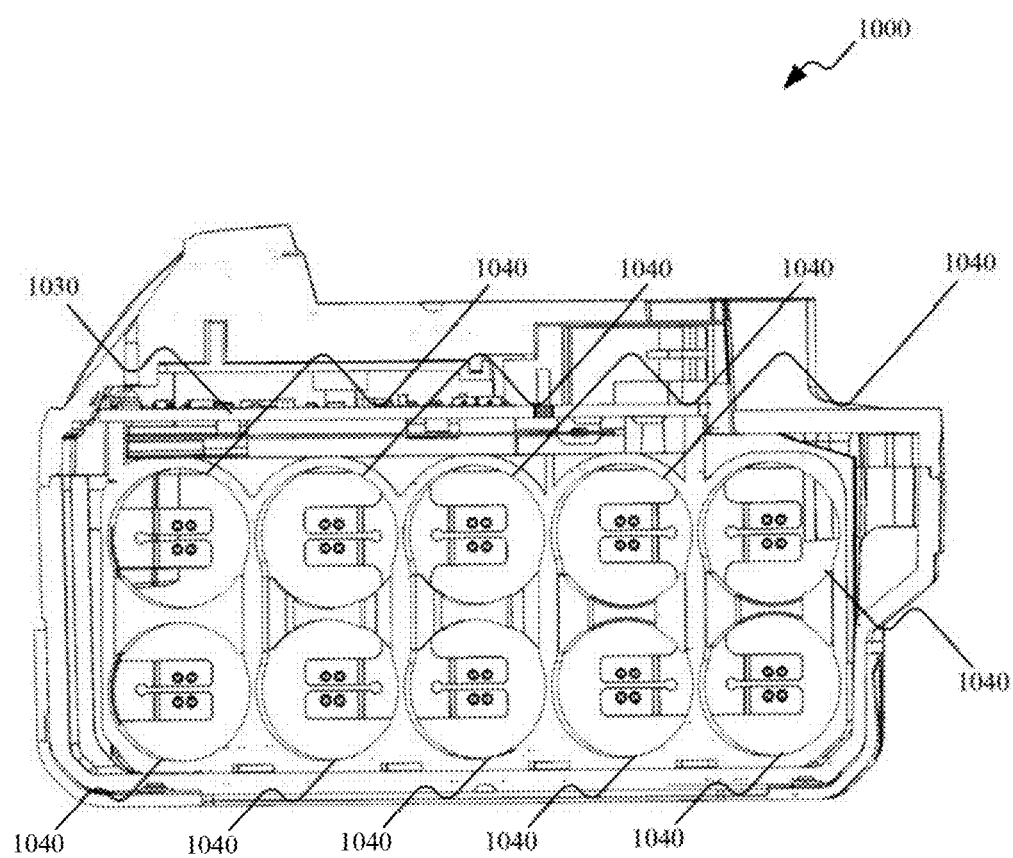

The motor 900 described above receives power (i.e., voltage and current) from a battery pack, such as the battery pack 1000 illustrated in FIGS. 36-40 for powering the cordless, hand-held power tools 100, 300, 500, and 700. The battery pack 1000 is connectable to and supportable by the cordless, hand-held power tools 100, 300, 500, and 700. As shown in FIGS. 36-38, the battery pack 1000 includes a housing 1005 and at least one rechargeable battery cell 1010 (shown in FIGS. 39 and 40) supported by the housing 1005. The battery pack 1000 also includes a support portion 1015 for supporting the battery pack 1000 on and coupling the battery pack 1000 to a hand-held power tool, a coupling mechanism 1020 for selectively coupling the battery pack to, or releasing the battery pack 1000 from, a hand-held power tool. In the illustrated embodiment, the support portion 1015 is connectable to a complementary support portion on the hand-held power tool (e.g., the battery pack receiving portion 115, 315, 515, and 715).

The battery pack 1000 includes a plurality of terminals 1025 of a terminal assembly within the support portion 1015 and operable to electrically connect the battery cells 1010 to a PCB 1030 within the battery pack 1000. The plurality of terminals 1025 includes, for example, a positive battery terminal, a ground terminal, and a sense terminal. The battery pack 1000 is removably and interchangeably connected to a hand-held power tool to provide operational power to the hand-held power tool. The terminals 1025 are configured to mate with corresponding power terminals extending from a hand-held power tool (e.g., within the battery pack receiving portion 115, 315, 515, and 715). The battery pack 1000 substantially encloses and covers the terminals on the hand-held power tool when the pack 1000 is positioned within the battery pack receiving portion 115, 315, 515, and 715. That is, the battery pack 1000 functions as a cover for the opening and terminals of the hand-held power tool. Once the battery pack 1000 is disconnected from the hand-held power tool, the terminals on the hand-held power tool are generally exposed to the surrounding environment. In this illustrated embodiment, the battery pack 1000 is designed to substantially follow the contours of the hand-held power tool to match the general shape of the outer casing of the handle of the hand-held power tool, and the battery pack 1000 generally increases (e.g., extends) the length of the grip of the tool (i.e., the portion of the power tool below the main body).

The illustrated battery pack 1000 includes 10 battery cells 1010. In other embodiments, the battery pack 1000 can have more or fewer battery cells 1010. The battery cells can be arranged in series, parallel, or a series-parallel combination. For example, the battery pack can include a total of 10 battery cells configured in a series-parallel arrangement of five sets of two series-connected cells. The series-parallel combination of battery cells allows for an increased voltage and an increased capacity of the battery pack. In some embodiments, the battery pack 1000 includes five series-connected battery cells. In other embodiments, the battery pack 1000 includes a different number of battery cells (e.g., between 3 and 12 battery cells) connected in series, parallel, or a series-parallel combination in order to produce a battery pack having a desired combination of nominal battery pack voltage and battery capacity.

Figure 39:
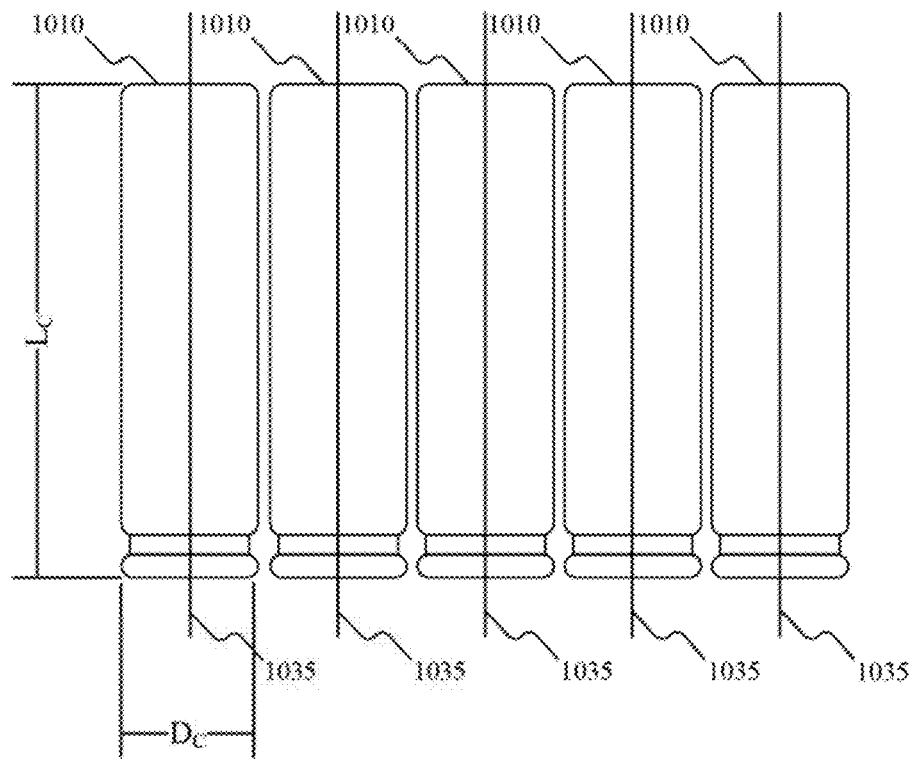
Figure 40:
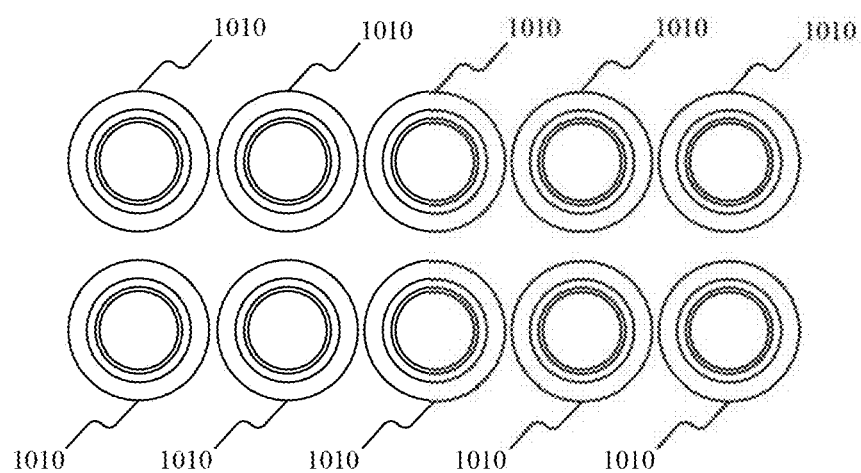

The illustrated battery cells 1010 are, for example, cylindrical 18650 battery cells (18 mm diameter and 65 mm length), such as the INR18650-15M lithium-ion rechargeable battery cell manufactured and sold by Samsung SDI Co., Ltd. of South Korea. Each battery cell includes a cell axis 1035, a cell length, $L_C$, and a cell diameter, $D_C$, as illustrated in FIGS. 39 and 40. In other embodiments, the battery cells 1010 are, for example, cylindrical 14500 battery cells (14 mm diameter and 50 mm length), 14650 battery cells (14 mm diameter and 65 mm length), 17500 battery cells (17 mm diameter and 50 mm length), 17670 battery cells (17 mm diameter and 67 mm length), 18500 battery cells (18 mm diameter and 50 mm length), 26650 battery cells (26 mm diameter and 65 mm length), 26700 battery cells (26 mm diameter and 70 mm length), etc. Each battery cell 1010 can be generally cylindrical and can extend along the cell axis 1035 parallel to the cylindrical outer cell wall. Also, in the battery pack 1000, each battery cell 1010 can have a cell length, $L_C$, which is greater than or equal to two times the cell diameter, $D_C$. In some embodiments, the battery cells are lithium-based prismatic battery cells (e.g., between 1.5 Ah-5.0 Ah in battery capacity) having dimensions of, for example, approximately 50 mm to approximately 80 mm in length, approximately 60 mm to approximately 90 mm in width, and approximately 3 mm to approximately 8 mm in height. The prismatic battery cells can be implemented using, for example, a wound configuration, a wound and flattened configuration, a wound and folded configuration, or a layered and folded configuration.

The battery cells 1010 are lithium-based battery cells having a chemistry of, for example, lithium-cobalt ("Li—Co"), lithium-manganese ("Li—Mn"), or Li—Mn spinel. In some embodiments, the battery cells 1010 have other suitable lithium or lithium-based chemistries, such as a lithium-based chemistry that includes manganese, etc. The battery cells within the battery pack 1000 provide operational power (e.g., voltage and current) to the power tools. In one embodiment, each battery cell 1010 has a nominal voltage of approximately 3.6V, such that the battery pack has a nominal voltage of approximately 18V. In other embodiments, the battery cells have different nominal voltages, such as, for example, between 3.6V and 4.2V, and the battery pack has a different nominal voltage, such as, for example, 10.8V, 12V, 14.4V, 24V, 28V, 36V, between 10.8V and 36V, etc. The battery cells also have a capacity of, for example, approximately between 1.0 ampere-hours ("Ah") and 5.0 Ah. In exemplary embodiments, the battery cells have capacities of approximately, 1.5 Ah, 2.4 Ah, 3.0 Ah, 4.0 Ah, between 1.5 Ah and 5.0 Ah, etc.

The battery cells 1010 are arranged and spaced apart form one another by the battery pack 1000 (e.g., each cell is provided in an individual cell receiving area 1040 within the battery pack 1000 that spaces each cell apart) to reduce the cell-to-cell heat transfer between the battery cells 1010 and to improve the collection and removal of heat from the battery cells 1010. In this manner, the battery cells 1010 may be able to be maintained in an appropriate temperature operating range (e.g., below 60° C.) for longer durations of use. The battery cells 1010 are also arranged to provide an efficient use of space and to maintain a relatively small pack size.

The illustrated battery cells 1010 are optimized to have a low internal resistance and, as a result, and increased discharge current capability. For example, cylindrical (i.e., jelly-roll) type battery cells include three main components: an anode or negative electrode; a cathode or positive electrode; and an electrolyte. The anode gives up electrons to the external circuit and is oxidized during the electrochemical reaction. The cathode accepts electrons from the external circuit and is reduced during the electrochemical reaction.

The electrolyte provides a medium for transferring charge (i.e., as ions) inside the cell between the anode and the cathode. Typical lithium-based cylindrical battery cells also include, among other things, the cathode and the anode as described above, a cathode lead for connecting to the positive terminal of the battery cell, an anode lead for connecting to the negative terminal of the battery cell, a separator (i.e., a non-aqueous electrolyte), an outer can for housing the cathode, anode, and separator, a top cover (e.g., which can be crimped to the can to seal the battery cell), and a gasket for providing a seal between the can and the top cover. The battery cells 1010 can also include safety devices, such as, for example, a positive temperature coefficient ("PTC") device within each battery cell.

The performance of the battery cells 1010 can be improved in a variety of ways. As an illustrative example, in order to increase the discharge current that the battery cells are capable of producing, the size of the electrodes (i.e., anode and cathode) is increased in order to increase the reaction surfaces between the electrodes and minimize the internal resistance of the battery cell. For example, making the battery cells taller (i.e., cell length) and wider (i.e., cell diameter) can increase the reaction area of the electrodes. Variations in battery cell characteristics such as porosity, the thickness of the separator, the thickness of current collectors, etc., can also affect the internal resistance of the battery cells and be optimized for a particular application. The basic design and assembly of the illustrated battery cells 1010 is know in the art. For example, details of the construction of cylindrical battery cells is described in the "*Handbook of Batteries*," third edition, by David Linden and Thomas Reddy, 2002.

The illustrated battery cells have been manufactured using, for example, the above described techniques to provide battery cells having a low internal resistance and increased discharge capability, while maintaining durability, cycle life, calendar life, etc. In some embodiments, the impedance of the battery pack 1000 is less than approximately 600 milli-Ohms. In other embodiments the impedance of the battery pack is between approximately 400 milli-Ohms and approximately 600 milli-Ohms. In some embodiments, the battery cells 1010 are capable of producing an average long-run discharge current of, for example, greater than or equal to approximately 25 amperes or between approximately 20 amperes and approximately 40 amperes. The average long-run discharge current (or torque, output power, speed, etc.) of the battery cells is the average current capable of being discharged by the battery cells when the battery pack is operated through a complete discharge cycle (e.g., continuously from a fully-charged level until the battery pack reaches a low-voltage cutoff). In other embodiments, the average discharge current capable of being produced by the battery cells 1010 is between approximately 28 amperes and approximately 32 amperes. The battery cells 1010 are also capable of higher short-run currents (a process and time period for determining these values is described below). For example, the battery cells are capable of producing an average short-run discharge current of greater than or equal to approximately 55 amperes or between approximately 55 amperes and approximately 75 amperes. In other embodiments, the average discharge current capable of being produced by the battery cells 1010 is between approximately 20 amperes and approximately 75 amperes.

Figure 41:
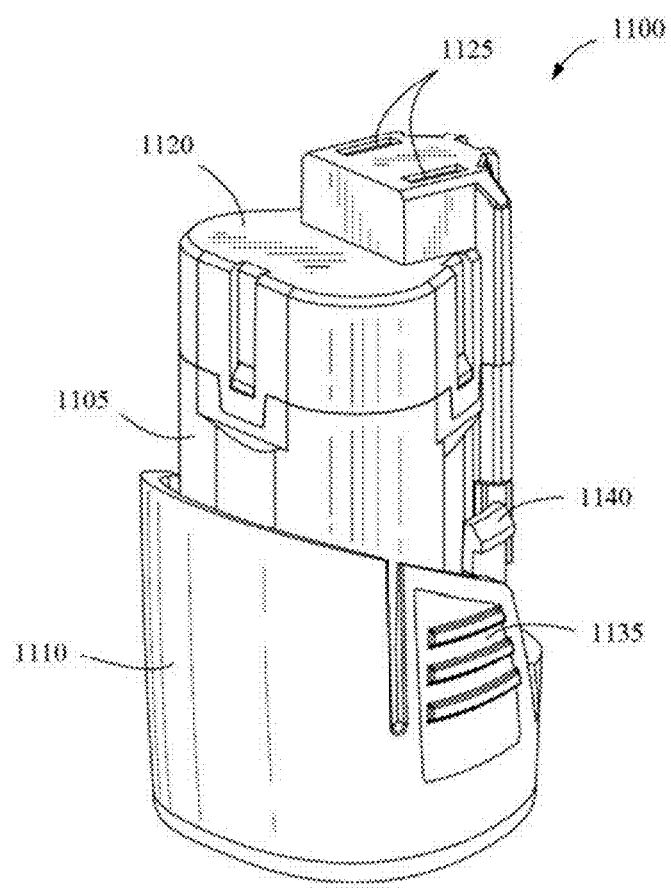
FIGS. 41-43 illustrate a battery pack for a hand-held power tool according to another embodiment of the invention.
Figure 42:
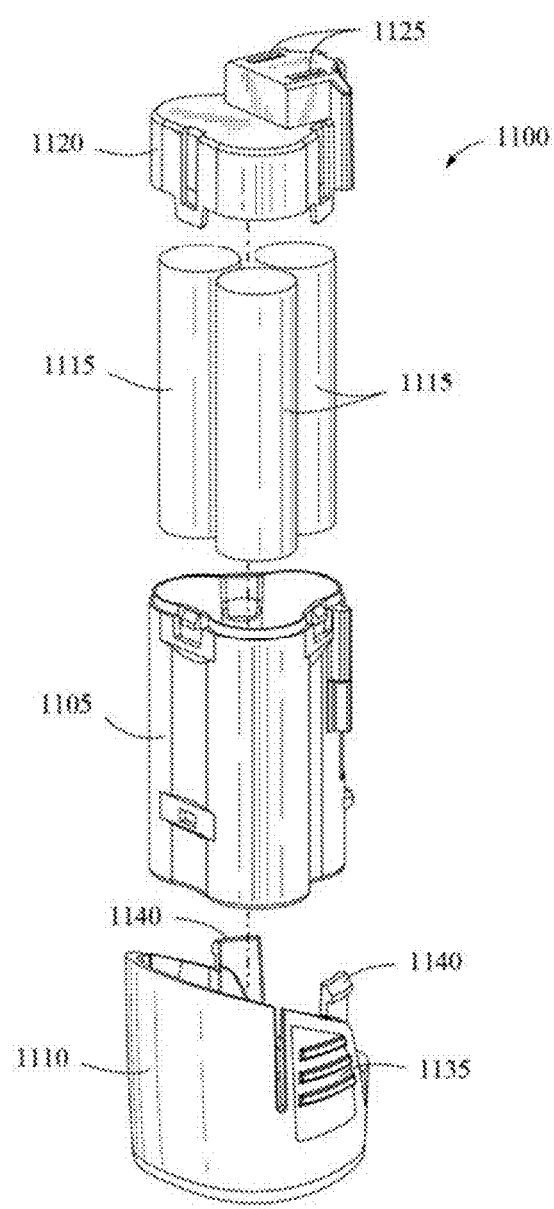
Figure 43:
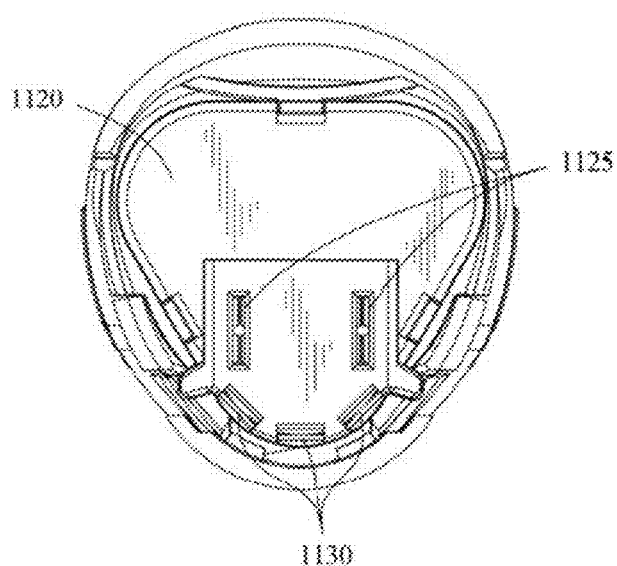

FIGS. 41-43 illustrate another battery pack 1100 that is configured to be used with hand-held power tools such as those described above. In the embodiment illustrated in FIGS. 41-43, the battery pack 1100 has the same battery cells as those described above with respect to the battery pack 1000 (illustrated as battery cells 1115 in this embodiment). The battery pack 1100 is removably and interchangeably connected to a hand-held power tool to provide operational power to the hand-held power tool.

The battery pack 1100 includes a casing 1105, an outer housing 1110 coupled to the casing 1105, and a plurality of battery cells 1115 (see FIG. 42) positioned within the casing 1105. The casing 1105 is shaped and sized to fit within an opening and cavity in a hand-held power tool. For example, a recess for receiving the battery pack 1100 similar to those disclosed in the devices in U.S. Pat. No. 8,251,157, issued Aug. 28, 2012 and entitled "BATTERY PACK FOR USE WITH A POWER TOOL AND A NON-MOTORIZED SENSING TOOL," the entire content of which is hereby incorporated by reference, can be used. The casing 1105 includes an end cap 1120 to substantially enclose the battery cells 1115 within the casing 1105. The illustrated end cap 1120 includes two power terminals 1125 configured to mate with corresponding power terminals extending from a hand-held power tool. In other embodiments, the end cap 1120 may include terminals that extend from the battery pack 1100 and are configured to be received in receptacles supported by a hand-held power tool. The end cap 1120 also includes sense or communication terminals 1130 (shown in FIG. 43) that are configured to mate with corresponding terminals from a hand-held power tool. The casing 1105 and the receptacles substantially enclose and cover the terminals on the tool when the pack 1100 is positioned within the opening. That is, the battery pack 1100 functions as a cover for the opening and terminals of the hand-held power tool. Once the battery pack 1100 is disconnected from the hand-held power tool and the casing 1105 is removed from the opening, the battery terminals on the hand-held power tool are generally exposed to the surrounding environment.

The outer housing 1110 is coupled to an end of the casing 1105 substantially opposite the end cap 1120 and surrounds a portion of the casing 1105. In the illustrated construction, when the casing 1105 is inserted into or positioned at least partially within the corresponding opening in the hand-held power tool, the outer housing 1110 generally aligns with an outer surface of the hand-held power tool. In this embodiment, the outer housing 1110 is designed to substantially follow the contours of the hand-held power tool to match the general shape of the outer casing of the handle of the hand-held power tool. In some embodiments, the casing 1105 is at least partially inserted into a grip of a hand-held power tool. In such embodiments, the outer housing 1110 generally increases (e.g., extends) the length of the grip of the tool (i.e., the portion of the power tool below the main body).

In the illustrated embodiment, two actuators 1135 (only one of which is shown) and two tabs 1140 are formed in the outer housing 1110 of the battery pack 1100. The actuators 1135 and the tabs 1140 define a coupling mechanism to releasably secure the battery pack 1100 to hand-held power tool. Each tab 1140 engages a corresponding recess formed in a hand-held power tool to secure the battery pack 1100 in place. The tabs 1140 are normally biased away from the casing 1105 (i.e., away from each other) due to the resiliency of the material forming the outer housing 1110. Actuating (e.g., depressing) the actuators 1135 moves the tabs 1140 toward the casing 1105 (i.e., toward each other) and out of engagement with the recesses such that the battery pack 1100 may be pulled out of the opening and away from the hand-held power tool. In some embodiments, a single tab and actuator are included in the battery pack 1100.

As shown in FIG. 42, the battery pack 1100 includes three battery cells 1115 positioned within the casing 1105 and electrically coupled to the terminals 1125. The battery cells 1115 provide operational power (e.g., DC power) to a hand-held power tool. In the illustrated embodiment, the battery cells 1115 are arranged in series, and each battery cell 32 has a nominal voltage of approximately 3.6V-4.0V, such that the battery pack 1100 has a nominal voltage of approximately twelve-volts (12V). The battery cells 1115 have the same chemistry as the battery cells described above with respect to the battery pack 1000, and are, for example, INR18650-15M lithium-ion rechargeable battery cells manufactured and sold by Samsung SDI Co., Ltd. of South Korea.

Figure 44:
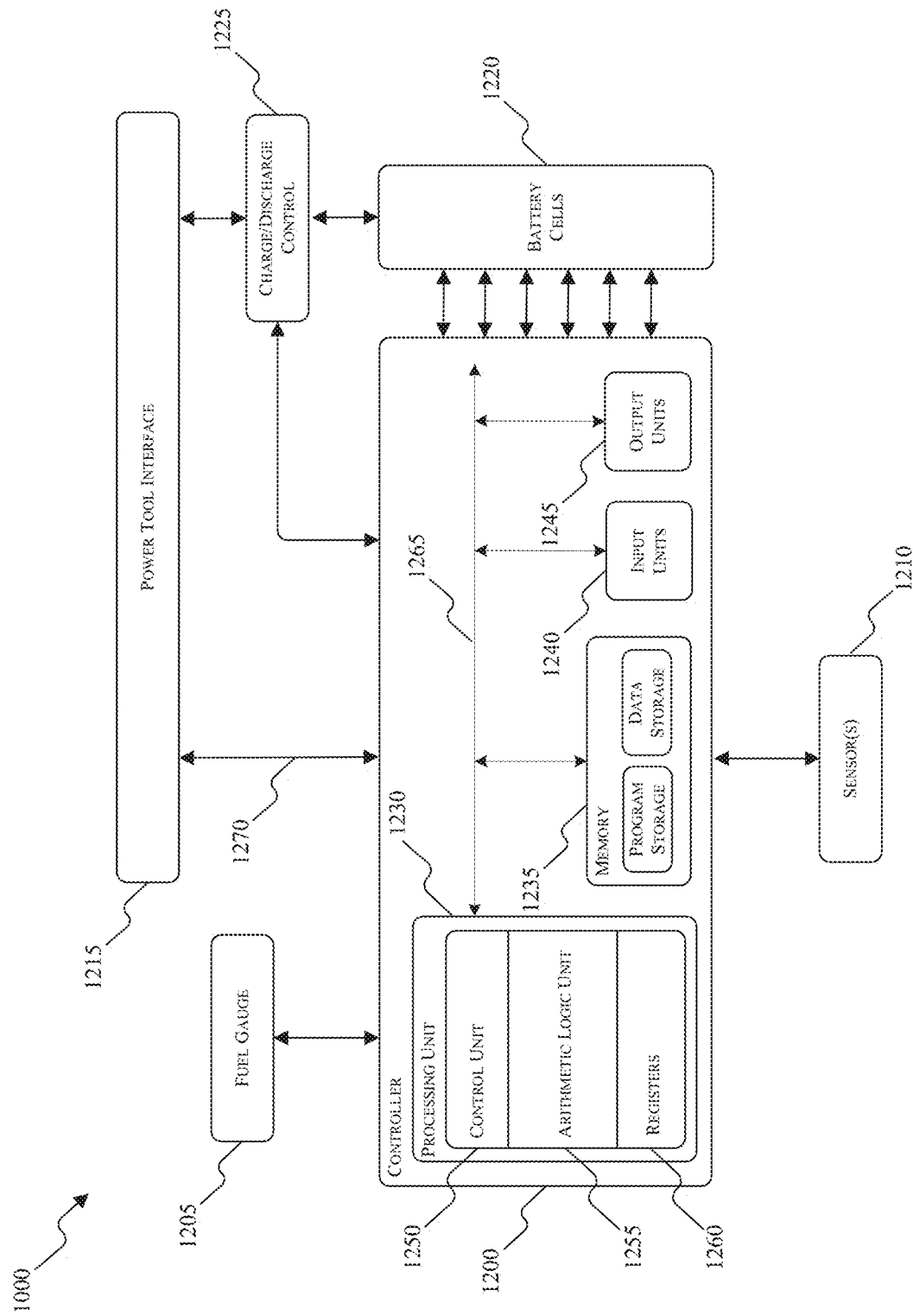
FIGS. 44-47 illustrate electronic circuitry for a hand-held power tool and a battery pack according to embodiments of the invention.
Figure 45:
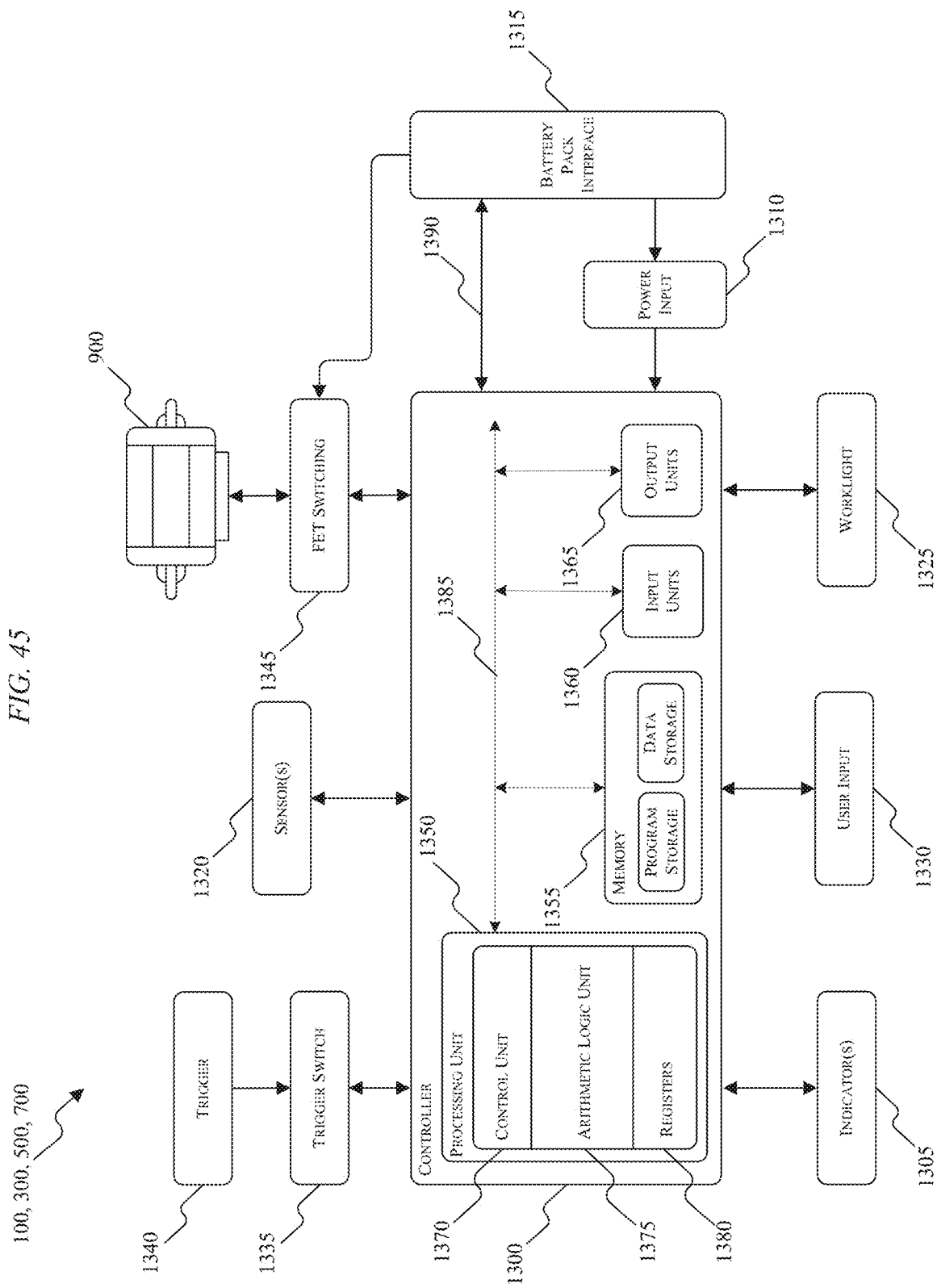

The power provided by the battery packs 1000 or 1100 to the motor 900 is controlled, monitored, and regulated using control electronics within the hand-held power tool and within the battery pack 1000, 1100, as illustrated in the electromechanical diagrams of FIGS. 44 and 45 (described with respect to the battery pack 1000). For example, FIG. 44 illustrates a controller 1200 associated with the battery pack 1000. The controller 1200 is electrically and/or communicatively connected to a variety of modules or components of the battery pack 1000. For example, the illustrated controller 1200 is connected to a fuel gauge 1205, one or more sensors 1210, a power tool interface 1215, a plurality of battery cells 1220, and a charge/discharge control module 1225 (optional within battery pack). The controller 1200 includes combinations of hardware and software that are operable to, among other things, control the operation of the battery pack 1000, activate the fuel gauge 1205 (e.g., including one or more LEDs), monitor the operation of the battery pack 1000, etc. The one or more sensors 1210 include, among other things, one or more temperature sensors, one or more voltage sensors, one or more current sensors, etc. The controller 1200 also includes a variety of preset or calculated fault condition values related to temperatures, currents, voltages, etc., associated with the operation of the hand-held power tool.

In some embodiments, the controller 1200 includes a plurality of electrical and electronic components that provide power, operational control, and protection to the components and modules within the controller 1200 and/or battery pack 1000. For example, the controller 1200 includes, among other things, a processing unit 1230 (e.g., a microprocessor, a microcontroller, or another suitable programmable device), a memory 1235, input units 1240, and output units 1245. The processing unit 1230 includes, among other things, a control unit 1250, an arithmetic logic unit ("ALU") 1255, and a plurality of registers 1260 (shown as a group of registers in FIG. 44), and is implemented using a known computer architecture, such as a modified Harvard architecture, a von Neumann architecture, etc. The processing unit 1230, the memory 1235, the input units 1240, and the output units 1245, as well as the various modules connected to the controller 1200 are connected by one or more control and/or data buses (e.g., common bus 1265). The control and/or data buses are shown generally in FIG. 44 for illustrative purposes. The use of one or more control and/or data buses for the interconnection between and communication among the various modules and components would be known to a person skilled in the art in view of the invention described herein. In some embodiments, the controller 1200 is implemented partially or entirely on a semiconductor (e.g., a field-programmable gate array ["FPGA"] semiconductor) chip, such as a chip developed through a register transfer level ("RTL") design process.

The memory 1235 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 1230 is connected to the memory 1235 and executes software instructions that are capable of being stored in a RAM of the memory 1235 (e.g., during execution), a ROM of the memory 1235 (e.g., on a generally permanent basis), or another non-transitory computer readable medium such as another memory or a disc. Software included in the implementation of the battery pack 1000 can be stored in the memory 1235 of the controller 1200. The software includes, for example, firmware, one or more applications, program data, filters, rules, one or more program modules, and other executable instructions. The controller 1200 is configured to retrieve from memory and execute, among other things, instructions related to the control of the battery pack described herein. The controller 1200 can also store various battery pack parameters and characteristics (including battery pack nominal voltage, chemistry, battery cell characteristics, maximum allowed discharge current, maximum allowed temperature, etc.). In other constructions, the controller 1200 includes additional, fewer, or different components.

The power tool interface 1215 includes a combination of mechanical (e.g., the support portion 1015) and electrical components (e.g., the plurality of terminals 1025) configured to, and operable for, interfacing (e.g., mechanically, electrically, and communicatively connecting) the battery pack with a hand-held power tool (e.g., the hand-held power tool 100, 300, 500, and 700). For example, power provided from the battery pack 1000 to one of the hand-held power tools 100, 300, 500, and 700, is provided through the charge/discharge control module 1225 to the power tool interface 1215. The charge/discharge control module 1225 includes, for example, one or more switches (e.g., FETs) for controlling the charging current to and discharge current from the battery cells 1220. The power tool interface 1215 also includes, for example, a communication line 1270 for providing a communication line or link between the controller 1200 and a hand-held power tool.

The sensors 1210 include, for example, one or more current sensors, one or more voltage sensors, one or more temperature sensors, etc. For example, the controller 1200 uses the sensors 1210 to monitor an individual state of charge of each of the battery cells 1220, monitor a current being discharged from the battery cells 1220, monitor the temperature of one or more of the battery cells 1220, etc., for fault condition interrupts. If the voltage of one of the battery cells 1220 is equal to or above an upper voltage limit (e.g., a maximum charging voltage), the charge/discharge control module 1200 prevents the battery cells from being further charged or requests that a battery charger (not shown) provide a constant voltage charging scheme. Alternatively, if one of the battery cells 1220 falls below a low-voltage limit, the charge/discharge control module prevents the battery cells 1220 from being further discharged. Similarly, if an upper or lower operational temperature limit for the battery cells 1220 of the battery pack 1000 is reached, the controller 1200 can control the charge/discharge module 1225 from being charged or discharged until the temperature of the battery cells 1220 or the battery pack 1000 is within an acceptable temperature range. Additional fault condition interrupts can be implemented in the battery pack 1000 and are known to those skilled in the art. The fuel gauge 1205 includes, for example, one or more indicators, such as light-emitting diodes ("LEDs"). The fuel gauge 1205 can be configured to display conditions of, or information associated with, the state-of-charge of the battery cells 1220.

In some embodiments, methods for protecting the lithium-based battery cells in the battery pack similar to those described in U.S. Pat. No. 7,164,257, issued Jan. 16, 2007 and entitled "METHOD AND SYSTEM FOR PROTECTION OF A LITHIUM-BASED MULTICELL BATTERY PACK INCLUDING A HEAT SINK," the entire content of which is hereby incorporated by reference, can be implemented to protect the battery pack 1000. However, unlike the protection techniques described in U.S. Pat. No. 7,164,257, the hand-held power tools 100, 300, 500, and 700 and the battery pack 1000 have higher current threshold limits (e.g., a maximum current threshold of greater than approximately 60 amperes, a maximum current threshold having a value between approximately 60 amperes and approximately 80 amperes, etc.) as a result of, for example, the reduced impedance of various components in the battery pack/hand-held power tool combination, the increased current capabilities of the motor 900, the thermal dissipation properties of the hand-held power tool, the balanced design of the hand-held power tool and battery pack, etc., as described herein. As such, the combination of the hand-held power tools 100, 300, 500, or 700 and the battery pack 1000 is capable of transferring higher discharge currents and more power from the battery pack 1000 to the motor 900 without the hand-held power tool 100, 300, 500, or 700 entering a fault condition.

The power tool interface 1215 interfaces with a hand-held power tool, such as the hand-held power tools 100, 300, 500, and 700 illustrated in FIG. 45. The hand-held power tool includes a controller 1300 associated with the power hand-held power tool 100, 300, 500, or 700. The controller 1300 is electrically and/or communicatively connected to a variety of modules or components of the hand-held power tool. For example, the illustrated controller 1300 is connected to one or more indicators 1305, a power input module 1310, a battery pack interface 1315, one or more sensors 1320, a worklight 1325, a user input module 1330, a trigger switch 1335 (connected to trigger 1340), and a FET switching module 1345 (e.g., including the switching FETs described above). In some embodiments, the trigger switch 1335 is combined and integral with the controller 1300 within a housing within the hand-held power tool. The controller 1300 includes combinations of hardware and software that are operable to, among other things, control the operation of the hand-held power tool, activate the one or more indicators 1305 (e.g., an LED), monitor the operation of the hand-held power tool, etc. The one or more sensors 1320 include, among other things, one or more temperature sensors, one or more Hall Effect sensors, etc. By reducing the impedance between the battery pack and the hand-held power tool as described above, an inherent instability is introduced to the power tool system. As such, the controller 1300 calculates or includes, within memory, predetermined operational threshold values and limits for operation. In some embodiments, the threshold values are dynamically adjusted based on operational characteristics of, for example, the battery pack 1000, the motor 900, or control electronics (e.g., the switching FETs). For example, if the temperature of the battery pack is increasing rapidly or is nearing a maximum temperature limit, the battery pack 1000 can communicate with the power tool and the operational limits of the power tool or battery pack can be modified (e.g., increased or decreased). In some embodiments, when a potential thermal failure (e.g., of a FET, the battery pack, or the motor) is detected or predicted by the controller 1300, power to the motor 900 can be limited interrupted until the potential for thermal failure is reduced. Additionally or alternatively, the power tool can communicate with the battery pack 1000 to indicate when the hand-held power tool is capable of receiving higher input currents.

In some embodiments, the controller 1300 includes a plurality of electrical and electronic components that provide power, operational control, and protection to the components and modules within the controller 1300 and/or hand-held power tool. For example, the controller 1300 includes, among other things, a processing unit 1350 (e.g., a microprocessor, a microcontroller, or another suitable programmable device), a memory 1355, input units 1360, and output units 1365. The processing unit 1350 includes, among other things, a control unit 1370, an arithmetic logic unit ("ALU") 1375, and a plurality of registers 1380 (shown as a group of registers in FIG. 45), and is implemented using a known computer architecture, such as a modified Harvard architecture, a von Neumann architecture, etc. The processing unit 1350, the memory 1355, the input units 1360, and the output units 1365, as well as the various modules connected to the controller 1300 are connected by one or more control and/or data buses (e.g., common bus 1385). The control and/or data buses are shown generally in FIG. 45 for illustrative purposes. The use of one or more control and/or data buses for the interconnection between and communication among the various modules and components would be known to a person skilled in the art in view of the invention described herein. In some embodiments, the controller 1300 is implemented partially or entirely on a semiconductor (e.g., a field-programmable gate array ["FPGA"] semiconductor) chip, such as a chip developed through a register transfer level ("RTL") design process.

The memory 1355 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 1350 is connected to the memory 1355 and executes software instructions that are capable of being stored in a RAM of the memory 1355 (e.g., during execution), a ROM of the memory 1355 (e.g., on a generally permanent basis), or another non-transitory computer readable medium such as another memory or a disc. Software included in the implementation of the hand-held power tool can be stored in the memory 1355 of the controller 1300. The software includes, for example, firmware, one or more applications, program data, filters, rules, one or more program modules, and other executable instructions. The controller 1300 is configured to retrieve from memory and execute, among other things, instructions related to the control processes and methods described herein. In other constructions, the controller 1300 includes additional, fewer, or different components.

The battery pack interface 1315 includes a combination of mechanical (e.g., the battery pack receiving area 115, 315, 515, and 715) and electrical components (e.g., the plurality of terminals 160, 350, 550, and 755) configured to and operable for interfacing (e.g., mechanically, electrically, and communicatively connecting) a hand-held power tool with a battery pack (e.g., battery pack 1000). For example, power provided by the battery pack 1000 to one of the hand-held power tools 100, 300, 500, and 700, is provided through the battery pack interface 1315 to a power input module 1310. The power input module 1310 includes combinations of active and passive components to regulate or control the power received from the battery pack 1000 prior to power being provided to the controller. The battery pack interface 1315 also supplies power to the FET switching module 1345 to be switched by the switching FETs to selectively provide power to the motor 900. The battery pack interface 1315 also includes, for example, a communication line 1390 for provided a communication line or link between the controller 1300 and the battery pack 1000.

The trigger switch 1335 is connected to the trigger 1340 (e.g., the trigger 140, 335, 535, or 735) for controlling the power provided to the motor 900 through the switching FETs. In some embodiments, the amount of trigger pull detected by the trigger switch is related to or corresponds to a desired speed of rotation of the motor 900. In other embodiments, the amount of trigger pull detected by the trigger switch 1335 is related to or corresponds to a desired torque. The worklight 1325 (e.g., the worklight 150, 345, 545, and 750) is controlled by the controller 1300. In some embodiments, the worklight 1325 is illuminated when the trigger 1340 is pulled. In other embodiments, a dedicated switch or button is provided on the hand-held power tool or battery pack for activating the worklight without pulling the trigger 1340. The worklight 1325 can remain illuminated for a duration corresponding to an amount of time that the trigger 1340 is pulled. Additionally or alternatively, the worklight is activated when the trigger 1340 is pulled and remains illuminated for a predetermined period of time (e.g., 2 seconds, 10 seconds, between 2 and 60 seconds, etc.) after the trigger 1340 is pulled, or the worklight 1325 is activated when the trigger 1340 is pulled and remains activated for a predetermined period of time (e.g., 2 seconds, 10 seconds, between 2 and 60 seconds, etc.) after the trigger 1340 has been released. The sensors 1320 include, for example, one or more current sensors, one or more speed sensors, one or more Hall Effect sensors, one or more temperature sensors, etc. For example, the speed of the motor 900 can be determined using a plurality of Hall Effect sensors to sense the rotational position of the rotor 910 (described below).

The user input module 1330 is operably coupled to the controller 1300 to, for example, select a forward mode of operation or a reverse mode of operation, a torque and/or speed setting for the hand-held power tool (e.g., using the torque and/or speed switches), etc. In some embodiments, the user input module 1330 includes a combination of digital and analog input or output devices required to achieve a desired level of operation for the hand-held power tool, such as one or more knobs, one or more dials, one or more switches, one or more buttons, etc. The indicators 1305 include, for example, one or more light-emitting diodes ("LED"). The indicators 1305 can be configured to display conditions of, or information associated with, the hand-held power tool. For example, the indicators 1305 are configured to indicate measured electrical characteristics of the hand-held power tool, the status of the hand-held power tool, etc.

Figure 46:
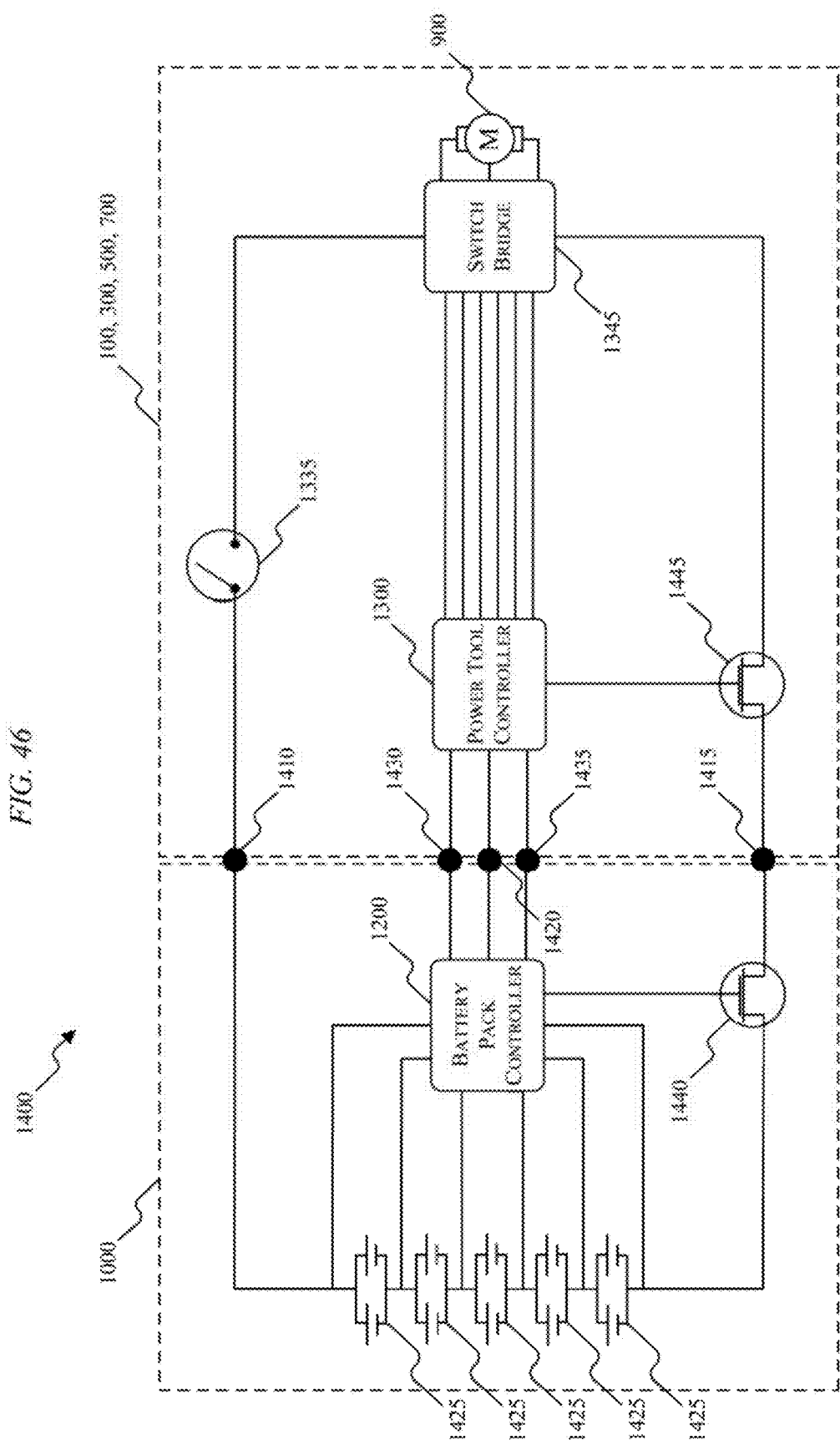
Figure 47:
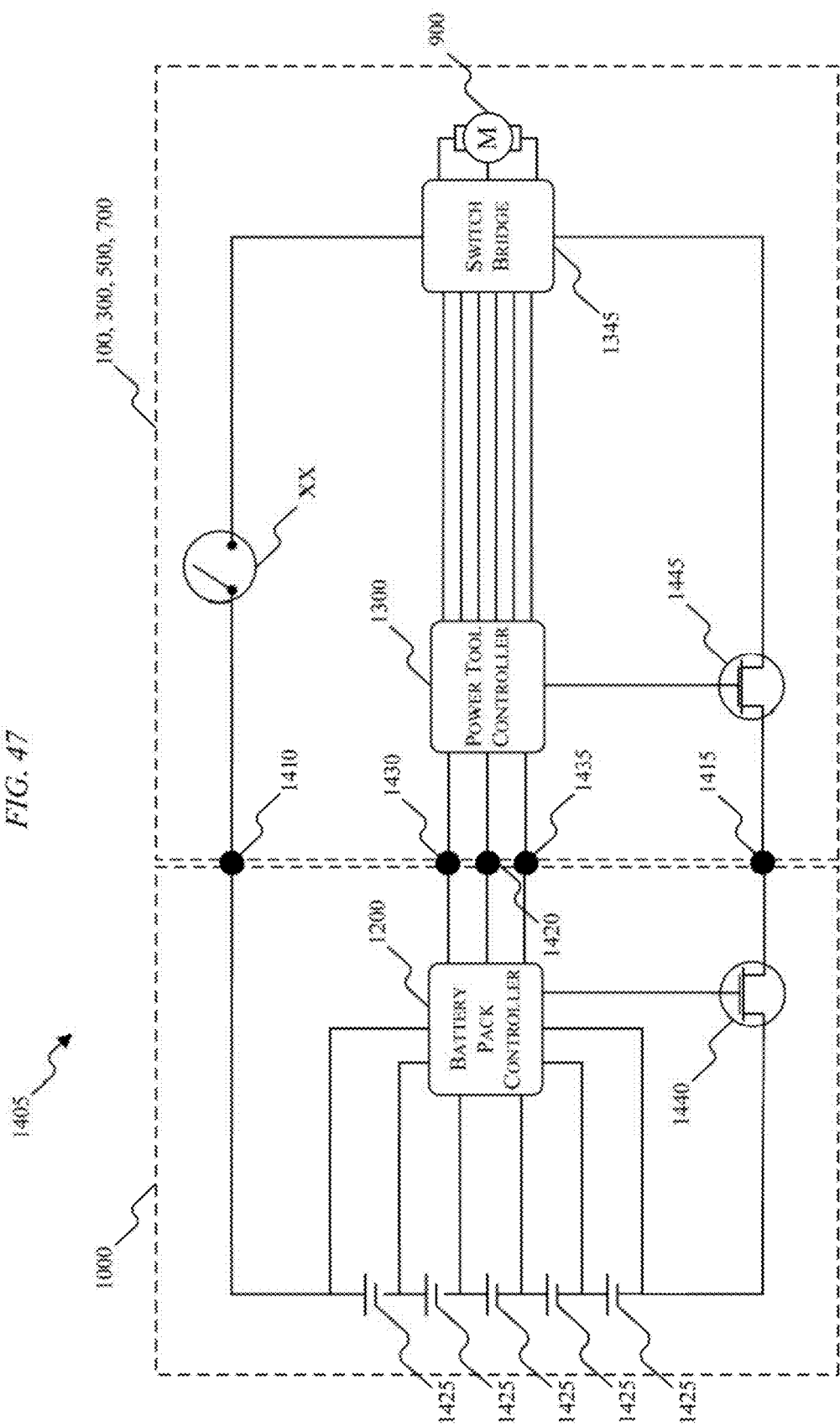

The connections between a hand-held power tool and a battery pack, as described above, are illustrated as schematics 1400 and 1405 in FIGS. 46 and 47, respectively. Specifically, the terminals 1410 and 1415 are connected to the opposite ends of the cell or series of cells 1425. A sense terminal 1420 can be connected to one or more electrical components, such as an identification component (i.e., a resistor) to communicate the identification of a characteristic of the battery pack 1000, such as, for example, the nominal voltage of the battery pack 1000, etc., or a temperature-sensing device or thermistor to communicate the temperature of the battery pack 1000 and/or of the battery cell(s) 1425.

In some embodiments, the electrical components may be other types of electrical components and may communicate other characteristics or information about the battery pack 1000 and/or of the battery cell(s) 1000. It should also be understood that "communication" and "communicate", as used with respect to the electrical components, may also encompass the electrical components having or being in a condition or state which is sensed by a sensor or device capable of determining the condition or state of the electrical components.

The battery pack 1000 includes ten battery cells 1425 configured as five series connections of two parallel cells. The illustrated embodiment of the hand-held power tool and battery pack combination includes five terminals: the battery positive ("B+") terminal 1410, the battery negative ("B−") terminal 1415, the sense or communication terminal 1420, an identification terminal 1430, and a temperature terminal 1435. In other embodiments, more or fewer terminals (e.g., B+, B−, and sense terminals) can be included in the connection between a hand-held power tool and a battery pack. In the circuits of FIGS. 46 and 47, each of the battery pack 1000 and the hand-held power tool 100, 300, 500, or 700 include a FET, 1440 and 1445 respectively, for controlling a discharge current from the battery cells to the motor 900. In other embodiments, only one of the battery pack 1000 and the hand-held power tool 100, 300, 500, or 700 includes a FET for controlling discharge current. The circuit 1405 illustrated in FIG. 47 is substantially similar to the circuit illustrated in FIG. 46 with the exception of the number of battery cells included in the battery pack 1000, which includes five series connected battery cells 1425.

Figure 48:
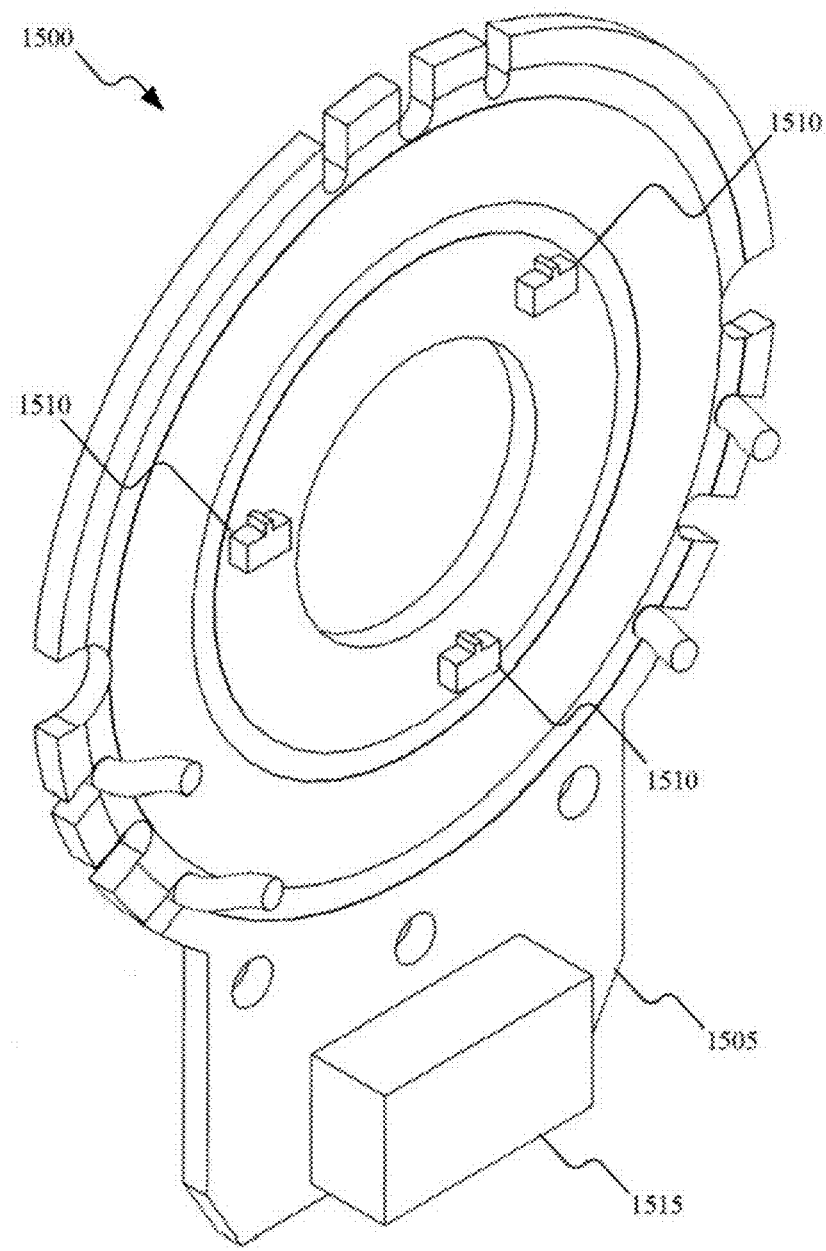
FIGS. 48-50 illustrate printed circuit boards for hand-held power tools according to embodiments of the invention.

The PCB's described above (e.g., the control PCB 165, the switching FET PCB 175, the surfboard PCB 355, 555, 760, the Hall Effect PCB 225, 410, 610, and 815) with respect to the hand-held power tools 100, 300, 500, and 700 can be implemented in a variety of additional configurations. For example, as shown above with respect to the hammer drill 100 and the drill/driver 300, the control PCB 165 and the FET switching PCB 175 of the hammer drill 100 can be combined into a single PCB, the surfboard PCB 355 of the drill/driver 300. In each configuration (i.e., the hammer drill multi-PCB configuration or the drill/driver surfboard PCB configuration), the hand-held power tools include the Hall Effect PCB for mounting sensors (e.g., Hall Effect sensors), as illustrated in FIG. 48. The Hall Effect PCB 1500 includes a circuit board 1505, a plurality of Hall Effect sensors 1510, and a heat sink 1515 (e.g., an aluminum, aluminum-alloy, etc., heat sink). The Hall Effect PCB 1500 provides signals to the controller 1300 of the hand-held power tool related to, for example, rotation position, velocity, and/or acceleration. The Hall Effect PCB, as illustrated in FIGS. 6, 11, 16, and 21, is mounted on a distal end of the motor 900.

Figure 49:
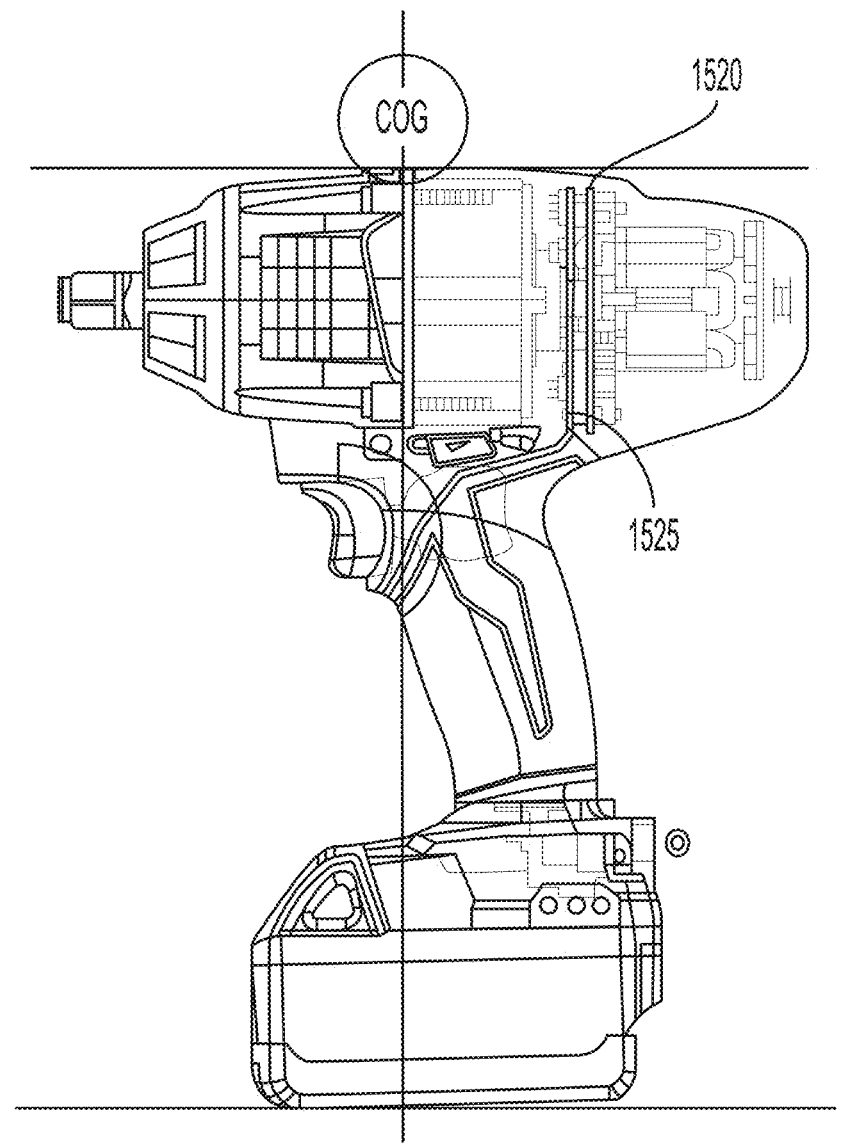

In a first alternative PCB configuration (e.g., to the multi-PCB configuration and the surfboard configuration), FIG. 49 illustrates a PCB configuration in which two parallel PCBs are mounted adjacent to the motor 900. The PCBs include a Hall Effect sensor and FET PCB 1520 and a control PCB 1525. The Hall Effect sensor and FET PCB 1520 includes at least Hall sensors and FETs, and the control PCB 1525 includes at least a motor control unit.

The Hall Effect sensor and FET PCB 1520 has a generally circular shape with a through hole in the center. The motor shaft and motor bearing pass through the through hole. The Hall Effect sensor and FET PCB 1520 has two generally flat mounting surfaces: a first face and a second face. Similarly, the control PCB 1525 has two generally flat mounting surfaces: a first face and a second face. The control PCB 1525 and Hall Effect sensor and FET PCB 1520 are located coaxially about the rotor 910 and their faces are generally parallel to each other. The PCBs 1520 and 1525 are secured to an end of the motor 900. By locating FETs with Hall Effect sensors 1510 on the single Hall Effect sensor and FET PCB 1520 secured to the end of the motor 900, the Hall Effect sensor and FET PCB 1520 is able to receive a large amount of air flow (e.g., from the vents 145, 340, 540, and 745 and from the motor fan 200, 375, 585, and 790) for cooling in addition to reducing the internal wiring of the power tool (e.g., lowering wire resistance of the hand-held power tool).

Figure 50:
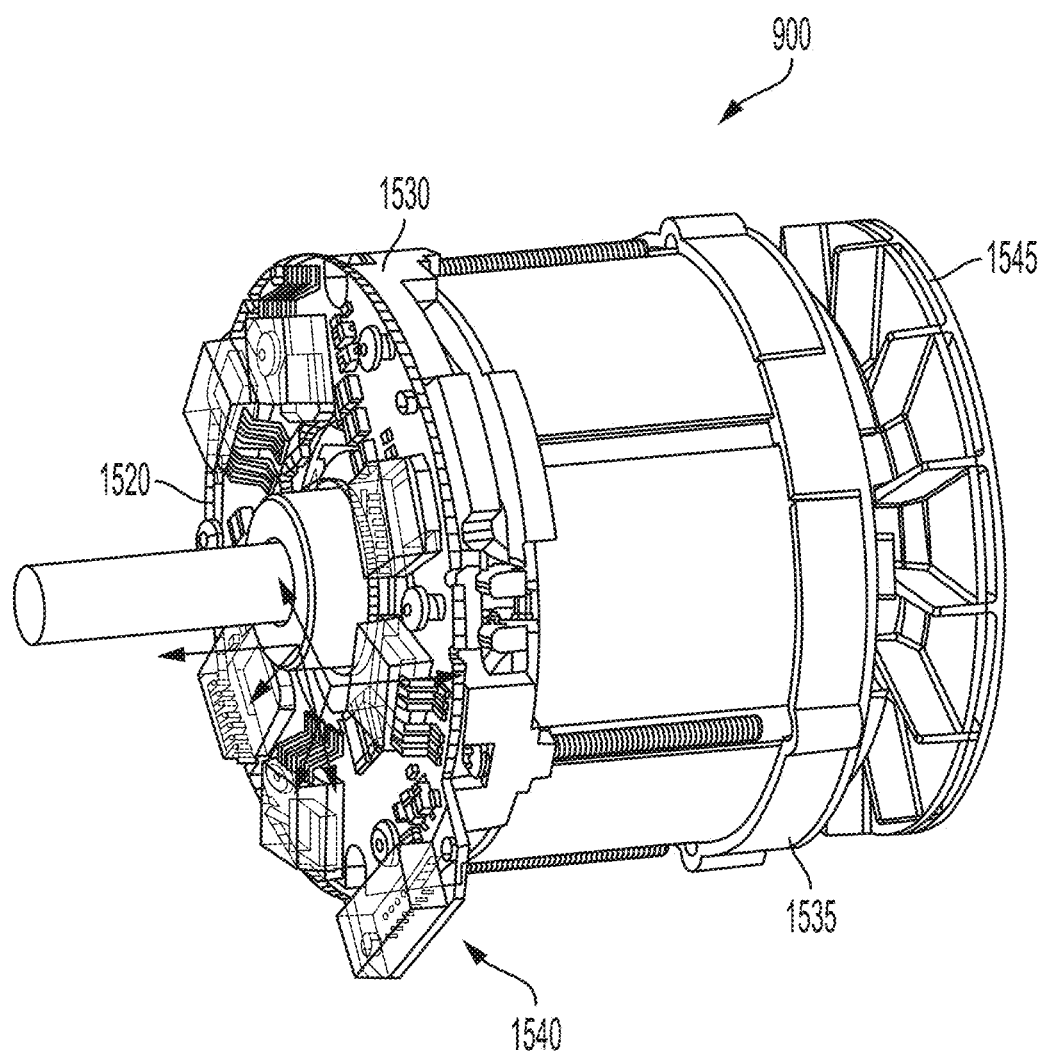

FIG. 50 illustrates an alternative configuration for the PCBs in which the control PCB 1525 is not located coaxially about the motor shaft 955 with the Hall Effect sensor and FET PCB 1520. In such embodiments, the control PCB 1525 is located in another location within the power tool housing (e.g., in the handle of the hand-held power tool, in the location of the surfboard PCB, etc.) and is electrically connected to the Hall Effect sensor and FET PCB 1520 using, for example, a ribbon cable. Furthermore, in such embodiments, the general shape of the control PCB 1525 may not be circular. FIG. 50 illustrates the motor 900 of a hand-held power tool along with an aluminum heat sink 1530, a rear bracket 1535, a wire support feature, a connecting portion 1540, and a fan 1545. Like the embodiment illustrated by FIG. 49, the Hall Effect sensor and FET PCB 1520 is secured to the end of the motor 900 and is located coaxially about the rotor 910. The heat sink 1530 is mounted to the motor 900 using mounting screws, and the Hall Effect sensor and FET PCB 1520 is mounted to the heat sink 1530 using mounting screws. Furthermore, the Hall Effect sensor and FET PCB 1520 is secured to the motor 900 using solder joints. The Hall Effect sensor and FET PCB 1520 also includes the connecting portion 1540 to allow the Hall Effect sensor and FET PCB 1520 to receive power and communicate with the control PCB 1525. With this configuration, the motor 900, the Hall Effect sensor and FET PCB 1520, and the heat sink 1530, a large amount of air is pulled by the fan 1545 from the outside of the motor (e.g., through vents) and around the heat sink 1530 to cool the Hall Effect sensor and FET PCB 1520.

Assembling a cordless, hand-held power tool in a balanced manner, as described above (e.g., with respect to the hammer drill 100, the drill/driver 300, the impact wrench 500, and the impact driver 700), produces a hand-held power tool with both increased short-duration operational power (i.e., without causing the battery pack 1000 or the hand-held power tool to shut down or become non-operational) and increased long-duration operational power (i.e., throughout a discharge cycle of the battery pack 1000) without causing the battery pack 1000 or the hand-held power tool to shut down or become non-operational, as described in detail below.

The performance of a hand-held power tool or an electrical combination of a hand-held power tool and a battery pack can be measured and evaluated in a variety of ways. For example, the performance of a hand-held power tool can be evaluated using average Watts out of the hand-held power tool (there is a small efficiency loss associated with the operation of the drive mechanism within the hand-held power tool which causes the average output power of the hand-held power tool to be slightly less than the average output power of the motor), average Watts in (i.e., from the battery pack 1000), average voltage (e.g., of the battery pack 1000), average current (e.g., from the battery pack 1000), average motor speed, average efficiency (i.e., average Watts out compared to average Watts in), average torque generated by the hand-held power tool, full tool weight with or without battery, hand-held power tool electronics weight, motor weight (e.g., total motor weight, rotor weight, etc.), battery pack weight, motor stator stack length, motor stator outer diameter, motor stator inner diameter, motor rotor diameter, motor rotor length, motor bearing-to-bearing length, motor shaft length, motor shaft diameter, motor magnet length, etc. Additionally, ratios of any one of these characteristics to any other of these characteristics can be made and are illustrative of the performance capabilities of the hand-held power tool. Exemplary performance ratios are provided below, and procedures for measuring and/or evaluating some of the noted characteristics are also provided below for the purpose of clarity.

Most of the characteristics of the hand-held power tool and/or battery pack provided above can be measured or obtained using methods well within the capabilities of a person skilled in the art (e.g., weights, lengths, voltages, currents, speeds, torques, etc.). However, some of the above characteristics are gathered or obtained using, or during, precise testing procedures. For example, in order to obtain a maximum sustained output power and, for example, the associated currents and torques, etc., a reproducible and repeatable procedure is implemented to ensure accurate and reliable data. A series of exemplary testing procedures are described in detail below with respect to the testing of the hand-held power tool and/or battery pack to provide appropriate context to some of the above-noted characteristics.

For example, one conventional technique for determining the maximum power delivery of a hand-held power tool and/or the maximum efficiency the hand-held power tool (or motor) employs a dynamometer. The dynamometer is used to test the hand-held power tool using a brake torque load (e.g., a hysteresis brake). A procedure for measuring the motor power includes attaching the hand-held power tool including drive mechanism (or, alternatively, the hand-held power tool's motor alone) to the dynamometer, providing an input power to the hand-held power tool using the hand-held power tool's battery pack or a power supply, and operating the hand-held power tool under varying load conditions (i.e., levels of loading). During the test, the brake torque load is adjusted (e.g., corresponding to 25 Watt increments in output power, a ramped speed, a ramped torque, etc.) and the voltage to the tool is fixed (e.g., according to the battery pack voltage). Typically, the brake is initially set to a zero torque value. During the dynamometer test, a ramp rate can be determined for the test. For example, the ramp rate that is used during the test can be calculated as follows:

$$\text{Ramp Rate} = \frac{(\text{Maximum Speed}) - (\text{Minimum Speed})}{\text{Time Length of Test}}$$

where the maximum speed is the maximum speed of the motor, the minimum speed is the minimum intended speed of the motor during the test, and the time length of test is the length of time that the test should take to be completed. In some embodiments, the time length of the test is between approximately 10 seconds and approximately 25 seconds (e.g., 20.5 seconds). Thus, the ramp rate used during dynamometer testing has units of speed (i.e., RPM) over seconds. The test is conducted, for example, by ramping the speed down and then up (e.g., increasing torque and then decreasing torque). In some embodiments, inertia correction can be used during the dynamometer testing.

Additionally or alternatively, in some embodiments, the torque of the brake is either stepped-up in fixed increments over a predetermined period of time, or the torque is gradually ramped-up at a predetermined rate with respect to time (e.g., an inch-pounds/second ramp). In other embodiments, the torque is not increased until thermal stabilization of the power tool is reached. At that point, the torque is again increased. When a thermal failure occurs, the maximum output torque can be identified (e.g., the increment before thermal failure). Measurements of the motor's speed and the current provided to the motor are made throughout the test. The gathered data can then be plotted on a graph such that speed, current, output power (i.e., speed multiplied by torque), and efficiency (i.e., output power divided by input power) are provided on the Y-axis and torque is provided on the X-axis. The peak output power, torque, etc., can be determined using this procedure.

The power output of one motor can then be compared to the power output of another motor in a relative manner by evaluating, for example, peak power output, peak efficiency, the shape of a speed vs. torque curve, the shape of the current vs. torque curve, etc. Using such comparisons, relative differences in peak output power and efficiency over a short-run or short duration (e.g., 20-25 seconds during the dynamometer testing) can be evaluated. Such comparisons are particularly illustrative of the operation of the hand-held power tool during real-world operating conditions in which the hand-held power tool may only be operated for intermittent short intervals of time. The greater the power that a hand-held power tool is capable of producing, the larger (i.e., higher power demand) the application the hand-held power tool can be used to complete, or, alternatively, the faster the hand-held power tool is able to perform smaller (i.e., lower power demand) applications.

The capability of the hand-held power tool to deliver maximum continuous power is evaluated in a similar manner to that described above, but the load is set to the same load point for the duration of the testing. However, the test can be performed multiple times at different loads in order to determine the maximum continuous output power or the approximate maximum continuous output power during the operation of the hand-held power tool. In some embodiments, the fixed load point can be selected based on, for example, input current to the hand-held power tool. The current load point is set to a maximum current value that does not result in a thermal failure of the hand-held power tool or the battery pack, and that does not result in the hand-held power tool or battery pack shutting down prematurely (e.g., before the battery pack reaches a low-voltage cutoff value (see, for example, Tables 2 and 7 below). In other embodiments, a load point corresponding to a specific value in units of torque, input power, or output power. Because torque is proportional to current in DC motors, both can be considered fixed to each other via a constant value. Such a test should only be considered valid if the hand-held power tool or component of the hand-held power tool does not fail (e.g., thermal failure of the hand-held power tool) and result in shut down prior to the natural end of battery pack discharge (e.g., as the result of one of the plurality of battery cells reaching low battery cell voltage cutoff). Such a test can be considered valid if the battery pack fails (e.g., thermal failure of the battery pack) but the hand-held power tool does not fail (e.g., because of a single faulty battery cell, etc.).

Each of the short-run test data and long-run test data for a hand-held power tool including one of a variety of motors (e.g., generically categorized by motor stator outer diameter) are provided below. The test data provided related to a hand-held power tool being powered by a battery pack is provided with respect to a battery pack having a 5S2P (five-series, 2-parallel) configuration for an 18V nominal batter pack voltage (i.e., for the motors having an outer stator diameter of 50 mm or 60 mm) or a battery pack having three series-connected battery cells and producing a battery pack nominal voltage of 12V (i.e., for the motor having an outer stator diameter of 40 mm). Each of Tables 1-5 provide ranges of values for each characteristic of the hand-held power tool/battery pack. Tables 6-10 provide exemplary single-run performance characteristics for the hand-held power tools and battery packs described herein. The ranges of values represent measured values from a series of tests to evaluate the performance and operational characteristics of the hand-held power tools. For the characteristics of the hand-held power tool/battery pack where a range is given (e.g., either a closed range or an open-ended range), the value of the characteristic can take on any value within the range or be limited to a smaller range within the provided range. For example, the stator outer diameter is indicated as being between 20 mm and 80 mm. However, the stator outer diameter can have a value that is within a subset of that range, such as an outer stator diameter of between 40 mm and 60 mm.

The ranges provided below exemplary and intended to be inclusive of the full-range of possible values, which can vary slightly from one hand-held power tool to another. For example, a hand-held power tool including the motor 900 may have an average sustained power output of between approximately 150 W and 800 W. A maximum Watts out (i.e., short-run) of greater than approximately 400 W may have an actual value of between approximately 400 W and approximately 700 W. Similarly, and efficiency values are give with respect to a lower limit, such as 65% efficiency. The efficiency has an actual value of greater than or equal to approximately 65% but less than 100%. The lowest values of open-ended ranges are based on test data and should not be considered limiting to range of higher values that can be achieved when implementing the invention described herein. Throughout testing, the hand-held power tools including the motor 900 described herein achieved output powers (i.e., of the hand-held power tool) of between approximately 150 W and approximately 1200 W, depending on characteristics of the motor being tested and the power source (e.g., battery pack) voltage for the hand-held power tool. For example, when the hand-held power tool including the motor 900 is powered by a battery pack having a nominal voltage of 18V, the maximum output powers of the hand-held power tool were in the range of approximately 400 W to approximately 1200 W. When the hand-held power tool including the motor 900 is powered by a battery pack having a nominal voltage of 12V, the maximum output powers of the hand-held power tool were in the range of approximately 250 W to approximately 500 W. When the hand-held power tool including the motor 900 is powered by a battery pack having a nominal voltage of 18V, the average sustained output powers of the hand-held power tool were in the range of approximately 300 W to approximately 800 W. When the hand-held power tool including the motor 900 is powered by a battery pack having a nominal voltage of 12V, the average sustained output powers of the hand-held power tool were in the range of approximately 150 W to approximately 400 W.

In some embodiments of the invention, the average sustained output power for a hand-held power tool being powered by a battery pack having a nominal voltage of 12V is, for example, greater than or equal to approximately 150 W, greater than or equal to approximately 200 W, greater than or equal to approximately 250 W, greater than or equal to approximately 300 W, or greater than or equal to approximately 350 W.

In some embodiments of the invention, the average sustained output power for a hand-held power tool being powered by a battery pack having a nominal voltage of 18V is, for example, greater than or equal to approximately 300 W, greater than or equal to approximately 350 W, greater than or equal to approximately 400 W, greater than or equal to approximately 450 W, greater than or equal to approximately 500 W, greater than or equal to approximately 550 W, greater than or equal to approximately 600 W, greater than or equal to approximately 650 W, greater than or equal to approximately 700 W, greater than or equal to approximately 750 W.

In some embodiments of the invention, the maximum short-run output power for a hand-held power tool being powered by a battery pack having a nominal voltage of 12V is, for example, greater than or equal to approximately 250 W, greater than or equal to approximately 300 W, greater than or equal to approximately 350 W, greater than or equal to approximately 400 W, or greater than or equal to approximately 450 W.

In some embodiments of the invention, the maximum short-run output power for a hand-held power tool being powered by a battery pack having a nominal voltage of 18V is, for example, greater than or equal to approximately 400 W, greater than or equal to approximately 450 W, greater than or equal to approximately 500 W, greater than or equal to approximately 550 W, greater than or equal to approximately 600 W, greater than or equal to approximately 650 W, greater than or equal to approximately 700 W, greater than or equal to approximately 750 W, greater than or equal to approximately 800 W, greater than or equal to approximately 850 W, greater than or equal to approximately 900 W, or greater than or equal to approximately 950 W.

The values for the characteristics provided below are approximate values based on test data for the disclosed hand-held power tools. As a result of the approximation, the values provided below are not exact and each value may have a variance within the range of approximately +/−1-10%.

TABLE 1

Hand-Held Power Tool and Battery Pack Characteristics

| | Units | | | | |
|---|---|---|---|---|---|
| Weight (Tool only) | g | 900-1200 | 1500-1700 | 2400-2800 | 2900-3100 |
| Weight (Tool and battery - Tool Total) | g | 1300-1600 | 2200-2400 | 3000-3500 | 3500-3800 |
| Weight (Tool and Battery w/ Side Handle) | g | — | 2450-2700 | 3250-3800 | 3750-4100 |
| Weight (Motor + Electronics) | g | 300-350 | 400-450 | 600-700 | 750-850 |
| Weight (Battery Pack) | g | 350-450 | 600-700 | 600-700 | 600-700 |
| Total Motor Weight | g | 245-265 | 325-360 | 540-580 | 680-720 |
| Stator Weight | g | 135-145 | 190-210 | 310-330 | 390-410 |
| Rotor Weight | g | 110-120 | 135-150 | 230-250 | 290-310 |
| Stator Length (Active Motor Length) | mm | 22-32 | 14-32 | 14-32 | 25-35 |
| Stator Outer Diameter | mm | 20-60 | 30-70 | 40-80 | 40-80 |
| Stator Inner Diameter | mm | 10-50 | 20-60 | 30-70 | 30-70 |
| Rotor Diameter | mm | 17-27 | 20-30 | 17-30 | 30-35 |
| Rotor Length | mm | 29-39 | 20-30 | 24-34 | 31-41 |
| Rotor Bearing-to-Bearing Length | mm | 50-60 | 40-50 | 70-80 | 80-90 |
| Rotor Shaft Length | mm | 55-80 | 55-80 | 75-90 | 85-100 |
| Rotor Shaft Diameter | mm | 3-5 | 4-6 | 7-9 | 7-9 |
| Rotor Magnet Length | mm | 29-39 | 20-30 | 24-34 | 31-41 |

The total motor weight includes the weight of the stator and the weight of the rotor. The weight of the rotor includes the bearings, the fan, the permanent magnets, any spacers connected to the rotor shaft, and a pinion for driving a gear assembly.

TABLE 2

Long-Run Performance Characteristics (Battery Pack)

| | Units | | | |
|---|---|---|---|---|
| Stator Outer Diameter | mm | 40 | 50 | 60 |
| Nominal Battery Pack Voltage | V | 12 | 18 | 18 |
| Average Volts | V | 10 | 16 | 16 |
| Average Sustained Current | A | 25-35 | 30-40 | 30-45 |
| Average Sustained Power Output | W | >150 | >300 | >300 |
| Average Sustained Power Input | W | >250 | >450 | >450 |
| Average Speed (Tool Output) | RPM | 270-290 | 275-305 | 275-305 |
| Average Efficiency | % | >60 | >65 | >65 |
| Torque (Tool Output) | lb-in | >45 | >95 | >95 |
| Motor Speed/Tool Output Speed | RPM/RPM | <60 | <60 | <60 |
| Length of Run | s | <360 | <360 | <360 |
| Ampere-Hours Discharged | A/h | 2.5-2.7 | 2.6-2.8 | 2.6-2.8 |
| Watt Hours | W/h | >15 | >30 | >30 |

TABLE 3

Long-Run Performance Characteristic Ratios (Battery Pack)

|  | Units |  |  |  |
| --- | --- | --- | --- | --- |
| Stator Outer Diameter | mm | 40 | 50 | 60 |
| Average Sustained Power Output/Length of Run | W/s | >0.45 | >1.0 | >1.0 |
| Average Sustained Power Output/electronics and motor weight | W/g | >0.4 | >0.75 | >.75 |
| Average Sustained Power Output/tool-only weight | W/g | >0.12 | >0.2 | >0.2 |
| Average Sustained Power Output/Stator Outer Diameter | W/mm | >3.5 | >6 | >5 |
| Torque/Stator Length | lb-in/mm | >1.2 | >3 | >3 |
| Stator Length/Rotor Length | mm/mm | 0.37-0.54 | 0.21-0.43 | 0.21-0.54 |

TABLE 4

Short-Run Performance Characteristics (Battery Pack)

|  | Units |  |  |  |  |
| --- | --- | --- | --- | --- | --- |
| Stator Outer Diameter | mm | 40 | 50 | 60 | 60 |
| Max Watts Out | W | >250 | >400 | >600 | >700 |
| Nominal Voltage | V | 12 | 18 | 18 | 18 |
| Current at Max Watts Out | A | 55-65 | 55-65 | 75-90 | 75-95 |
| Speed (Tool Output) at Max Watts Out | RPM | 160-190 | 220-230 | >300 | >300 |
| Watts In at Max Watts Out | W | 500-550 | 950-1000 | >950 | >950 |
| Efficiency at Max Watts Out | % | >45 | >55 | >60 | >65 |
| Peak Efficiency |  | >55 | >65 | >65 | >65 |
| Motor Speed/Tool Output Speed | RPM/RPM | <60 | <60 | <60 | <60 |
| Torque (Tool Output) at Max Watts Out | lb-in | >120 | >180 | >80 | >110 |

TABLE 5

Short-Run Performance Characteristic Ratios (Battery Pack)

|  | Units |  |  |  |  |
| --- | --- | --- | --- | --- | --- |
| Stator Outer Diameter | mm | 40 | 50 | 60 | 60 |
| Max Watts Out/tool-only weight | W/g | >0.2 | >0.3 | >0.3 | >0.2 |
| Max Watts Out/total tool weight | W/g | >0.15 | >0.2 | >0.2 | >0.18 |
| Torque/Stator Length | lb-in/mm | >3 | >5 | >3 | >3 |
| Max Watts Out/Stator Diameter | W/mm | >6 | >8 | >8 | >8 |

In addition to the above ranges and values for the performance characteristics of the hand-held power tool/battery pack, provided below are values for each performance characteristic with respect an exemplary single test of the performance of the hand-held power tool/battery pack including a motor with a 40 mm stator outer diameter (powered by a 12V battery pack) and a motor with a 50 mm stator outer diameter (powered by an 18V battery pack). The values for the characteristics provided below are approximate values based on test data. As a result of the approximation, the values provided below are not exact and each value may have a variance within the range of approximately +/−5-10%.

TABLE 6

Hand-Held Power Tool and Battery Pack Characteristics

|  | Units |  |  |  |  |
| --- | --- | --- | --- | --- | --- |
| Weight (Tool only) | g | 1080 | 1647 | 2590 | 2980 |
| Weight (Tool and battery-Tool Total) | g | 1479 | 2334 | 3278 | 3668 |
| Weight (Tool and Battery w/ Side Handle) | g | — | 2604 | 3548 | 3938 |
| Weight (Motor + Electronics) | g | 322 | 426 | 650 | 790 |
| Weight (Battery Pack) | g | 400 | 688 | 688 | 688 |
| Total Motor Weight | g | 254 | 336.5 | 560 | 700 |
| Stator Weight | g | 139.5 | 194.5 | 320 | 400 |
| Rotor Weight | g | 114.5 | 142 | 240 | 300 |
| Stator Length (Active Motor Length) | mm | 30 | 24 | 22 | 30 |
| Stator Outer Diameter | mm | 40 | 50 | 60 | 60 |
| Stator Inner Diameter | mm | 23 | 27 | 34.5 | 34.5 |
| Rotor Diameter | mm | 22 | 26 | 33.5 | 33.5 |
| Rotor Length | mm | 34 | 27.9 | 28.5 | 36.5 |
| Rotor Bearing-to-Bearing Length | mm | 54.3 | 46 | 76 | 84 |
| Rotor Shaft Length | mm | 71 | 65 | 84 | 92 |
| Rotor Shaft Diameter | mm | 4 | 5 | 8 | 8 |
| Rotor Magnet Length | mm | 34 | 27.9 | 28.5 | 36.5 |

TABLE 7

Long-Run Performance Characteristics (Battery Pack)

|  | Units |  |  |
| --- | --- | --- | --- |
| Stator Outer Diameter | mm | 40 | 50 |
| Average Volts | V | 10 | 16 |
| Average Sustained Current | A | 27 | 32 |
| Average Sustained Power Output | W | 166 | 350 |
| Average Sustained Power Input | W | 271 | 505 |
| Average Speed (Tool Output) | RPM | 281 | 300 |
| Average Efficiency | % | 61 | 69 |
| Torque (Tool Output) | lb-in | 50 | 100 |
| Motor Speed/Tool Output Speed | RPM/RPM | 55 | 48.5 |
| Length of Run | s | 334 | 310 |
| Ampere-Hours Discharged | A/h | 2.6 | 2.75 |
| Watt Hours | W/h | 15 | 30 |

TABLE 8

Long-Run Performance Characteristic Ratios (Battery Pack)

|  | Units |  |  |
| --- | --- | --- | --- |
| Stator Outer Diameter | mm | 40 | 50 |
| Average Sustained Power Output/Length of Run | W/s | 0.5 | 1.13 |
| Average Sustained Power Output/electronics and motor weight | W/g | 0.52 | 0.82 |
| Average Sustained Power Output/tool-only weight | W/g | 0.15 | 0.21 |
| Average Sustained Power Output/Stator Outer Diameter | W/mm | 4.15 | 7 |
| Torque/Stator Length | lb-in/mm | 1.67 | 4.2 |
| Stator Length/Rotor Length | mm/mm | 0.42 | 0.37 |

TABLE 9

Short-Run Performance Characteristics (Battery Pack)

|  | Units |  |  |  |  |
| --- | --- | --- | --- | --- | --- |
| Stator Outer Diameter | mm | 40 | 50 | 60 | 60 |
| Max Watts Out | W | 259 | 550 | 735 | 835 |
| Nominal Battery Pack Voltage | V | 12 | 18 | 18 | 18 |
| Current at Max Watts Out | A | 59 | 61 | 84 | 95 |
| Speed at Max Watts Out | RPM | 180 | 225 | 767 | 767 |
| Watts In at Max Watts Out | W | 525 | 970 | 1187 | 1215 |
| Efficiency at Max Watts Out | % | 49 | 56 | 64 | 72 |
| Peak Efficiency | % | 62 | 70 | 72 | 78 |
| Motor Speed/Tool Output Speed | RPM/RPM | 55 | 48.5 | 12 | 12 |
| Torque (Tool Output) at Max Watts Out | lb-in | 122 | 207 | 82.5 | 117 |

TABLE 10

Short-Run Performance Characteristic Ratios (Battery Pack)

|  | Units |  |  |  |  |
| --- | --- | --- | --- | --- | --- |
| Stator Outer Diameter | mm | 40 | 50 | 60 | 60 |
| Max Watts Out/tool-only weight | W/g |  | 0.24 | 0.33 | 0.29 | 0.29 |
| Max Watts Out/total tool weight | W/g | 0.18 | 0.24 | 0.23 | 0.24 |
| Torque/Stator Length | lb-in/mm | 4.1 | 8.6 | 3.75 | 2.75 |
| Max Watts Out/Stator Diameter | W/mm | 6.5 | 11 | 12.7 | 14.6 |

Thus, the invention provides, among other things, a cordless, hand-held power tool that includes a brushless direct current motor. The hand-held power tool is operable to and capable of producing increased short-run (i.e., short-duration) output power and increased long-run (i.e., long duration) output power as compared to prior cordless, hand-held power tools. Although the invention was primarily described above with respect to a hammer drill/driver, a drill/driver, an impact driver, and an impact wrench, the power tool can also be, for example, a saw, an angle grinder, a bandsaw, a belt sander, a chainsaw, a circular saw, a concrete saw, a disc sander, a floor sander, a jigsaw, a miter saw, a rotary hammer, a grinder, a nail gun, a reciprocating saw, a scroll saw, a router, etc. Various features and advantages of the invention are set forth in the following claims.

What is claimed is:

1. A power tool comprising:
   a housing;
   a battery pack having a nominal voltage of 18 Volts to 36 Volts and removably coupled to the housing;
   a brushless direct-current ("BLDC") motor, the BLDC motor having an outer diameter of between 50 millimeters and 80 millimeters, wherein a stator weight of the BLDC motor is 195 grams to 400 grams;
   a switching array including a plurality of switching field effect transistors ("FETs") electrically connected between the BLDC motor and the battery pack, the plurality of switching FETs configured for controlling application of power to the BLDC motor, wherein the plurality of switching FETs have a drain-to-source resistance of below 5.5 milli-Ohms;
   a controller configured to generate a control signal to selectively enable and disable the plurality of switching FETs in the switching array to drive the BLDC motor with power provided from the battery pack;
   wherein the power tool is configured to produce a maximum short-duration power output of at least 600 watts and an average long-duration power output, throughout a discharge cycle of the battery pack, of at least 400 Watts, and
   wherein an energy consumed by the power tool for providing the average long-duration power output is at least 30 Watt Hours.

2. The power tool of claim 1, wherein the maximum short-duration power output refers to a power output during a duration of between 20 seconds and 25 seconds.

3. The power tool of claim 2, wherein a stator length of the BLDC motor is between 22 millimeters and 35 millimeters.

4. The power tool of claim 3, wherein a rotor diameter of the BLDC motor is between 17 millimeters and 30 millimeters.

5. The power tool of claim 4, wherein the battery pack is configured to provide a power input of at least 650 Watts during the maximum short-duration power output.

6. The power tool of claim 5, wherein a ratio of the average long-duration power output of the power tool to the outer diameter of the BLDC motor is at least 7 W: 1 mm.

7. The power tool of claim 6, further comprising:
   a fan driven by the BLDC motor to generate a cooling air flow.

8. A power tool comprising:
   a housing;
   a battery pack having a nominal voltage of 18 Volts to 36 Volts and removably coupled to the housing;
   a brushless direct-current ("BLDC") motor, wherein a stator weight of the BLDC motor is 195 grams to 400 grams;
   a switching array including a plurality of switching field effect transistors ("FETs") electrically connected between the BLDC motor and the battery pack, the plurality of switching FETs configured for controlling application of power to the BLDC motor, wherein the plurality of switching FETs have a drain-to-source resistance of below 5.5 milli-Ohms;
a controller configured to generate a control signal to selectively enable and disable the plurality of switching FETs in the switching array to drive the BLDC motor with power provided from the battery pack;
wherein the power tool is configured to produce a maximum short-duration power output of at least 600 watts and an average long-duration power output, throughout a discharge cycle of the battery pack, of at least 400 Watts, and
wherein an energy consumed by the power tool for providing the average long-duration power output is at least 30 Watt Hours.

9. The power tool of claim 8, wherein a ratio of the average long-duration power output of the power tool to the outer diameter of the BLDC motor is at least 7 W:1 mm.

10. The power tool of claim 9, wherein a stator length of the BLDC motor is between 22 millimeters and 35 millimeters.

11. The power tool of claim 10, wherein the BLDC motor has an outer diameter of 40 millimeters to 80 millimeters.

12. The power tool of claim 11, wherein the BLDC motor has an outer diameter of 50 millimeters to 80 millimeters.

13. The power tool of claim 12, wherein the maximum short-duration power output refers to a power output during a duration of between 20 seconds and 25 seconds.

14. A power tool comprising:
a housing;
a battery pack having a nominal voltage of 18 Volts to 36 Volts and removably coupled to the housing;
a brushless direct-current ("BLDC") motor;
a switching array including a plurality of switching field effect transistors ("FETs") electrically connected between the BLDC motor and the battery pack, the plurality of switching FETs configured for controlling application of power to the BLDC motor, wherein the plurality of switching FETs have a drain-to-source resistance of below 5.5 milli-Ohms;
a controller configured to generate a control signal to selectively enable and disable the plurality of switching FETs in the switching array to drive the BLDC motor with power provided from the battery pack;
wherein the power tool is configured to produce a maximum short-duration power output of at least 600 watts and an average long-duration power output, throughout a discharge cycle of the battery pack, of at least 400 Watts, and
wherein a stator weight of the BLDC motor is 195 grams to 400 grams.

15. The power tool of claim 14, further comprising:
a fan driven by the BLDC motor to generate a cooling air flow.

16. The power tool of claim 15, wherein a stator length of the BLDC motor is between 22 millimeters and 35 millimeters.

17. The power tool of claim 16, wherein the maximum short-duration power output refers to a power output during a duration of between 20 seconds and 25 seconds.

18. The power tool of claim 17, wherein the BLDC motor has an outer diameter of 50 millimeters to 80 millimeters.

19. The power tool of claim 18, wherein a ratio of the average long-duration power output of the power tool to the outer diameter of the BLDC motor is at least 7 W: 1 mm.

20. The power tool of claim 19, wherein an energy consumed by the power tool for providing the average long-duration power output is at least 30 Watt Hours.

21. A power tool comprising:
a housing;
a battery pack having a nominal voltage of 18 Volts to 36 Volts and removably coupled to the housing;
a brushless direct-current ("BLDC") motor, wherein a stator weight of the BLDC motor is 195 grams to 400 grams;
a switching array including a plurality of switching field effect transistors ("FETs") electrically connected between the BLDC motor and the battery pack, the plurality of switching FETs configured for controlling application of power to the BLDC motor, wherein the plurality of switching FETs have a drain-to-source resistance of below 5.5 milli-Ohms;
a controller configured to generate a control signal to selectively enable and disable the plurality of switching FETs in the switching array to drive the BLDC motor with power provided from the battery pack;
wherein the power tool is configured to produce a maximum short-duration power output of at least 600 watts and an average long-duration power output, throughout a discharge cycle of the battery pack, of at least 400 Watts, and
wherein a ratio of the average long-duration power output of the power tool to the outer diameter of the BLDC motor is at least 7 W: 1 mm.

22. The power tool of claim 21, wherein the battery pack is configured to provide a power input of at least 650 Watts during the maximum short-duration power output.

23. The power tool of claim 22, wherein the maximum short-duration power output refers to a power output during a duration of between 20 seconds and 25 seconds.

24. The power tool of claim 23, wherein a stator length of the BLDC motor is between 22 millimeters and 35 millimeters.

25. The power tool of claim 24, wherein an energy consumed by the power tool for providing the average long-duration power output is at least 30 Watt Hours.

26. The power tool of claim 25, wherein a ratio of the maximum short-duration power output to a stator outer diameter of the BLDC motor is at least 10:1.

27. The power tool of claim 26, wherein the BLDC motor has an outer diameter of 50 millimeters to 80 millimeters.

* * * * *